United States Patent [19]

Cole et al.

[11] Patent Number: 5,041,964
[45] Date of Patent: Aug. 20, 1991

[54] LOW-POWER, STANDBY MODE COMPUTER

[75] Inventors: James F. Cole, Palo Alto; James H. McNamara, Santa Cruz, both of Calif.

[73] Assignee: Grid Systems Corporation, Fremont, Calif.

[21] Appl. No.: 414,203

[22] Filed: Sep. 28, 1989

Related U.S. Application Data

[63] Continuation-in-part of Ser. No. 365,147, Jun. 12, 1989.

[51] Int. Cl.$^5$ .............................................. G06F 1/00
[52] U.S. Cl. ................... 364/200; 364/273.1; 364/273.5
[58] Field of Search ................. 371/66, 14, 16.5, 29.1; 365/222, 227, 228, 229; 364/200 MS File, 900 MS File

[56] References Cited

U.S. PATENT DOCUMENTS

| | | | |
|---|---|---|---|
| 3,286,239 | 11/1966 | Thompson et al. | 371/66 |
| 4,316,247 | 2/1982 | Iwamoto | 364/200 |
| 4,317,180 | 2/1982 | Lies | 364/900 |
| 4,317,181 | 2/1982 | Teza et al. | 364/900 |
| 4,409,665 | 10/1983 | Tubbs | 364/900 |
| 4,412,284 | 10/1983 | Kerforne et al. | 371/66 |
| 4,458,307 | 7/1984 | McAnlis et al. | 371/66 |
| 4,698,748 | 10/1987 | Juzswik et al. | 364/200 |

OTHER PUBLICATIONS

"Product Comparison," *Infoworld*, pp. 52-54, 83, 88, Jun. 3, 1989.
"82C100, 82C101," *Chips Advance Information*, Publication No. 2-100-B, pp. 1-72.

*Primary Examiner*—Michael R. Fleming
*Assistant Examiner*—Debra A. Chun
*Attorney, Agent, or Firm*—Townsend and Townsend

[57] ABSTRACT

A method and apparatus for configuring a computer in a low-power mode are provided. In the low-power mode, dynamic random access memory is refreshed by a battery powered system in order to maintain the memory contents. Low-power mode is entered by saving an interrupt mask and by disabling interrupts, followed by saving the DMA status, finishing DMA operations, and disabling DMA. After these steps, the I/O state of the machine is saved by saving various I/O registers and ports. A referesh of the memory is forced before the system refresh operations are discontinued.

19 Claims, 13 Drawing Sheets

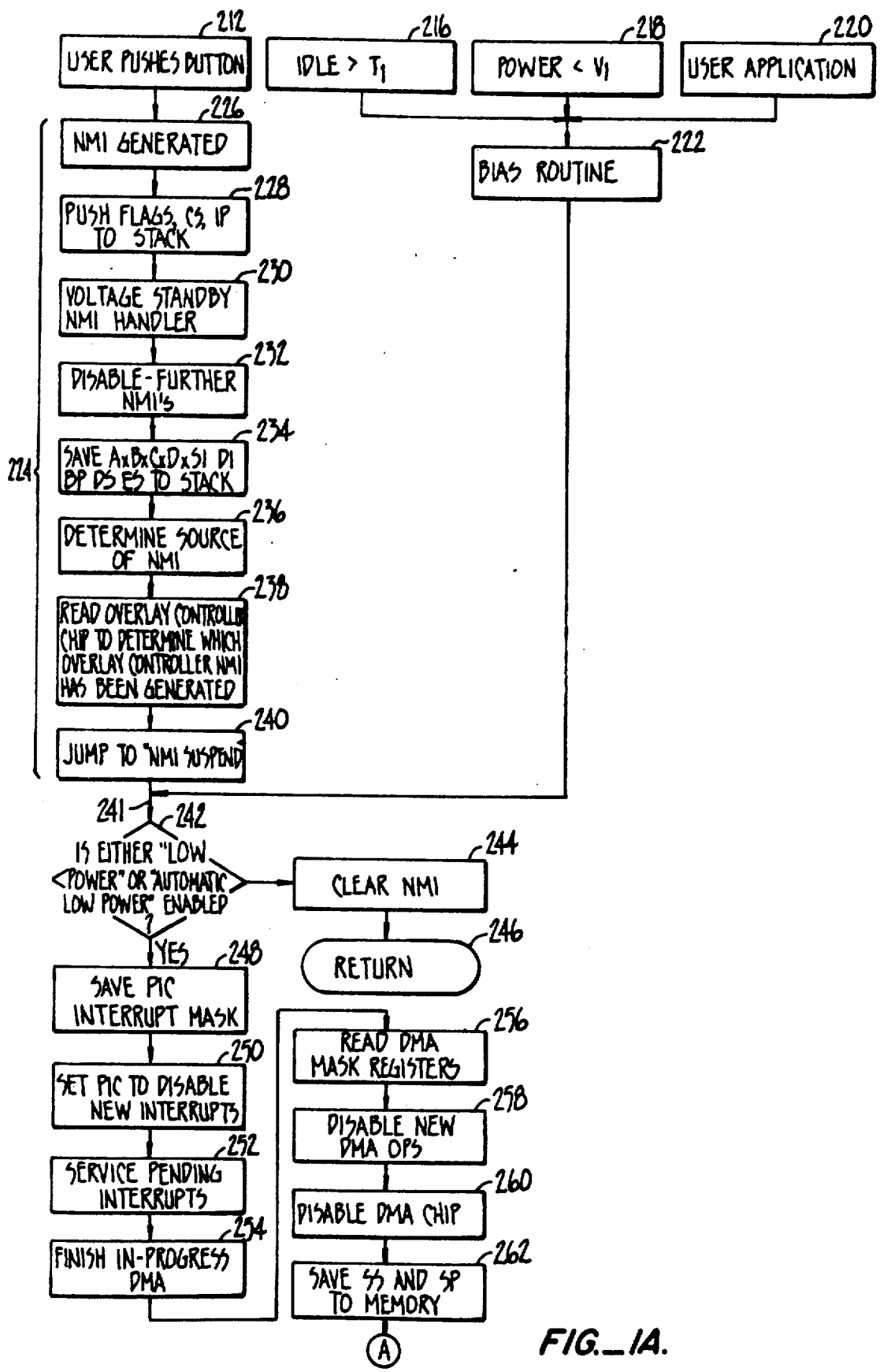
FIG._1A.

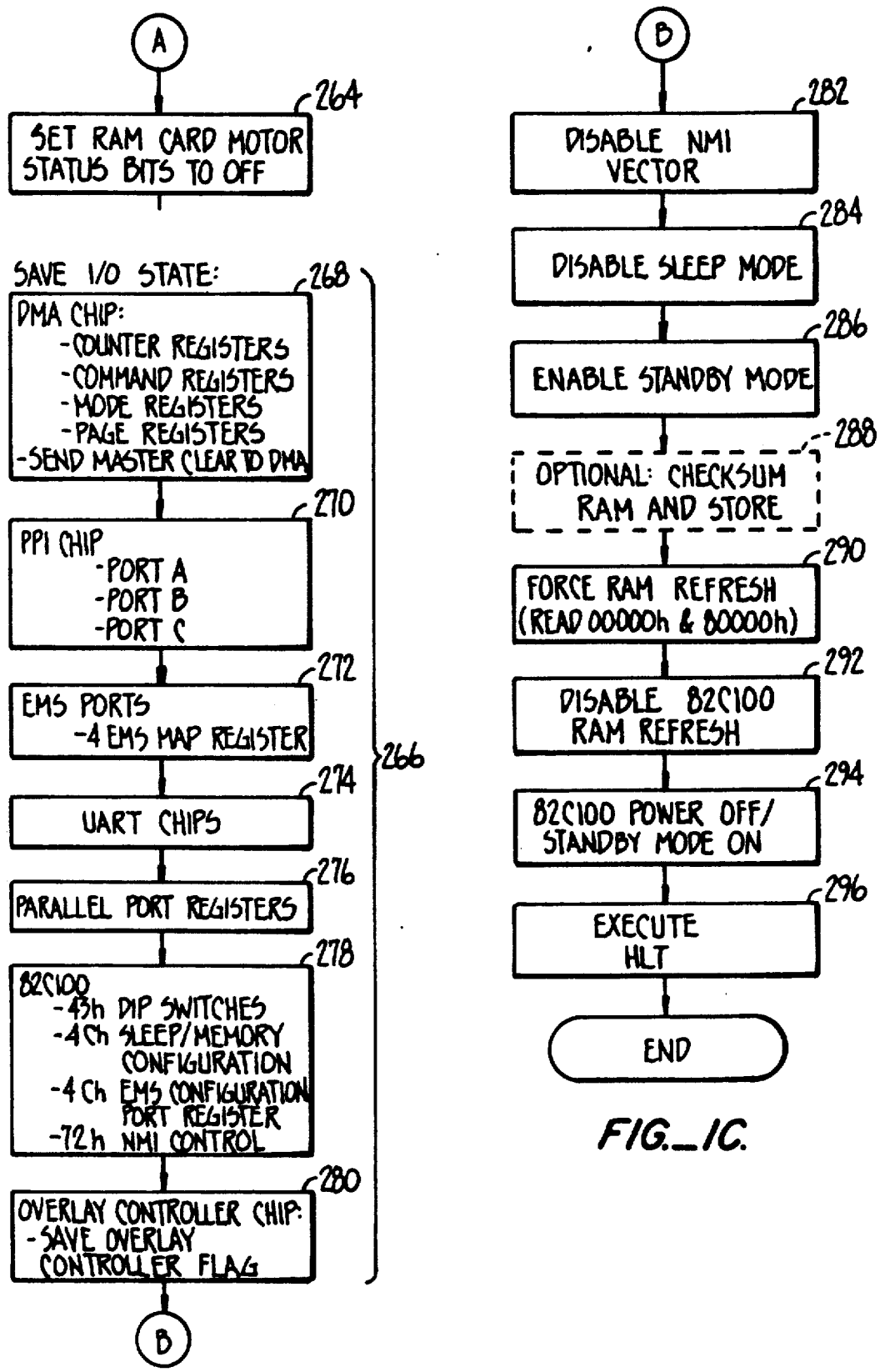
FIG._1B.
FIG._1C.

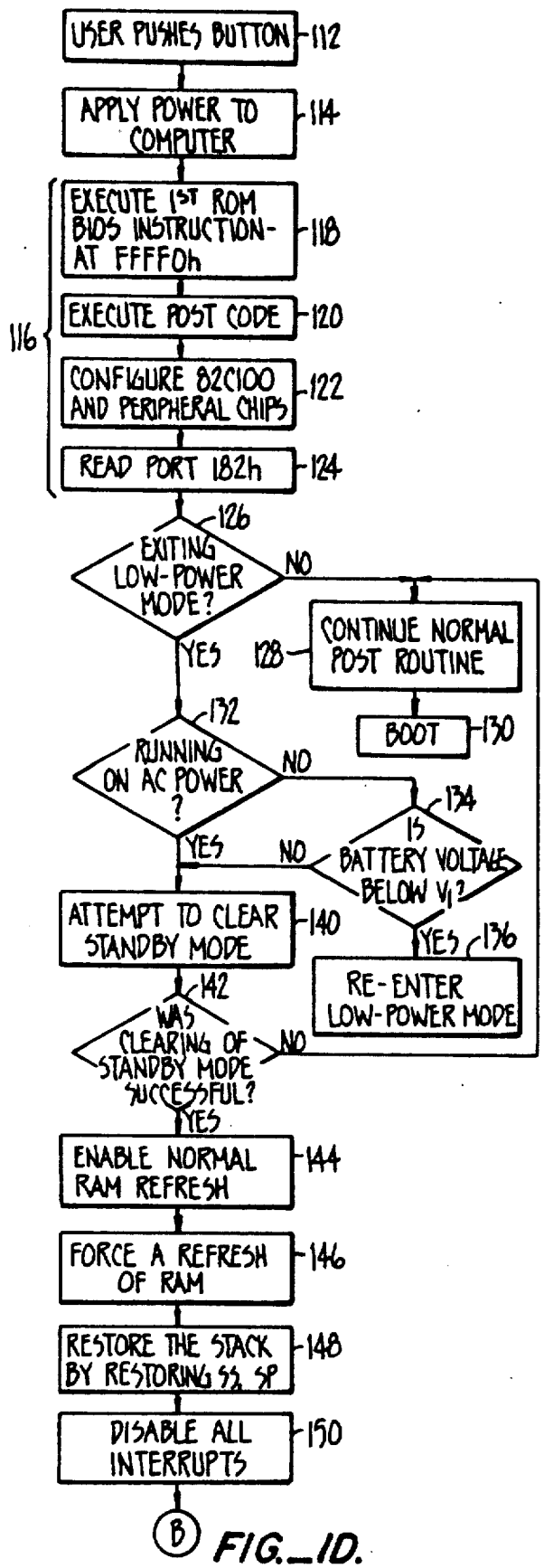
FIG._1D.
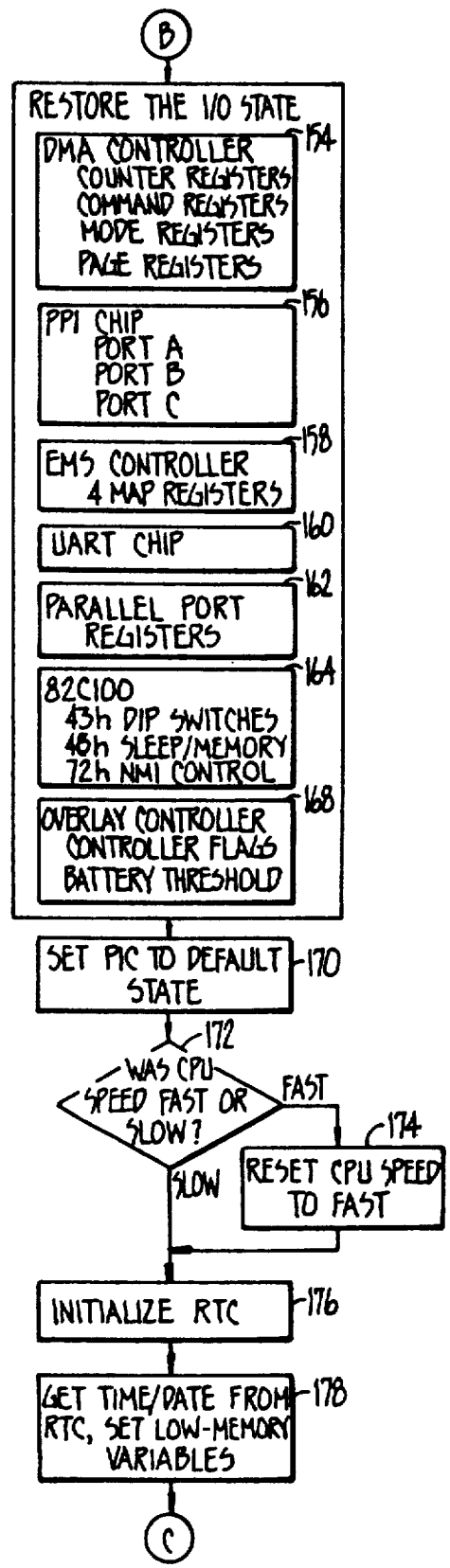
FIG._1E.

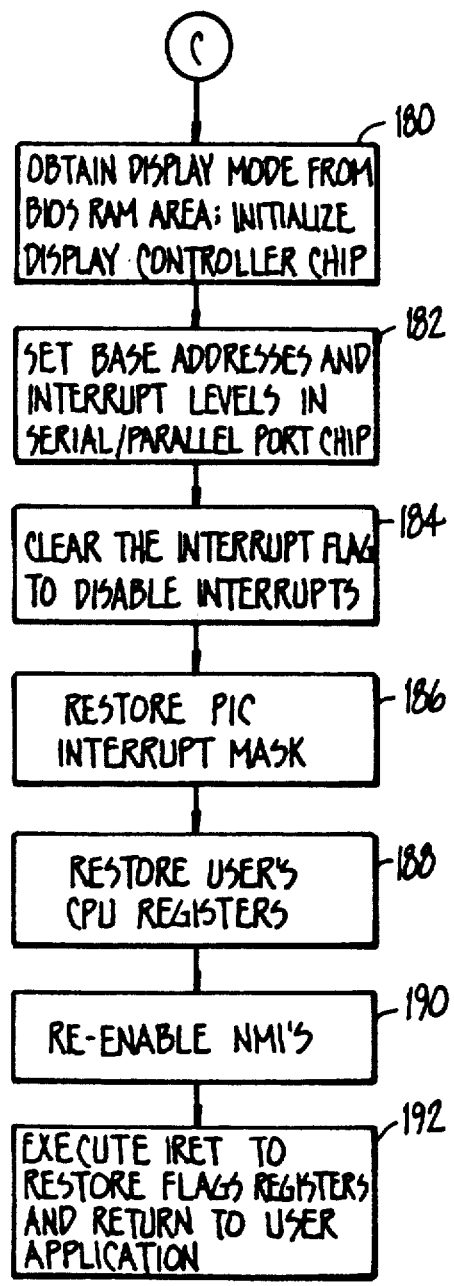
FIG._1F.

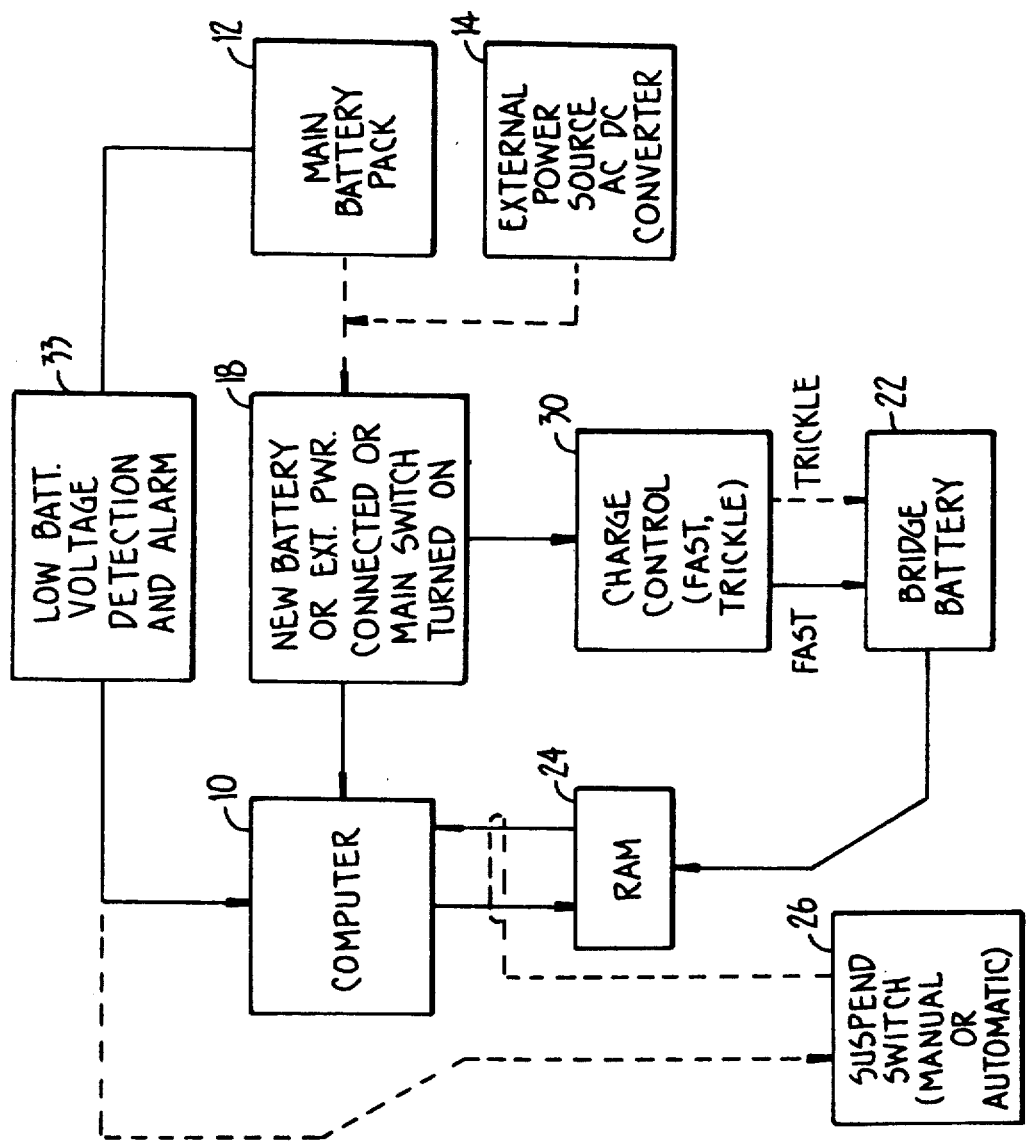

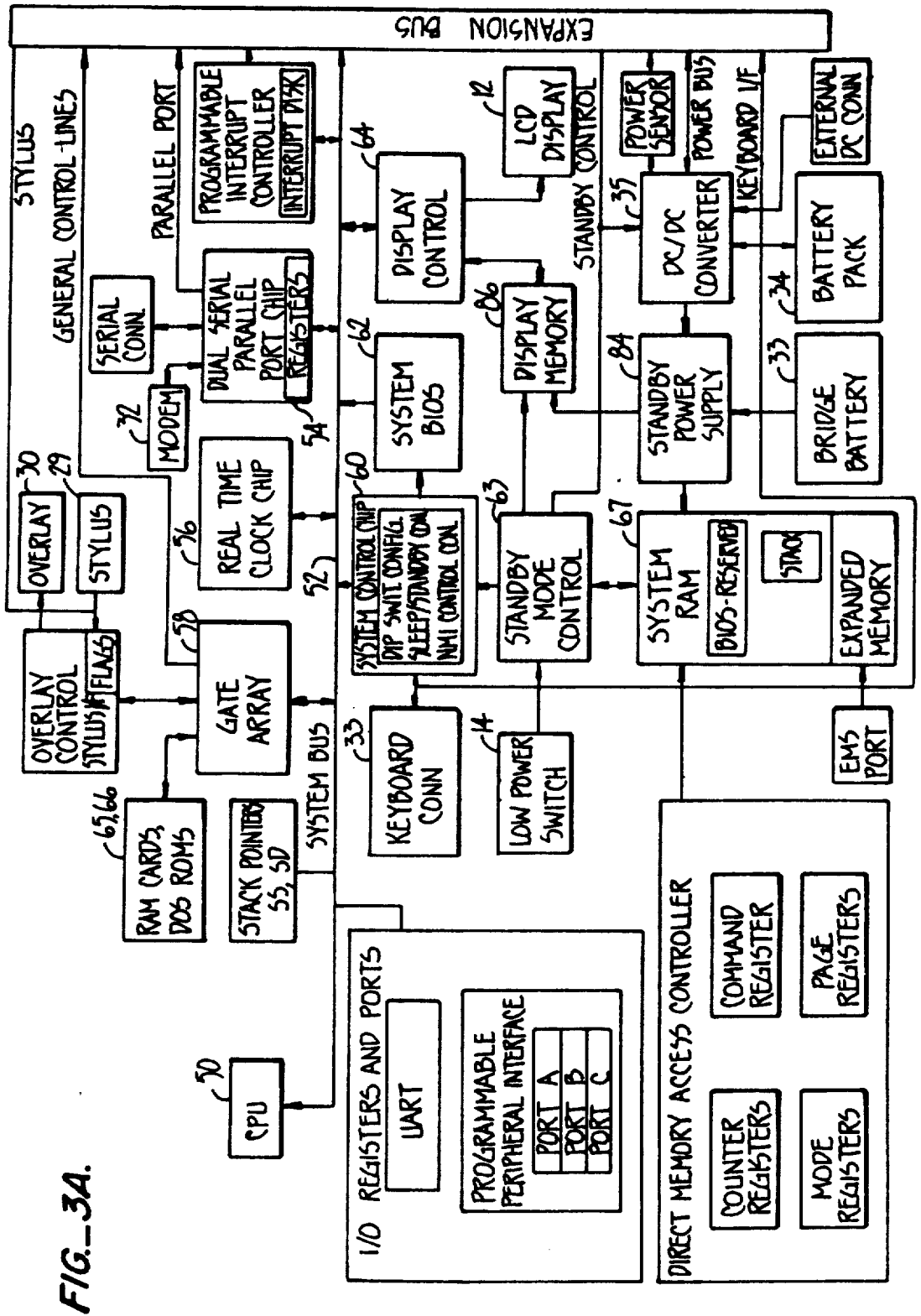
FIG._3A.

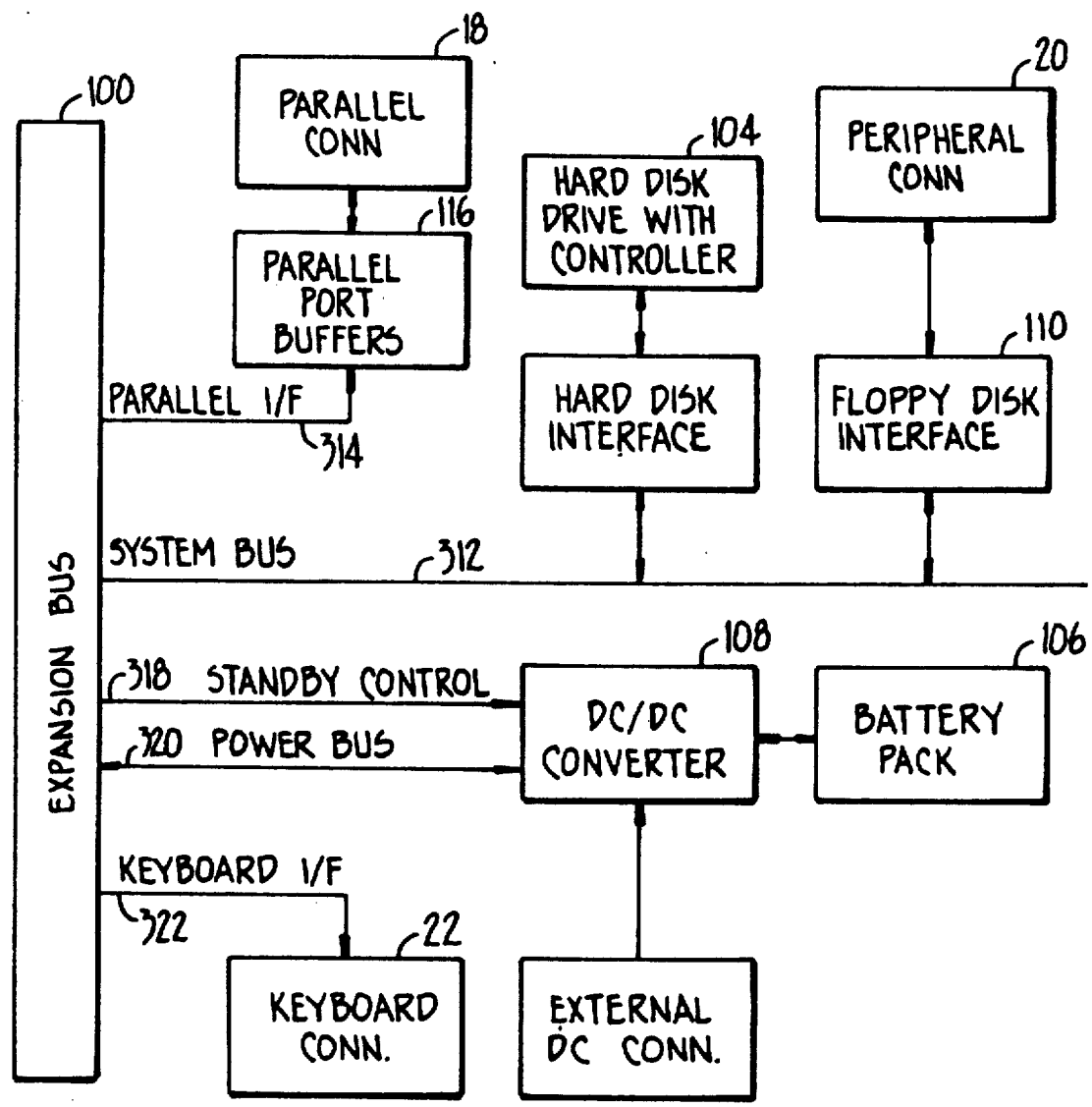
FIG._3B.

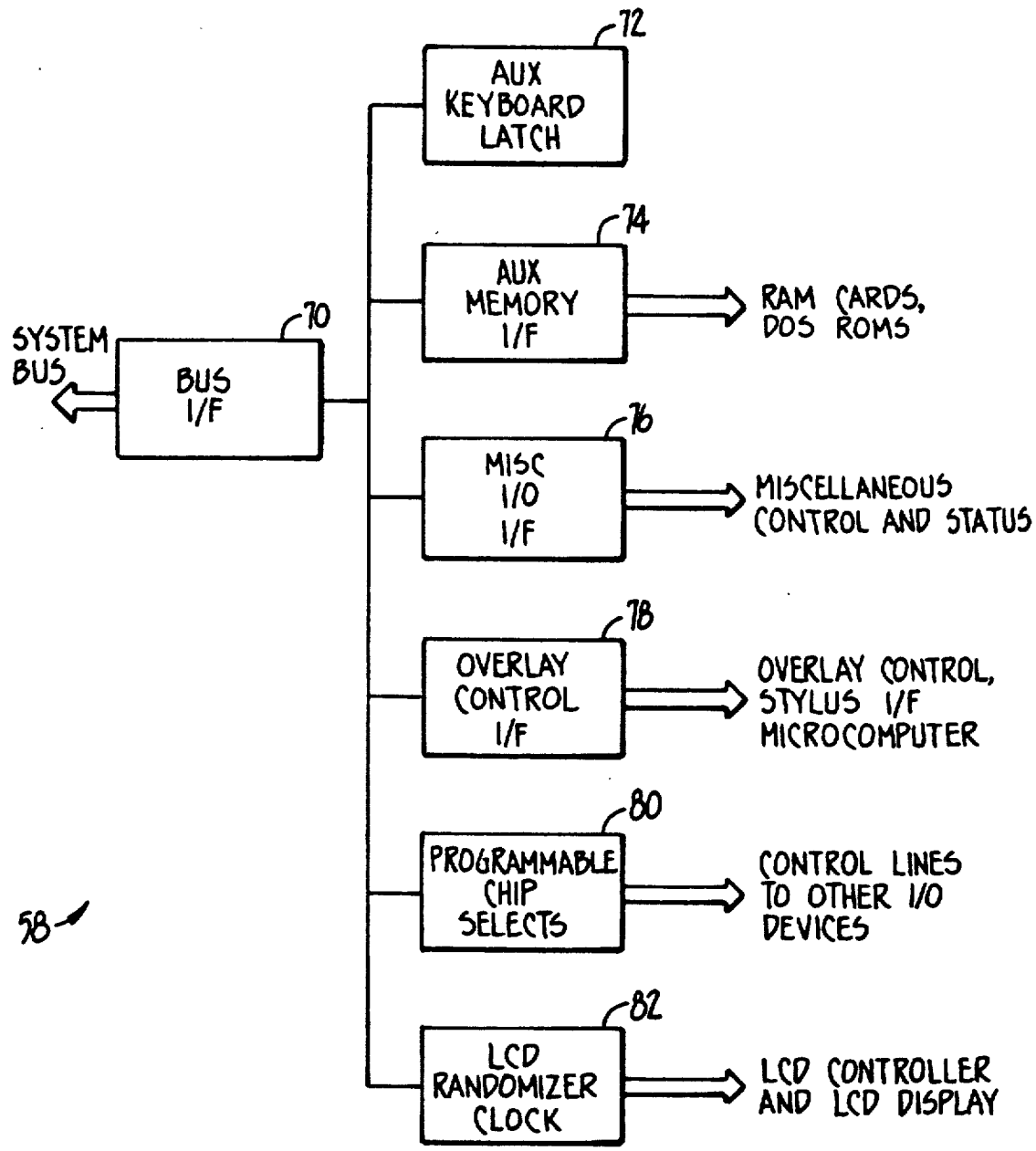
FIG._4.

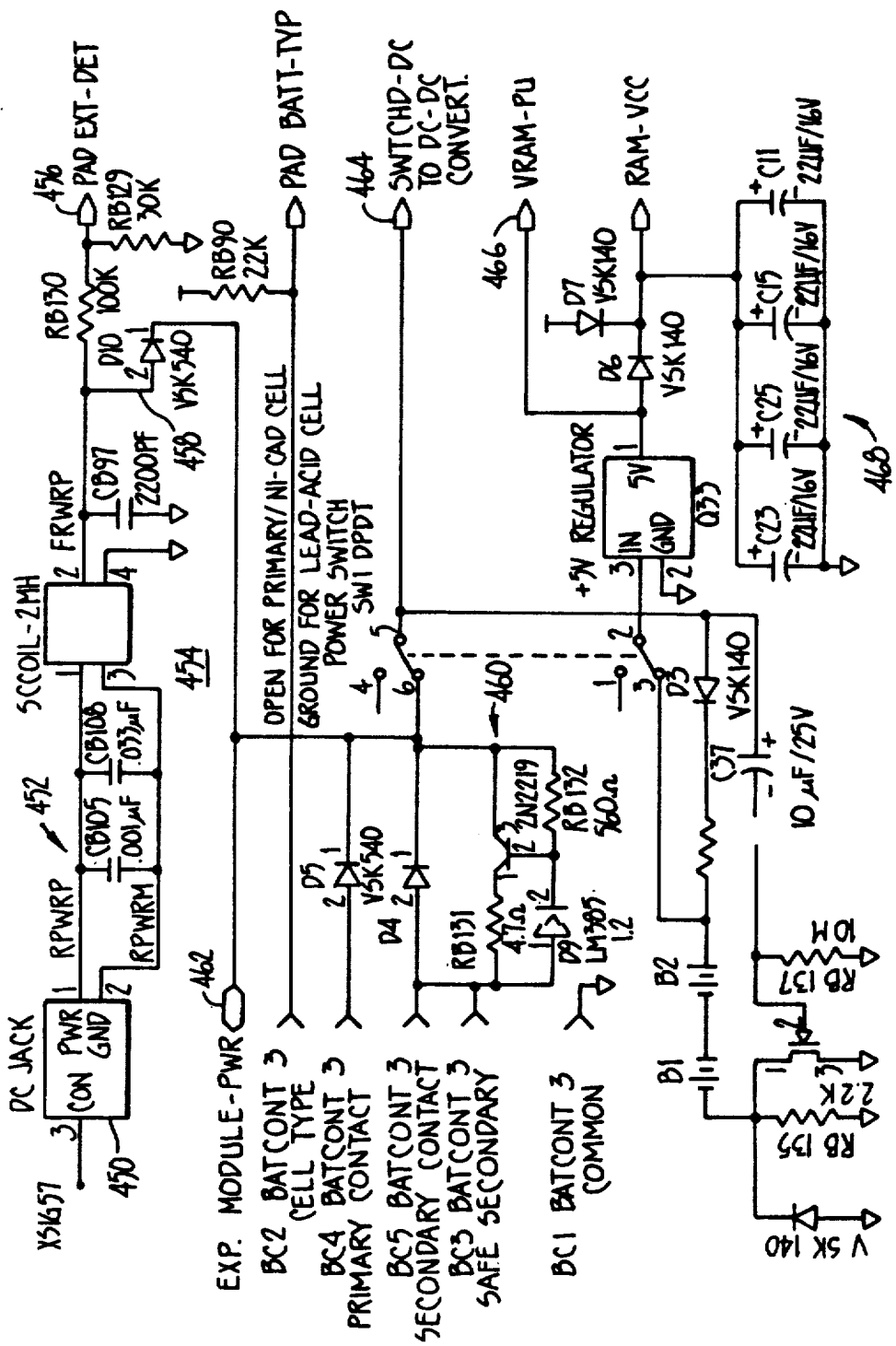
FIG._5.

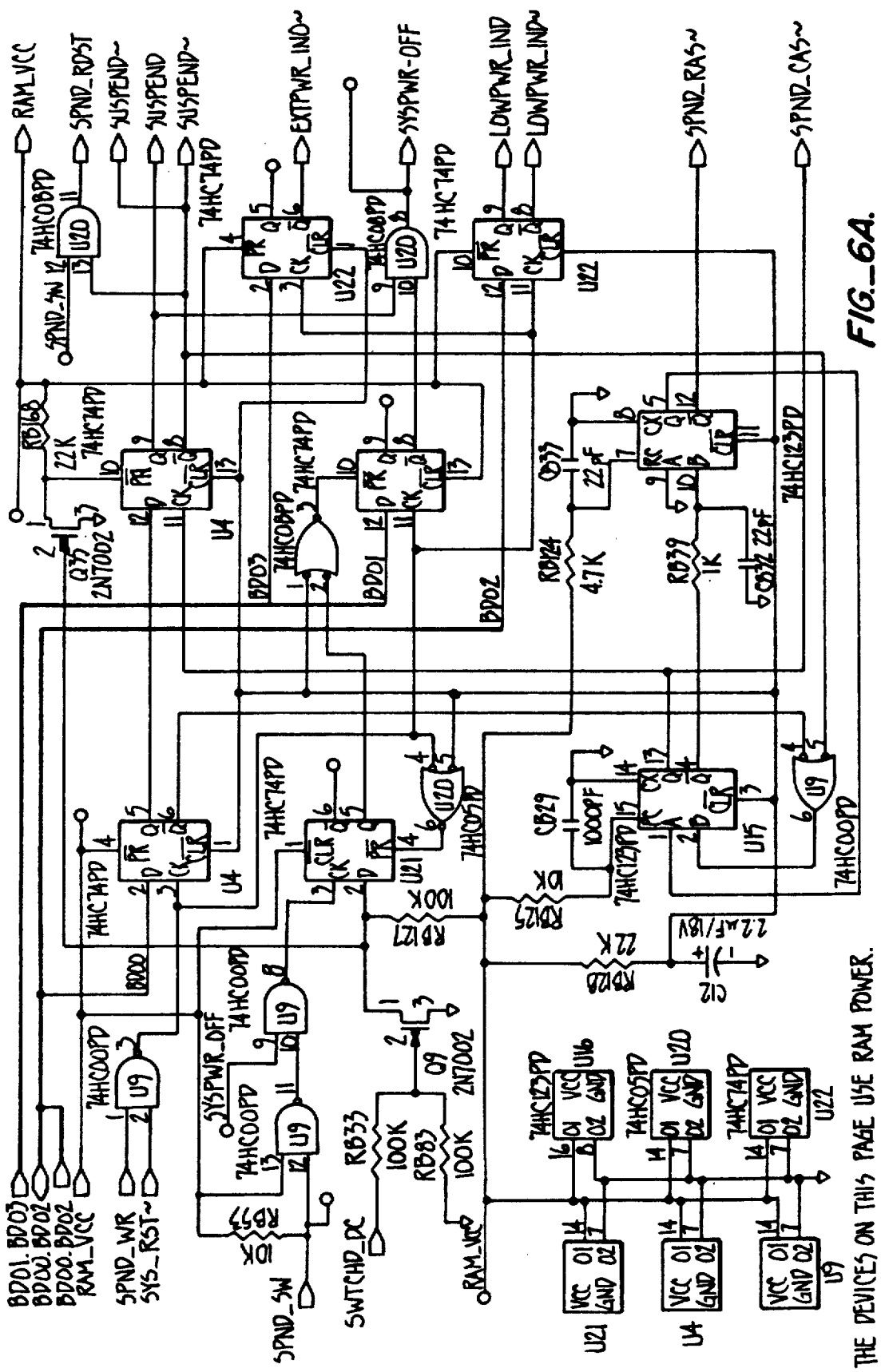
FIG._6A.

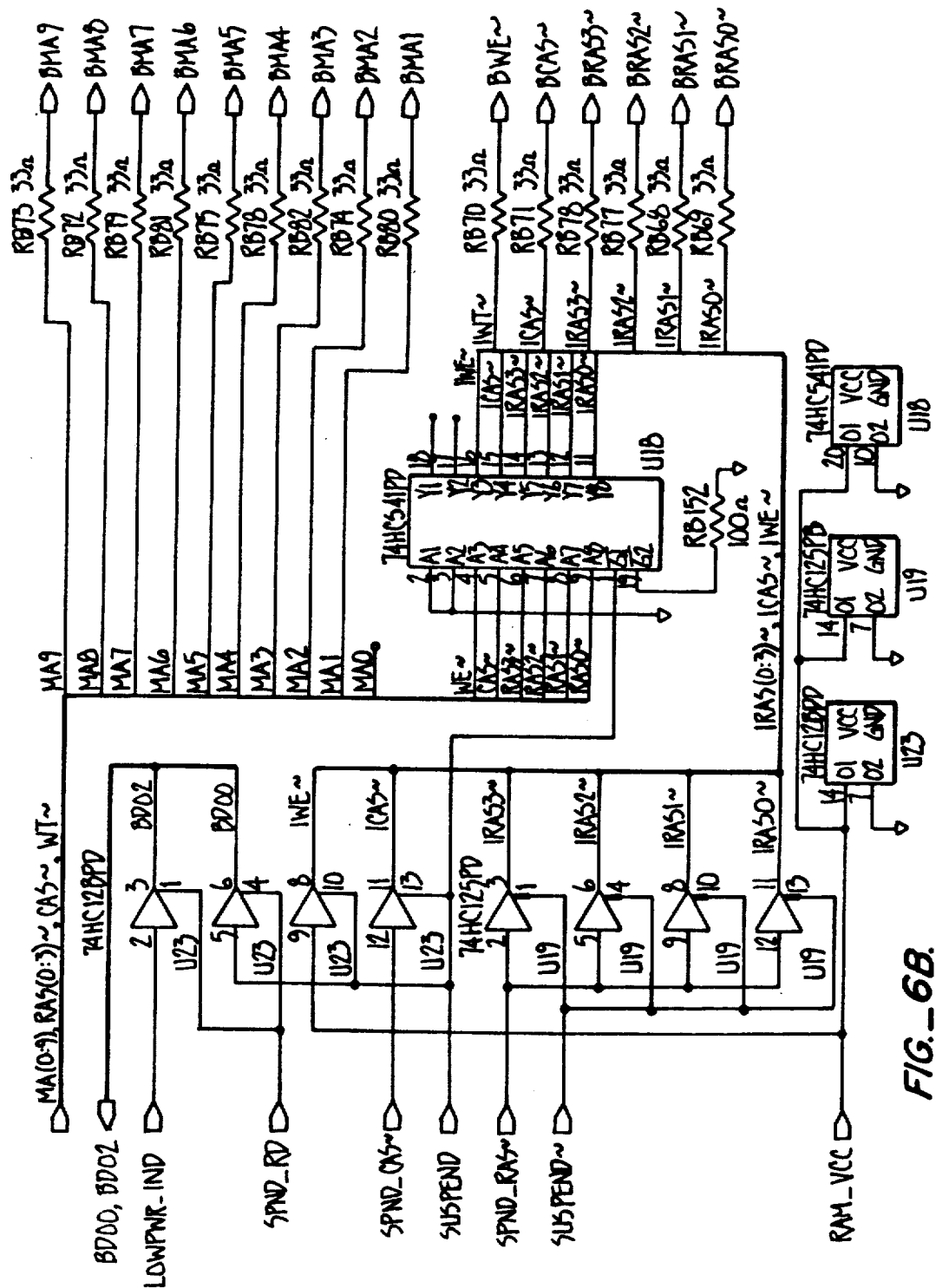
FIG._6B.

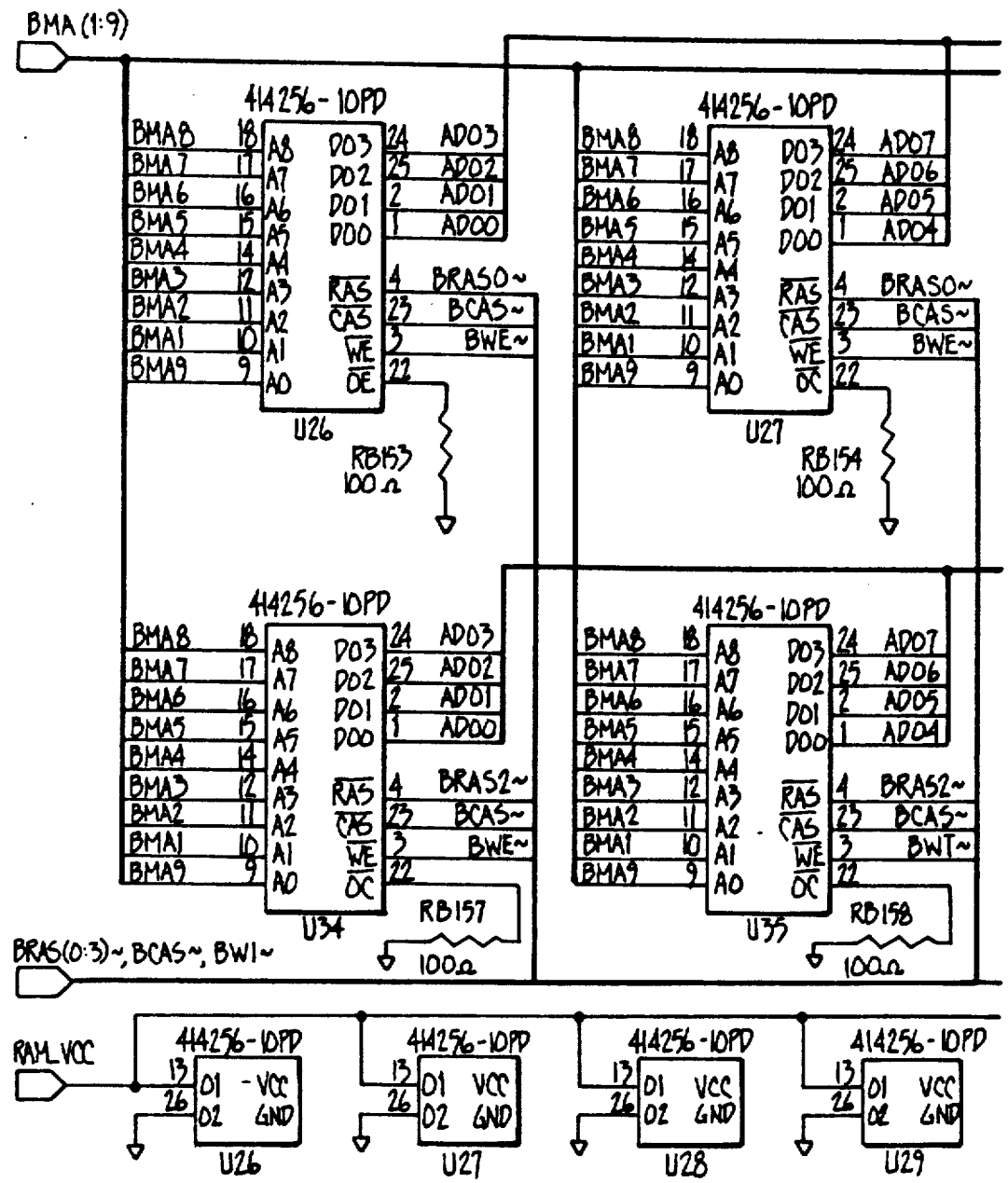
FIG._7A.
| FIG. 7A. | FIG. 7B. |
FIG._7.

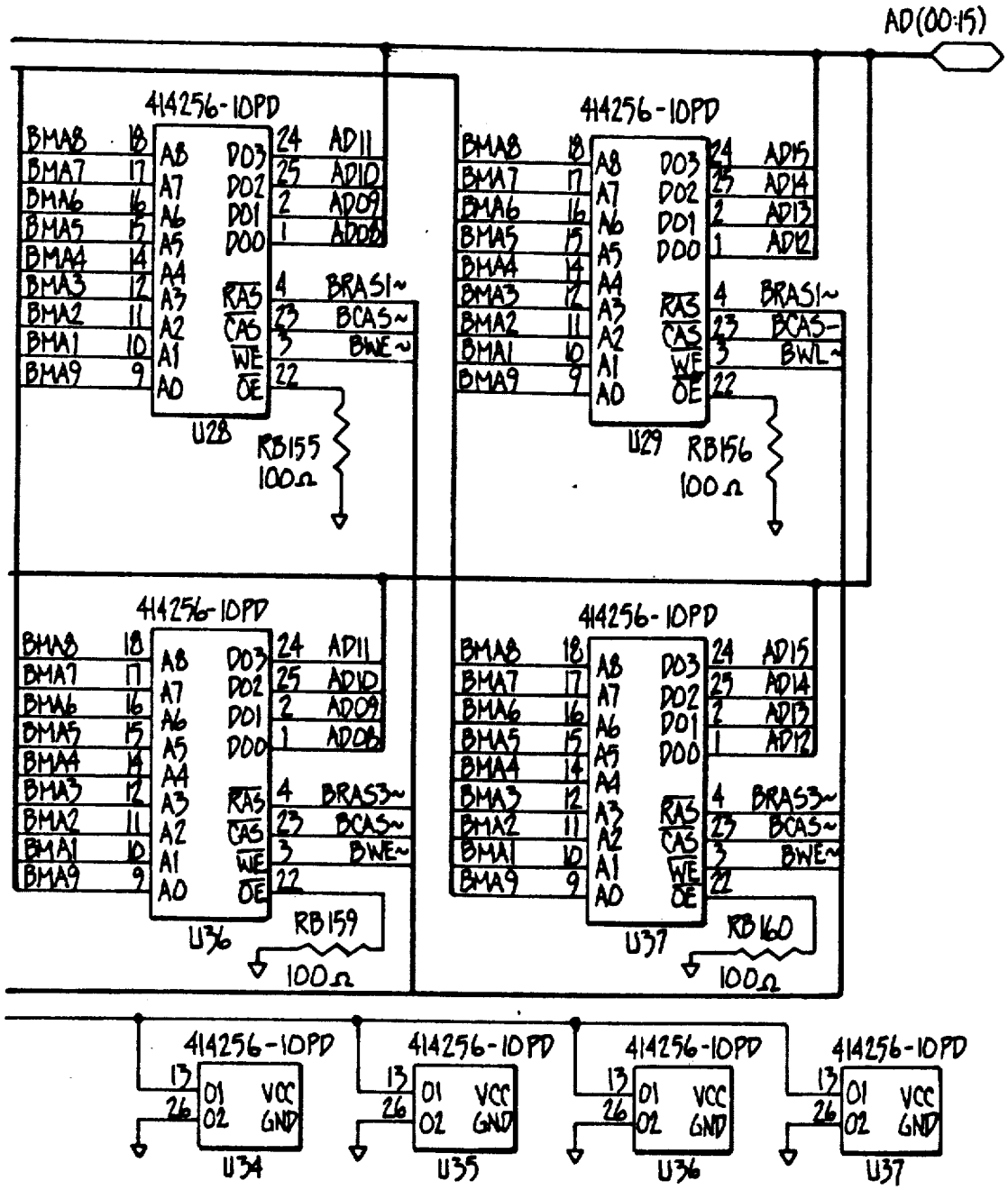
FIG._7B.

LOW-POWER, STANDBY MODE COMPUTER

This invention is a continuation-in-part of U.S. patent application Ser. No. 07/365,147, for "Hand-Held Computer," filed on June 12, 1989.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

This invention relates to computers and, in particular, to a method and apparatus for configuring a computer in a low-power, mode.

BACKGROUND OF THE INVENTION

Previous computers have been provided having a capability of suspending the CPU clock for some period of time in order to save power, such as during those periods in which the computer is not being used. This so-called "sleep" mode saves some amount of power. For example, in a device which uses about 2.67 watts of power during normal operation, sleep mode will permit such a unit to use only about 2.02 watts of power. Such sleep mode is sometimes useful in connection with lap-top or other battery-powered, or limited power-source, computers.

It would be further useful to reduce power to an even lower level. Of course, power to the computer can simply be turned off for a period. However, in this case, data and instructions which are in dynamic memory will be lost. It is possible to store data and programs in non-dynamic memory, such as static random access memory (SRAM). SRAM also has less stringent voltage requirements than DRAM, which typically must have a regulated 5-volt power supply with little deviation therefrom. This is an additional reason why SRAM is conventionally used as non-volatile memory. However, these memory devices are expensive and, perhaps of more consequence to lap-top applications, require greater volume and have greater mass than corresponding dynamic memories.

SUMMARY OF THE INVENTION

The present invention includes the recognition of the problem, namely that it would be useful to have a light-weight dynamic memory, but that such memory does not store programs and data without a source of power. When power to the computer is discontinued (to save the battery), the contents of such dynamic memory is lost. The present invention includes the recognition that users often wish to have a computer which can enter a low-power mode at some time during the course of a user application and can reenter the full-power mode in such a fashion as to permit the user to continue with his application at the point where he left off. The user wishes to have such a capability so that entering the low-power mode does not result in losing any of the data, information, programming, or other input which have been provided to the application program at the point at which low-power mode was entered.

The present invention includes a workable, practical system which permits preserving the contents of light-weight dynamic memory while the computer is otherwise turned off or powered-down. The invention provides the benefits of two technologies (previously thought to be incompatible): preserving memory during a low-power mode (previously thought to require the use of non-volatile memory, such as SRAM); and the use of relatively small, light-weight dynamic memory.

One aspect of the invention includes the provision of apparatus and devices which can be used to provide power to a DRAM as needed for refreshing the memory therein, even while the remainder of the computer is turned off or in a power-down mode. Another aspect of the invention includes the apparatus and methods by which, before entering a power-down mode, all necessary information is stored in the DRAM or other memory in such a manner that, following entry of the full-power mode, the user can continue with his computer application at the same point at which he left off.

The present invention involves providing a low-power mode, as described, which, for a device consuming about 2.67 watts during full-power use, will consume only about 0.2 watts during the low-power mode. In such a system, a battery which would have approximately a 3-hour useful life (on one charge) will, by the present invention, have a useful life of about 8 hours or longer.

The low-power memory apparatus of the present invention includes a regulated 5-volt power supply and a standby mode control device. This standby mode control device can be used to selectively supply power to the entire system, or only to the system RAM and the standby mode control device, while the remainder of the system receives no power.

The method of entering standby mode, so as to permit later full-power use without loss of data or programs, includes disabling interrupts and direct memory access operations, and, following said steps of disabling, saving I/O indicating registers and ports. The process also includes forcing a refresh of the memory prior to entering standby mode. One aspect of the invention involves determining which items must be saved to memory before entering standby mode, in order to avoid loss of needed information. Because it is contemplated that the low-power mode will be entered during a user application, and since user application might conceivably require all portions of the user-addressable (i.e., applications-addressable) DRAM, the saved items must be saved in an area other than the applications-addressable portion of DRAM. Accordingly, the present invention involves saving such items to portions of the DRAM not normally accessible to the user applications program. In particular, the invention includes saving such items to a portion of DRAM which is reserved for use by the basic input/output system (BIOS). Although a block of DRAM is reserved for use by BIOS, there are certain portions of this block that are typically not fully employed, or which may even be entirely unused by BIOS. It is into these portions that, in the preferred embodiment, the stored items are placed. However, there are only a limited number of these items. It is for this reason that it is not feasible to simply store all items which might conceivably relate to the state of the machine at the time of entering low-power mode. There is not sufficient memory in the unused portion of the BIOS-reserved block to accommodate large amounts of memory storage. Therefore, the present invention involves reducing the number of items which are stored to a point at which the necessary items can be stored in the limited unused portions of the BIOS-reserved block. In the preferred embodiment, all necessary items are stored in fewer than 48 bytes of data.

BRIEF DESCRIPTION OF THE DRAWINGS

FIGS. 1A, 1B, and 1C show a flow-diagram of a method for entering low-power mode according to the present invention;

FIGS. 1D, 1E, and 1F show a flow diagram of a method for exiting from the low-power mode according to the present invention;

FIG. 2 is a simplified schematic view in block-diagram form indicating basic operation of the battery system for a computer of the present invention;

FIG. 3A is a block diagram of the computer according to this invention;

FIG. 3B is a block diagram of the expansion module of this invention;

FIG. 4 is a block diagram of a customized gate array in the present invention;

FIG. 5 is a circuit diagram showing a main power supply of a computer, including the battery charging circuit of FIG. 2;

FIG. 6A is a circuit diagram showing driving of the DRAM clock lines;

FIG. 6B is a circuit diagram showing SPND-RAS and SPND-CAS clock signals for the DRAMS; and FIG. 7 is a circuit diagram showing use of the RAM-VCC in connection with DRAM memory.

DETAILED DESCRIPTION OF THE PREFERRED EMBODIMENT

According to the preferred embodiment, the low-power mode can be entered by one of four routes. As shown in FIG. 1A, the user can initiate the low-power mode by low-power switch 14 (FIG. 3A). Low-power mode can also be initiated when the input devices are idle for more than a predetermined amount of time 16, when the power of the power supply falls before a predetermined voltage level 18, or when a user application specifies that low-power mode is to be entered 20. The idle entry mode 16 is termed "automatic low-power" modes. In any of the last three instances 16, 18, 20, a basic input/output systems (BIOS) routine is called 22, which initiates later portions of the procedure, as shown in FIG. 1A. In the case of a user pressing the low-power switch 12, certain steps 24 are taken which are not needed in connection with the other entry modes 16, 18, 20. In the case of a low-power switch activation 12, such activation results in generation of a non-maskable interrupt (NMI) 26. The NMI causes the flag register, containing flags, such as an overflow flag, parity flag, zero flag, direction flag, and the like, as well as a code segment (CS) register and instruction pointer (IP) register, to be pushed onto the stack 28. At this point, a particular NMI handler, namely the "standby NMI handler," is activated 30. It should be noted at this point that low-power mode is occasionally referred to herein as "standby" or "suspend." This terminology is an artifact of development work. The terminology "suspend" should not be confused with "suspend" as it is used in terms of a particular mode of the 82C100 device (provided by Chips and Technologies of Palo Alto, Calif.) used as the system control chip, referred to below.

The "standby" handler results in disabling the receipt of further NMIs 32. Disabling further NMIs is useful to prevent receipt of an additional NMI while the present NMI is being attended to. This step is particularly useful in the context of the preferred embodiment which, unlike typical computers, makes frequent and active use of NMIs. In a typical previous computer, an NMI is an aberration, usually signifying a catastrophic event which must be dealt with immediately, and thus is not maskable. In the preferred embodiment of the present invention, NMIs are used on a routine basis, and thus can be expected to occur while the NMI standby handler is operating, unless they are disabled.

Following disabling of further NMIs, certain registers are saved to the stack, namely, AX, BX, CX, DX, SI, DI, DP, DS, and ES 34. The source of the NMI is determined 36. The overlay controller chip is read in order to determine which NMI has been generated 38. At this point, control passes, via a jump, to the "NMI-suspend routine" 40. Following the jump to the NMI-suspend routine, further processing is similar for all four entry modes, 12, 16, 18, 20.

There are occasions during which it is useful to prevent the occurrence of low-power mode. One instance in which "low-power" mode might profitably be disabled is when the computer is receiving information over a modem through its serial port. In such an instance, there may not be any recognition that activity is occurring because there are no keyboard entries, and there may be a long period before there is access to a disk drive or RAM card. For this reason, during such an operation, the idle entry mode 16 could possibly be activated. Accordingly, it is desirable to have a method for disabling "low-power" or "automatic low-power" modes. After entering the mainstream of the process 41, it is determined whether one of the two low-power modes is enabled 42. If neither of the possible standby modes is enabled, that particular NMI is cleared 44 and processing returns 46 to the normal instruction stream.

If either the low-power mode or automatic low-power mode is enabled, the programmable interrupt controller (PIC) is dealt with. The first step is to save the PIC interrupt mask (the PIC is typically an Intel 8259 chip or an equivalent chip) 48. The interrupt mask is saved so that it can later be restored when full-power mode is entered, in order for the user to be able to enter his application with the same interrupt priorities and capabilities as when he left his application. Following the saving of the interrupt mask, the PC is set to disable new interrupts, such as by providing a new interrupt mask which masks all interrupts 50. This is provided in order that no new interrupts will be handled by the PIC during the remainder of the entry into low-power mode. Any interrupts which are currently pending or in progress are then serviced 52.

Following the attention to the PIC, the direct memory access (DMA) procedures are dealt with. The PIC is dealt with before the DMA. The first step in dealing with the DMA is to finish all direct memory access operations which are in progress 54. This is because DMA operations cannot be readily saved in such a way that, upon reentering full-power mode, they can be resumed without loss of data. Accordingly, they are allowed to finish once they have begun. The current DMA mask registers are read 56 and subsequently new DMA operations are disabled 58. New DMA operations can be disabled by, for example, providing the appropriate mask. The DMA chip itself is then disabled 60.

Following attention to the DMA, the stack registers SS and SP (stack segment and stack pointer) are saved in memory 62. These are saved to a portion of memory other than the stack. The stack pointers cannot be saved on the stack since the stack pointers define the stack.

In the preferred embodiment of the present invention, storage that would normally be made (in other computers) to disk is, instead, made to a RAM device which is configured to emulate a disk. Part of the emulation involves the status bits which correspond to bits that would normally be used in connection with a disk drive. One of these bits is the motor status bit. This bit is set to an off configuration 64. The purpose of setting the bit in this manner is so that the RAM cards will be powered-up during their next operation.

A number of I/O state-defining registers and ports are then saved to memory 66. Although these items can be stored in any order with respect to each other, they should be stored following the PIC and DMA operations described above. In the preferred embodiment, certain registers from the DMA chip, namely the counter registers, command registers, mode registers, and page registers, are saved. After these saves, a master clear command is sent to the DMA 68. Next, three ports of the programmable peripheral interface (PPI) chip have their contents stored 70. For the four map registers of the extended memory specification (EMS) device are stored 72. The contents of the universal asynchronous receive/transmit (UART) chip 74 are stored. The registers of the UART which are saved are the byte format, at 2FBh/3FBh; modem control at 2FCh/3FCh; line status at 2FDh/3FDh; modem status at 2FEh/3FEh; interrupt enable at 2F9h/3F9h; divisor (least significant byte) at 2F8h/3F8h, and divisor (most significant byte) at 2F9h/3F9h registers. The contents of the parallel port registers are stored 76, namely, the data latch at 378h and the printer control register at 37Ah. Certain registers of the system controller chip are stored, specifically register 43H, indicating the conditions of the DIP switches, register 4Bh, designating the sleep/memory configuration, register 4Ch, the EMS configuration port register, and register 72h, signifying the NMI control status, are saved 78. The overlay controller FLAGs of the overlay controller chip are saved 80. Following saving of the I/O state 66, the NMI vector feature is disabled. The NMI vector feature is a feature of the 82C100 system controller chip, produced by Chips and Technologies, Inc., of San Jose, Calif., which substitutes certain entry addresses for interrupt handlers. The reason for disabling this feature is that if check-summing is used, the addresses which might otherwise be substituted will be correctly check-summed. Thus, disabling the NMI vector feature 82 is not necessary if no check-summing is to be done.

In the next stage, the sleep mode of the 82C100 is disabled 84. The 82C100 is configured such that, upon execution of a halt or "HLT" command, it will enter one of two modes, a "sleep" mode or a "standby" mode. As noted above, the 82C100 standby mode is not to be confused with the low-power mode being described in the present invention. It is desired to disable the sleep mode so that, as noted below, when the HLT command is entered, the sleep mode will not be entered but, rather, the standby mode will be entered. Next, the standby mode of the 82C100 is enabled 86, for the reasons discussed above.

If check-summing is desired, it is preferably done at this point 88. Preferably, the entire RAM is check-summed if check-summing is to be used. This involves check-summing all conventional RAM (00000h-9FFFFh), video RAM (B8000h-BFFFFh), and EMS RAM. One 16-bit check sum is produced for each of these three portions of memory. If check summing is done, the check sums are stored in battery-backed CMOS, rather than DRAM. In the presently preferred embodiment, check summing takes a time period considered too long (about 5 seconds), and is, therefore, not done. However, check summing can be used as a part of this invention if desired.

Following the check sum, if any, the RAM is forced to undergo a refresh. DRAM must be refreshed with a period between refreshes which does not exceed the manufacturer-specified maximum inter-refresh period. Because a certain amount of time is required to enter low-power mode, and because it is not known at this point how long it has been since the RAM has been refreshed, a RAM refresh is forced at this point. This will help to ensure that the manufacturer-specified inter-refresh period is not exceeded. The RAM refresh is forced 90 by performing 512-word reads at 00000h and at 80000h.

Following the forced refresh 90, the 82C100 is set to disable the normal RAM refresh 92. Immediately thereafter, the 82C100 is set to a "power off" state and "standby mode on" state. These settings are preferably done simultaneously or immediately consecutively 94. Thereafter, an "HLT," or halt instruction, is executed 96, which causes the 82C100 standby mode to be entered.

Operation upon return to the full-power mode is illustrated in FIGS. 1D-1F. In the preferred embodiment, the only mode for entry of the full-power mode is by the user pushing the low-power/full-power button 112. Other modes, such as entry of full power after a predetermined time interval, are possible. Pushing of the button causes power to be applied to the computer. Initially, the computer follows the same steps 116 as if the computer were being powered-up from an off-state, rather than from a low-power state. The first ROM BIOS instruction is executed, normally at address FFFF0H 118. This results in execution of the power-on self-test (POST) code 120. The 82C100 is configured into an initial configuration, and peripheral chips may also be configured at this time 122. Port 182h is next read 124. Port 182 contains information from which it can be determined whether the computer is exiting from the low-power mode or is being powered-up from an off-state 126. If the computer is not exiting from the low-power mode, it continues the normal POST routine 128, followed by the BOOT routine 130.

If the computer is exiting a low-power mode, it is next determined whether the computer is currently running on AC power 132. If the computer is not running on AC power, the battery voltage is checked. If the battery voltage is below a predetermined voltage $V_1$ 134, the computer is caused to reenter the low-power mode 136, using methods similar to those described above. If the computer is running on AC power, or if the battery voltage is sufficiently high, an attempt is made to clear the 82C100 standby mode 140. Next, it is determined whether such attempt to clear the standby mode was successful 142. If the attempt was not successful, it is not possible to recover the user application and, therefore, normal POST routine processing is continued 128, followed by a BOOT operation 130. If the clearing of the standby mode was successful, operations are undertaken to restore the user application. The normal (system) refresh is enabled 144. Immediately thereafter, a refresh of the memory is forced 146. As noted above, the refresh counter in the system controller chip (used for normal or system operation refresh) is not synchronous with the refresh counters in the DRAM chips (described below), which are used during the low-power mode. Therefore, the system CPU must generate complete refresh counts within the manufacturer-specified minimum refresh time after exiting standby mode, in order to ensure the maintenance of the data within the DRAMs. Typically, the manufacturer-specified minimum refresh period is about 4 milliseconds.

Next, the stack is restored by restoring the stack pointers SS, SP 148. The interrupts are disabled 150 by setting all interrupt mask bits. This is done in order to prevent new interrupts being received before the system is configured to the status of the user application before entry of low-power mode. Next, a number of I/O state defining registers and ports are restored 152. These can be restored in any order. In the preferred embodiment, the DMA controller registers are restored, including the counter registers, command register, mode registers, and page registers 154. The three ports, port A, port B, and port C, of the PPI chip are restored 156. The four map registers of the EMS controller are restored 158. The contents of the UART chip are restored 160. The registers of the parallel port are restored 162. Certain registers of the 82C100 controller chip are restored, namely the register at 43h, containing indications of the dip switches, the register at 4bh, indicating the sleep/memory configuration, the register at 4Ch, indicating the EMS configuration port, and the register at 72h indicating the NMI control configuration 164. The overlay controller FLAGs are restored, and the battery threshold value is resent to the overlay controller chip 142. The battery threshold value, V2, is the value of battery voltage at which a warning light is lit to indicate a first level of low voltage. The PIC is set to a default state 144. It is not possible to restore the PIC to a saved state because some of the PIC control registers are write-only, and thus cannot be read and saved upon entry of low-power mode. However, the PIC configuration is normally not reset by user applications and, accordingly, since it is always maintained in the same state by configuring a PIC to its default state 144, it will be in the state in which it normally is upon entry of low-power mode.

If the CPU speed has been changed from its default state prior to entry of low-power mode, this fact would be reflected in information stored in battery backed-up CMOS RAM. This information is read from the CMOS RAM to determine the state of the CPU speed when low-power mode was entered 146. If the state was the default or slow state, no action is taken. If the CPU had been changed to the fast speed, the CPU is now reset to fast 148.

The real time clock (RTC) is initialized 150, and the time and date are obtained from the real time clock. The new time and date are set in low memory variables because the BIOS time did not elapse while the computer was in the low-power mode 152.

When the display mode of the computer is changed, this fact is reflected in information stored in the BIOS RAM area. Accordingly, this information is retrieved from BIOS RAM, and the display controller chip is initialized to the state it was in when low-power mode was entered 154. The base addresses and the interrupt levels in the serial/parallel port chip are set 156. The interrupt FLAG is cleared in order to disable interrupts 158. Next, the programmable interrupt controller interrupt mask is restored from memory 160. The user's CPU registers are restored 162. NMIs are reenabled 164. Finally, an IRET command is executed, which results in restoring the FLAGs register, CS and IP, and in returning to the user application 166.

As shown in FIG. 2, a computer 10 is normally connected to a main battery pack 12 or, in the alternative, an external power source 14. Both the main battery pack 12 and the external power source 14 can be removed or can fail. For field use without main battery recharging, the main battery pack 12 has to be replaced with a freshly charged battery pack at certain intervals. A "bridge" battery 22 is shown connected to the computer. This enables the computer 10 to continuing operating without interruption when the battery is changed. In order to charge the bridge battery 22 while the main switch is on (including connection of external power when the battery is low), or if the main switch is turned on while a charged power source is available (as indicated in block 18), a fast charge is applied to the bridge battery for a short period, for example, 3 minutes. A charge control circuit 30 effects the fast charge. FIG. 1 shows the bridge battery 22 supplying temporary power only to RAM 24 of the computer 10. All active programs and data preferably are unloaded to RAM 24, via the manual or automatic low-power switch 26, when the battery needs to be replaced or goes too low to operate the computer.

FIG. 3A is a block diagram of the major components of computer 10. References in FIG. 3A to "standby" mean the low-power mode, rather than the 82C100 standby mode. Internal modem 32 is a 2400 baud MNP model manufactured by U.S. Robotics. The optional external keyboard is an IBM XT compatible keyboard.

Computer 10 may receive power from a battery pack 34 or from a standard AC source converted to DC through an external AC/DC converter, such as a 17.25 volt, 1.25 amp unit built by Tamura, attached through an external jack. The computer's battery compartment may be configured as disclosed in copending application Ser. No. 07/364,921, entitled "Battery Compartment," assigned to the same assignee as the present invention and incorporated into this application by reference. Computer 10 has been designed to minimize power requirements, thereby minimizing the size of the battery needed. One example of the power minimization is the use of low-power mode.

Battery pack 34 may be rechargeable as disclosed in copending application Ser. No. 07/364,920, entitled "Externally Rechargeable Battery Pack For A Computer," assigned to the same assignee as the present invention and incorporated into this application by reference. A bridge battery 33 may also be provided for allowing the main computer battery to be removed and replaced without turning off the computer. This bridge battery may be configured as disclosed in copending application Ser. No. 07/364,950, entitled "Computer With Provision For Continued Operation During Battery Change," assigned to the same assignee as the present invention and incorporated into this application by reference. An 8-watt, three output DC/DC converter 35, such as that manufactured by ITT, is used to set the system voltage to the appropriate level.

The computer's internal memory consists of removable RAM cards 65; system ROM 66 (shown schematically); and system RAM 67 (shown schematically). The memory cards 65 contain software specific to the computer's application. Memory cards 65 are preferably Epson IC memory cards with an 8 bit data bus and 40-pin card edge connectors. Each has a small battery associated with it to maintain data for six or more months without drawing on the main unit power. Memory cards 65 may be made in accordance with the disclosure of the copending application Ser. No. 07/364,922, entitled "Memory Card With Removal Tab," assigned to the same assignee as the present invention and incorporated into this application by reference.

The use of memory cards 65 in place of a conventional hard disk drive is another size and weight minimizing feature of this invention. Firmware is provided with computer 10 to cause the memory cards to emulate a disk drive, thereby making computer 10 compatible with conventional PC software without using a heavy and bulky disk drive.

System ROM 66 contains standard system program instructions such as MS-DOS. Preferably, system ROM 66 consists of two 27C010 type, 128k by 8 bit EPROM's, but mask ROM types may be used instead. The two ROM chips are disposed in EPROM/ROM sockets on the main logic board 28. In the preferred embodiment, system RAM 67 consists of eight 256K×4 dynamic RAM's.

A microprocessor or CPU chip 50 is connected to the other components via a standard system bus 52. In the preferred embodiment, microprocessor 50 is an OKI MSM80C86A10RS 16-Bit CMOS microprocessor. Also connected along system bus 52 are a dual serial/parallel port chip 54; a real time clock chip 56; a customized gate array 58; a system control chip 60; a customized system BIOS 62; and a display controller 64.

In the preferred embodiment, serial/parallel port chip 54 is a Chips and Technologies 82C605 CHIPSport multifunction controller. Real time clock chip 56 is a Dallas Semiconductor DS1287A chip. Preferably, system control chip 60 is a Chips and Technologies 82C100 Super XT system controller, and display controller 64 is a Yamaha PCDC V6366 Panel and CRT display controller. System control chip 60 provides all the core logic required to implement an XT compatible system board, including: a system clock; bus controller; DMA controller; interrupt controller; timer; parallel peripheral interface; keyboard interface; memory interface; input/output channel interface; extended memory system; power management control; clock switching logic; input/output channel timing control; and clock conversion logic.

The purpose of gate array 58 is to reduce the chip count and to provide an efficient bus interface for the specialized input/output devices with which computer 10 is used. Gate array 58 uses the control signals, address and data bits provided by the system core logic to allow access to the internal control registers of gate array 58 as well as to the peripherals to which it is attached. Gate array 58 is addressed through input/output ports on system bus 52, though the peripherals may be addressed as memory.

A block diagram of the customized gate array chip 58 is shown in FIG. 4. A standard bus interface and internal decode block 70 communicates with system bus 52. Connected to interface 70 are an auxiliary keyboard block 72; an auxiliary memory interface block 74; a miscellaneous input/output interface block 76; an overlay processor interface block 78; a programmable chip select block 80; and an LCD randomizer clock block 82.

Auxiliary keyboard block 72 provides a standard 8-bit latch as is known in the art. It connects to the hardware pertaining to the keyboard emulation program as explained below.

Auxiliary memory interface block 74 provides buffers and control ports to allow access to removable storage cards 65 and non-removable system ROM 66. Interface 74 is a paged interface with a 64k page size and a data bus 8 bits wide. Only one of the four devices (i.e. the two RAM cards and the two ROM's) may be accessed at a time. To select a device, the program sets the appropriate bit in the Auxiliary Memory Select Port. A Status Port is provided to allow determination of storage card type and presence. A Page Register Port is used to select the active 64k byte page in the selected device.

The miscellaneous input/output block 76 provides eight general purpose input pins and eight general purpose output pins. Block 78 provides an 8-bit buffer for bidirectional data transfer between two processors and interrupt/data available status bits in both directions. The processors utilize this resource through a simple protocol.

The programmable chip select block 80 provides 10 pins that can be used as input/output or memory decodes. The LCD randomizer clock block 82 provides a pseudo-random AC signal to the LCD. The logic in this block divides the clock from the LCD controller 64 by 68 and changes its phase every 289 clocks.

System BIOS 62 consists of two EPROM's. It is a standard IBM-compatible Input/Output System that has been modified to include program steps for three key systems: (1) the computer's disk drive simulation; (2) the computer's low-power mode; and (3) the computer's keyboard emulation system.

The use of memory cards 65 in place of a disk drive saves space in, and reduces the weight of, computer 10. In addition, the RAM memory cards are faster than a disk drive and are more durable since they have no moving parts. The two MS-DOS ROM's 66 are concatenated by the BIOS 62 into one virtual disk device. Thus, the system emulates three floppy disk drives.

The low-power mode may be started in one of four ways: (1) by pressing a standby key on the face of the computer; (2) by opening the bus connector door on the bottom of the computer housing; (3) by system timeout, i.e., by leaving the computer inactive for a preselected period of time; or (4) by the detection of low battery voltage by the overlay control interface block 78 of the gate array 58. Any one of these four events triggers an interrupt signal in the CPU 50. The CPU 50 then disables all other interrupts. After waiting for all pending input/output operations to finish, the CPU saves the system state in system RAM 67.

The CPU reads the lowest 512 words of both banks of the system memory to insure the refresh count. The CPU then disables the system RAM refresh, sets the standby refresh on, and turns the main power off. A standby power supply (element 84 in FIG. 3A) maintains voltage to system RAM 67 and display RAM 86.

Standby mode may be exited only by activating the standby switch on the face of the computer 10. When the main power supply returns, the CPU tests a standby status indicator. If the CPU detects that the system was in standby mode, the CPU shuts off the standby mode refresh and restarts the system refresh. The CPU reads 512 words of both system RAM banks to insure refresh. The CPU restores the system state as read from the system RAM, enables interrupts, and returns to the process it was executing prior to entering the standby sequence.

FIG. 5 shows main PC board power supply circuitry for a computer 10. Starting from the top of the circuit diagram of FIG. 6, a DC input jack 50 leads through noise-filtering circuitry 52 and a common mode transformer 54 to an ORing diode D10. A detector 56 detects when an external power source is connected at 50, as opposed to a battery.

A line 58 leads down to the main power circuitry, which is diode ORed in with the batteries—primarily cells (e.g., alkaline battery cells) at BC4 or NiCad battery cells at BC5. The diode ORing is accomplished by diodes D10, D5, and D4, and it ORs all three power sources, i.e., primary cells, NiCad cells, and the external source. The circuit will always use the external source, through the diode Oring, when the external source is connected, since it is a higher voltage source than either type of battery.

A circuit 60, shown in FIG. 6, and comprising Q27, R8132, D9, and RB 131, shunts D4. This is the circuit for charging the battery if it happens to be the NiCad rechargeable battery. The contacts BC1-BC5 are in a battery compartment which may be configured in accordance with the disclosure of copending application Ser. No. 07/364,921, entitled "Battery Compartment," assigned to the same assignee as the present invention and incorporated herein by reference.

The main power switch SW1 is a double pole, double throw (DPDT) switch. When the main switch is closed, it connects the battery or external power (or power from a connected expansion module, indicated at 62 in FIG. 6) to a location 64, labeled "SWTCHD DC" in FIG. 6. This goes out toward a DC-to-DC converter, which creates the voltages needed for running the machine.

As indicated, the main power switch SW1 also switches power into the bridge battery circuit 30, and connects the bridge battery circuit 30 with a 5-volt regulator labeled "Q33." To the right of the regulator Q33 is another diode ORing situation at D6 and D7. The line into D7 receives power from the converter fed by 64, and this system voltage is ORed in by D6 and D7. The regulator Q33 will not operate until the system is put in the low-power mode, and the main battery 13 is removed, in which case the DC-to-DC converter is shut down and the bridge battery 22 takes over operation of the RAM (see RAM VCC) through the regulator Q33. Only the RAM is supplied through the bridge battery 22 and the regulator Q33.

Thus, D6 and D7 provide another ORing circuit between a plus 5-volt source from the DC-to-DC converter and the 5-volt regulator Q33, which is supplied by the bridge battery 22. The auxiliary regulator at Q33 is fed by the bridge battery only if the power switch is closed and the main battery and external power sources are missing.

The low-power mode, which may be generated by a switch or automatically, as mentioned above, is read by software. The software goes about shutting down the DC-to-DC converter and taking all of he critical parameters out of the machine. It takes the program memory being run, and the machine status, and stores them in the main RAM. When this is completed, the software shuts down the DC-to-DC converter. Following this, the main battery, if installed, or otherwise the bridge battery, keeps the main RAM alive. When the bridge battery is being discharged while powering the memory, the diode VSK 140 comes into play to provide the current path from Q33 to ground.

When the operator engages the low-power mode switch again, all of the programs, previous video displays, etc. are restored. All of the parameters are restored throughout all of the hardware after the power supply has been brought up again by insertion of a new battery, connection of an external source, etc.

FIG. 6 also indicates that an item 66, identified as "VRAM PU," may be powered by the main battery or the bridge battery during the low-power mode. This is to put the video memory chip into a low-power mode.

Power distributing capacitors 68, shown in the lower right of FIG. 3, reduce noise on the RAM VCC line. These do not absorb any power, but have the purpose of providing a low-impedance source or reservoir of stored power.

FIGS. 6A and 6B depict schematically the circuitry for providing power to the RAM during low-power mode. The RAM devices themselves are depicted in FIG. 7, and are indicated as the chips U26, U27, U28, U29, U34, U35, U36, U37. The items which are powered during low-power mode include the above-mentioned DRAM chips and the ICs in FIGS. 6 and 7, labeled "U4, U9, U16, and U18-U22." U4 is used to synchronize, at the CPU cycle level, the entry and exit of the DRAM from standby mode. U22 is used to drive LED status indicators that can remain lit during low-power mode. U21 is used to maintain the logic signal (SYSPWR-OFF) that turns off the main system DC/DC converter while the system is in low-power mode. U9 and U20 are used to implement the combinitorial logic required to complete the low-power control function 63.

Using the circuitry shown in FIGS. 6A and 6B, the DRAM clock lines IWE, ICAS, IRAS0-IRAS3 are driven from two sources. In normal system operation, U18 is enabled and the clock lines come from the system control chip 60. In low-power mode, U18 is disabled and U19 and U23 are enabled, allowing the SPND-RAS and SPND-CAS to clock the DRAMs. IWE is forced high to prevent write cycles to the DRAM in low-power mode. U16 is a dual mono-stable multivibrator chip which is configured to produce an oscillator at the proper frequency to generate the SPND-RAS and SPND-CAS clocks for the DRAMs. The DRAM cycle timing is designed to produce a CAS before RAS refresh cycle. In this type of cycle, the DRAMs provide the refresh address count internally, so that the external logic does not need to provide the address counter that other types of refresh cycles require.

The method of entering standby mode and the method of exiting standby mode are summarized in the following Tables I and II.

TABLE I

1. User presses standby button, which generates a Non-Maskable Interrupt (NMI).
2. 8086 pushes the FLAGs, CS, and IP registers on the stack and vectors to the standby NMI handler.
3. The NMI handler disables further NMIs and saves the other CPU registers (AX, BX, CX, DX, SI, DI, BP, DS, ES) on the stack.

TABLE I-continued

4. The NMI handler determines the source of the NMI; the standby NMI is generated by the overlay controller.
5. Another routine determines which overlay controller NMI has been generated by reading a data byte from the overlay controller chip.
6. Control passes to the routine that enters standby mode, NMISuspend (standby mode was originally called "suspend mode," and the attached listing reflects this).
7. NOTE: Standby mode can also be entered programmatically, by either the ROM BIOS itself or by an application. The BIOS enters standby mode when the computer has been idle for a user-specified period of time (automatic standby mode), or when the computer has been running on a low battery for too long. An application can call a BIOS routine to enter standby mode. In any of these cases, control comes directly to this point; no NMI is generated, and the overlay controller is not involved.
8. NMISuspend determines whether standby mode or automatic-standby mode is enabled by reading a byte stored in battery-backed CMOS RAM. If standby mode and automatic standby mode are both disabled, the NMI is cleared, and control returns to the code that was executing when the standby button was pressed. If either standby mode or automatic standby mode is enabled, the NMISuspend continues to execute.
9. The Programmable Interrupt Controller (PIC, an 8259 equivalent) interrupt mask is saved, then the PIC is programmed to disable any new interrupts.
10. Allow the CPU to service any pending interrupts. The PIC has an in-service register which indicates any interrupts that are being serviced.
11. Allow the CPU to finish any Direct Memory Access (DMA) operations in progress.
12. Read the current DMA Mask Registers, then mask (disable) all new DMA Operations. Disable the DMA chip.
13. Save the SS and SP registers (Stack Segment and Stack Pointer) in memory. These cannot be saved on the stack, since they define the stack.
14. Set the RAM cards' motor status bits all to OFF, so the RAM cards will be powered up during their next operation.
15. Save the Input/Output state of the computer:
    a) 8237 DMA chip
        1) Save the DMA counter registers
        2) Save the DMA command register
        3) Save the DMA mode registers
        4) Save the DMA page registers
        5) Send a Master Clear command to the DMA chip
    b) 8255 Programmable Peripheral Interface chip
        1) Save PPI port A
        2) Save PPI port B
        3) Save PPI port C
    c) Expanded Memory Specification ports
        1) Save the four EMS map registers
    d) 8250 Universal Asynchronous Receiver Transmitter (UART) chips
        1) Save register 2FBh/3FBh, byte format
        2) Save register 2FCh/3FCh, modem control
        3) Save register 2FDh/3FDh, line status
        4) Save register 2FEh/3FEh, modem status
        5) Save register 2F9h/3F9h, interrupt enable
        6) Save register 2F8h/3F8h, LSB divisor
        7) Save register 2F9h/3F9h, MSB divisor
    e) Parallel port registers
        1) Save register 378h, data latch
        2) Save register 37Ah, printer control
    f) 82C100 Super XT Controller chip
        1) Save register 43h, DIP switches
        2) Save register 4Bh, Sleep/Memory configuration
        3) Save register 72H, NMI control
        4) Save register 4Ch, EMS configuration port register
    g) Overlay controller chip
        1) Save the overlay controller flags
16. Disable the substitute NMI vector feature of the 82C100 so that addresses 00008h-0000Bh are checksummed correctly. RAM was originally checksummed to ensure that it was not corrupted, but this safety feature took too long (~5 seconds), and was removed.
17. Disable sleep mode, and enable standby mode. Sleep mode must be disabled so that an HLT instruction causes the 82C100 to enter standby mode, not sleep mode.
18. If checksumming RAM (which is not done in the preferred embodiment), checksum all of conventional RAM (00000h-9FFFFh), video RAM (B8000h-BFFFFh), and EMS RAM. Store these checksums in battery-backed CMOS.
19. Read 512 words at 00000h and 512 word at 80000h to cause another refresh of RAM. This ensures that the RAM will not lose data between the time the 82C100 refresh is disabled, and the time standby mode is entered and the 82C100 begins to refresh RAM again.
20. Disable the 82C100 RAM refresh.
21. Turn 82C100 power off and standby mode on.
22. Execute an HLT instruction; this causes standby mode to be entered.

TABLE II

1. With the system in standby mode, the user presses the standby button. This causes power to be applied to the computer. The CPU executes the instruction at FFFF0h, which is the first ROM BIOS instruction.
2. The ROM BIOS executes its normal Power-On Self-Test (POST) code. This code configures the 82C100 chip, as well as many of the peripheral chips.
3. The ROM BIOS determines that the computer is exiting standby mode by reading port 182h. If the computer is not exiting standby mode, the normal POST continues.
4. If the computer is exiting standby mode, the BIOS checks to see if the computer is running on AC power. If so, the BIOS proceeds. If the computer is running on battery, the battery voltage is tested. If it is too low, the computer reenters standby mode. If it is high enough, the BIOS proceeds.
5. Clear standby mode, so the 82C100 can refresh RAM. If standby mode cannot be cleared, proceed with a normal POST and boot.
6. Enable RAM refresh.
7. Read 512 words at 00000h and 512 words at 80000h to cause a refresh of RAM.
8. Restore the user's stack (SS and SP registers).
9. Set all interrupt mask bits to disable all interrupts.
10. Restore the Input/Output state of the computer:
    a) 8237 DMA chip
        1) Restore the DMA counter registers
        2) Restore the DMA command register
        3) Restore the DMA mode registers
        4) Restore the DMA page registers
    b) 8255 Programmable Peripheral Interface chip
        1) Restore PPI port A
        2) Restore PPI port B
        3) Restore LPP port C
    c) Expanded Memory Specification ports
        1) Restore the four EMS map registers
    d) 8250 Universal Asynchronous Receiver Transmitter (UART) chips
        1) Restore 2F9h/3F9h MSB divisor
        2) Restore 2F8h/3F8h LSB divisor
        3) Restore 2F9h/3F9h interrupt enable
        4) Restore 2FEh/3FEh modem status
        5) Restore 2FDh/3FDh line status
        6) Restore 2FCh/3FCh modem control
        7) Restore 2FBh/3FBh byte format
    e) Parallel port registers
        1) Restore 37Ah printer control
        2) Restore 378h data latch
    f) 82C100 Super XT Controller chip
        1) Restore register 43h, DIP switches
        2) Restore register 4Bh, Sleep/Memory configuration
        3) Restore register 72h, NMI control
    g) Overlay controller chip
        1) Restore the overlay controller flags
        2) Resend the battery threshold value
11. Program the 8259 PIC to a default state, since some of its control registers are write-only and cannot be saved.
12. Set the CPU speed to fast if that was its state when standby was entered; otherwise, leave the CPU speed set to slow.
13. Initialize the Real-Time Clock (RTC) chip.

TABLE II-continued

14. The low-memory variables for time and date have not changed since standby was entered, so the time and date are incorrect. Get the time and date from the RTC and set the low-memory variables.
15. Reinitialize the Yamaha display controller chip to the state it was in when standby was entered.
16. Configure the 82C605 serial/parallel port chip to set the base addresses and interrupt levels for the serial and parallel ports.
17. Restore the 82C100 Super XT Controller chip.
    a) Restore register 43h, DIP switches
    b) Restore register 4Bh, Sleep/Memory configuration
    c) Restore register 72h, NMI control
    d) Restore register 4Ch, GMS configuration port register
18. Restore the overlay controller chip
    a) Restore the overlay controller flags
    b) Resend the battery threshold value
19. Clear the interrupt flag to disable interrupts.
20. Restore the PIC interrupt mask.
21. Restore the user's CPU registers.
22. Re-enable NMIs.
23. Return to the user's application via an IRET instruction; this restores the user's FLAGS register.

While this description has been made with reference to the preferred embodiment, modifications may be made, as is known in the art, without departing from the scope of the invention as defined by the claims below.

The following is a computer listing of programs usable in connection with the present invention.

```
09/19/1989  10:49      Filename: STANDBY.ASM                                      Page  1

CLK10       EQU     100             ; Effective Clock Rate in MHz times 10 of processor WAFORIO     MACRO
            JMP     $+2             ; forces a wait of at least 1 usec
            WAFORIOIF
            ENDM WAFORIOIF   MACRO
            IF      CLK10 GE 150                    ; don't wait if CLK10 "normal" -
            DW      ((CLK10-50)/100) DUP (00EBh)    ; forces a wait of 1.5 +/- 1.5 usec
            ENDIF                                    ; "JMP $+2" repeated, usually 0x
            ENDM JMPFAR      MACRO   SEGVALUE,OFSVALUE
            DB      0EAh                            ; JMP FAR opcode
            DW      OFSVALUE
            DW      SEGVALUE
            ENDM CALLFAR     MACRO   SEGVALUE,OFSVALUE
            DB      09Ah                            ; CALL FAR opcode
            DW      OFSVALUE
            DW      SEGVALUE
            ENDM ;XXXXXXXXXXXXXXXXXXXXXXXXXXXXXXXXXXXXXXXXXXXXXXXXXXXXXXXXXXXXXXXXXXXXXXX
; Equates needed for assembly
;XXXXXXXXXXXXXXXXXXXXXXXXXXXXXXXXXXXXXXXXXXXXXXXXXXXXXXXXXXXXXXXXXXXXXXX Global Equates
;                           ; Logical conventions
FALSE       EQU     0
TRUE        EQU     NOT FALSE Checksum            EQU     false           ; TRUE to checksum DRAM & VRAM CfgIndexPort        EQU     22h             ; port that sets index value
CfgDataPort         EQU     23h             ; port that reads/writes data CPIndexPort         EQU     24h             ; port that sets index value
CPDataPort          EQU     25h             ; port that reads/writes data
CPUnit0             EQU     00010000b       ; select CHIPSpak unit #0
CPEnableReg         EQU     00h             ; enables/disables ports
CPConfigReg         EQU     01h             ; configures ports
CPRtBaudReg         EQU     02h             ; external clocking reg
CPRTCBase           EQU     03h             ; determines RTC base addr
CPUART1Base         EQU     04h             ; determines UART1 base addr
CPUART2Base         EQU     05h             ; determines UART2 base addr
CPParallelBase      EQU     06h             ; determines parallel port base addr
CPIntSourceReg      EQU     08h             ; determines source of IRQ 3, 4, 5, 7
CPConfigCtrl        EQU     0Fh             ; configuration control reg CPValidConfig       EQU     10000000b       ; Indicated valid config
CPStdbyClock        EQU     01000000b       ; oscillator ON, BR Gen enabled
CPRTCEnable         EQU     00010000b       ; enable RTC
CPPEnable           EQU     00001000b       ; enables parallel port
CPUART2Enable       EQU     00000100b       ; enables UART2
CPUART1Enable       EQU     00000010b       ; enables UART1
CPGameEnable        EQU     00000001b       ; enables game port
CP8250Ints          EQU     00000000b       ; compatible 8250-type interrupts IRQ3None            EQU     00000000b
IRQ3RTC             EQU     01000000b
```

```
09/19/1989  10:49      Filename: STANDBY.ASM                                      Page  2

IRQ3UART1           EQU     10000000b
IRQ3UART2           EQU     11000000b
IRQ3UARTOff         EQU     00111111b

IRQ4None            EQU     00000000b
IRQ4RTC             EQU     00010000b
IRQ4UART1           EQU     00100000b
IRQ4UART2           EQU     00110000b
IRQ4UARTOff         EQU     11001111b IRQ5None            EQU     00000000b
IRQ5RTC             EQU     00000100b
IRQ5UART1           EQU     00001000b
IRQ5Parallel        EQU     00001100b IRQ7None            EQU     00000000b
IRQ7RTC             EQU     00000001b
IRQ7UART2           EQU     00000010b
IRQ7Parallel        EQU     00000011b ; Index 40h - Clock/Mode Size _40_ClockMode       EQU     40h                     ; port addr
_40_ClockSlow       EQU     00000000b               ; 4.77MHz clock
_40_ClockFast       EQU     10000000b               ; 10MHz clock _40_Duty33          EQU     00000000b               ; 33% processor clock duty cycle
_40_Duty50          EQU     01000000b               ; 50% processor clock duty cycle _40_ClockSingle     EQU     00000000b               ; One 4.77MHz clock only
_40_ClockDouble     EQU     00000100b               ; Second clock at POSC input _40_DMASys          EQU     00000000b               ; Use system clock for DMA
_40_DMASysDiv2      EQU     00000010b               ; Use system clock/2 for DMA _40_Bus8Bit         EQU     00000000b               ; 8-bit bus
_40_Bus16Bit        EQU     00000001b               ; 16-bit bus ; Index 41h - System Configuration _41_SysConfig       EQU     41h                     ; port addr _41_DRAMChips       EQU     00000000b               ; DRAM memory chips
_41_SRAMChips       EQU     10000000b               ; SRAM memory chips _41_SWResetDis      EQU     00000000b               ; Disable software reset function
_41_SWResetEnb      EQU     01000000b               ; Enable software reset function _41_EMSDisable      EQU     00010000b               ; Disable EMS hardware _41_CmdNoDelay      EQU     00000000b               ; Normal command timing
_41_CmdDelay        EQU     00010000b               ; Delay cmd timing by 1 bus cycle _41_WaitNormal      EQU     00000000b               ; Use 0 global wait states for sys RAM
_41_WaitMinus1      EQU     00001000b               ; Use 1 less wait state for sys RAM _41_SlpRfrshDis     EQU     00000010b               ; Disable RAM refresh during sleep mode _41_ParityEnb       EQU     00000000b               ; Enable parity check logic
```

```
09/19/1989  10:49      Filename: STANDBY.ASM                                  Page 3

_41_ParityDis      EQU     00000001b       ; Disable parity check logic

; Index 42h - Configuration valid

_42_ConfigValid    EQU     42h                             ; port addr
_42_EMSSequence    EQU     00100000b                       ; Sequential EMS registers
_42_FastRAS        EQU     00010000b                       ; Fast RAS at 10MHz - >= rev. F
_42_ConfigBad      EQU     00000000b                       ; Invalid configuration info
_42_ConfigGood     EQU     00000001b                       ; Valid configuration info ; Index 43h - DIP switch emulation _43_DIPSwitches    EQU     43h                             ; port addr
_43_Floppy1        EQU     00000000b                       ; 1 floppy installed
_43_Floppy2        EQU     01000000b                       ; 2 floppies installed
_43_Floppy3        EQU     10000000b                       ; 3 floppies installed
_43_Floppy4        EQU     11000000b                       ; 4 floppies installed
_43_DsplyEGA       EQU     00000000b                       ; EGA display
_43_DsplyCGA40     EQU     00010000b                       ; CGA 40x25 display
_43_DsplyCGA80     EQU     00100000b                       ; CGA 80x25 display
_43_DsplyMono      EQU     00110000b                       ; Mono 80x25 display
_43_RAM256         EQU     00000000b                       ; 256K RAM
_43_RAM512         EQU     00000100b                       ; 512K RAM
_43_RAM576         EQU     00001000b                       ; 576K RAM
_43_RAM640         EQU     00001100b                       ; 640K RAM
_43_CoProcNone     EQU     00000000b                       ; No numeric coprocessor
_43_CoProc         EQU     00000010b                       ; 8087 installed
_43_POSTNoLoop     EQU     00000000b                       ; Don't loop on POST test
_43_POSTLoop       EQU     00000001b                       ; Loop on POST test ; Index 44h - Substitute NMI vector byte 0
; Index 45h - Substitute NMI vector byte 1
; Index 46h - Substitute NMI vector byte 2
; Index 47h - Substitute NMI vector byte 3

_44_NMIVector      EQU     44h
_45_NMIVector      EQU     45h
_46_NMIVector      EQU     46h
_47_NMIVector      EQU     47h ; Index 48h - Refresh Timer Interval _48_RefTimer       EQU     48h                             ; port addr
_48_Default        EQU     12h                             ; default count
```

```
09/19/1989  10:49      Filename: STANDBY.ASM                                  Page 4

; Index 49h - Wait state select, refresh enable, and keyboard type

_49_WaitStates     EQU     49h                             ; port addr
_49_MemWaits0      EQU     00000000b                       ; 0 mem wait states
_49_MemWaits1      EQU     01000000b                       ; 1 mem wait states
_49_MemWaits2      EQU     10000000b                       ; 2 mem wait states
_49_MemWaits3      EQU     11000000b                       ; 3 mem wait states
_49_IOWaits1       EQU     00000000b                       ; 1 I/O wait states
_49_IOWaits2       EQU     00010000b                       ; 2 I/O wait states
_49_IOWaits3       EQU     00100000b                       ; 3 I/O wait states
_49_IOWaits4       EQU     00110000b                       ; 4 I/O wait states
_49_DMAWaits1      EQU     00000000b                       ; 1 DMA wait states
_49_DMAWaits2      EQU     00000100b                       ; 2 DMA wait states
_49_DMAWaits3      EQU     00001000b                       ; 3 DMA wait states
_49_DMAWaits4      EQU     00001100b                       ; 4 DMA wait states
_49_RefTimDis      EQU     00000000b                       ; Disable refresh timer
_49_RefTimEnb      EQU     00000010b                       ; Enable refresh timer
_49_KbdXT          EQU     00000000b                       ; XT type keyboard
_49_KbdPS2         EQU     00000001b                       ; PS/2 type keyboard ; Index 4Bh - Sleep/Memory configuration _4B_SleepMemCfg    EQU     4Bh                             ; port addr
_4B_SleepEnb       EQU     10000000b                       ; Sleep mode enabled
_4B_SleepDis       EQU     00000000b                       ; Sleep mode disabled
_4B_NMISubstDis    EQU     00000000b                       ; Substitute NMI vector disabled
_4B_NMISubstEnb    EQU     01000000b                       ; Substitute NMI vector enabled
_4B_SuspendDis     EQU     00000000b                       ; *** Not the suspend we want to use
_4B_SuspendEnb     EQU     00100000b                       ; *** Not the suspend we want to use
_4B_DMASleepDis    EQU     00000000b                       ; DMA clock during sleep
_4B_DMASleepEnb    EQU     00010000b                       ; No DMA clock during sleep ; Memory config _4B_640_384        EQU     00001000b                       ; 640K + 384K EMS
_4B_512_512        EQU     00001001b                       ; 512K + 512K EMS ; Index 4Ch - EMS configuration _4C_EMSConfig      EQU     4Ch                             ; port addr
_4C_EMSPort258     EQU     01010000b                       ; EMS at port 258h
_4C_EMSBaseE000    EQU     00001000b                       ; EMS window at 0E0000h ; Index 72h (R/W) - NMI control
```

```
09/19/1989 10:49          Filename: STANDBY.ASM                              Page 5

_72_NMIControl    EQU  72h                ; port addr

_72_KbdClearDis   EQU  00000000b          ; Disable keyboard clear NMI
_72_KbdClearEnb   EQU  01000000b          ; Enable keyboard clear NMI _72_SuspendDis    EQU  00000000b          ; Disable suspend NMI
_72_SuspendEnb    EQU  00100000b          ; Enable suspend NMI _72_KbdDataDis    EQU  00000000b          ; Disable keyboard data NMI
_72_KbdDataEnb    EQU  00010000b          ; Enable keyboard data NMI _72_RTCDis        EQU  00000000b          ; Disable RTC NMI
_72_RTCEnb        EQU  00001000b          ; Enable RTC NMI _72_SleepClkOn    EQU  00000000b          ; Clock stays on during sleep
_72_SleepClkOff   EQU  00000100b          ; Clock goes off during sleep _72_FDCPowerDis   EQU  00000000b          ; Disable FDCOFF output
_72_FDCPowerEnb   EQU  00000010b          ; Enable FDCOFF output ; NOTE: If you change the location of the Serial enable bit, you must
; update the routine SerialPower in GRIDSUBS.ASM _72_SerialDis     EQU  00000010b          ; Turn on serial port driver power ; Index 7Eh (R/W) - NMI status _7E_NMIStatus     EQU  7Eh                ; port addr
_7E_NMIIOCheck    EQU  01000000b          ; IO channel check NMI
_7E_NMIParity     EQU  00100000b          ; Parity NMI
_7E_NMIKbdClear   EQU  00010000b          ; Keyboard clear NMI
_7E_NMISuspend    EQU  00001000b          ; Suspend NMI
_7E_NMIOverlay    EQU  00000100b          ; Overlay controller NMI
_7E_NMIKbdData    EQU  00000001b          ; Keyboard data NMI ; Index 7Fh (R/W) - Power control and reset _7F_PwrControl    EQU  7Fh                ; port addr
_7F_BatteryOk     EQU  00000000b          ; Battery is ok
_7F_BatteryLow    EQU  10000000b          ; Battery is low _7F_PowerIntern   EQU  00000000b          ; Not using external power
_7F_PowerExtern   EQU  01000000b          ; Using external power _7F_CoSWReset     EQU  00001000b          ; Assert S/W reset _7F_CoSuspend     EQU  00000010b          ; Generate suspend NMI ; Index A0h - NMI control A0_NMIDisable     EQU  00000000b          ; Disable all NMIs
A0_NMIEnable      EQU  10000000b          ; Enable all NMIs
NMI_OFF           EQU  00h                ; Disable NMI's
NMI_ON            EQU  80h                ; Enable NMI's
```

```
09/19/1989 10:49          Filename: STANDBY.ASM                              Page 6

NMIMASK           EQU  0A0h               ; NMI Mask register

TRESHOLDLO        EQU  95h                ; default battery threshold low byte
THRESHOLDHI       EQU  10h                ; default battery threshold = 10.95V
MAXTHRESHOLD      EQU  16h                ; max threshold = 16V
MINTHRESHOLD      EQU  10h                ; min threshold = 10V TEXT50MODE        EQU  94h                ; 50-line text mode select MODEMCTRLPORT     EQU  186h               ; write-only
POWERDETECTPORT   EQU  187h               ; write-only
POWERCTRLPORT     EQU  188h               ; read-only
POWERSTATUSPORT   EQU  188h               ; write-only
RTCINDEX          EQU  189h               ; read-only
RTCDATA           EQU  18Ah SYSTEMSUSPENDED   EQU  00000001b          ; bit 0 = 1
SYSTEMPOWERON     EQU  00000010b          ; bit 1 = 1
PADEXTERNALPOWER  EQU  00000100b          ; Pad is on AC
POWERVERYLOW      EQU  00010000b          ; power is very low
VERYLOWPOWER      EQU  00001000b          ; battery power is very low
EXTPOWERON        EQU  00001000b          ; external power applied
SUSPENDENABLE     EQU  00000001b          ; bit 0 = 1

X8259             EQU  208               ; Base Port of 8259
; 8259 Programmable Interrupt Contoller (PIC)
PIC0              EQU  X8259+0            ; 8259 Programmable Interrupt Controller
PICOMSK           EQU  PIC0+1

;                      Port PIC Bit Equates for ICW1
ICW1              EQU  10h                ; ICW1 is being issued
LTIM              EQU  08h                ; Level Triggered Interrupt Mode, else
                                          ;   edge-triggered
ADI               EQU  04h                ; Call Address Interval = 4, else 8
                                          ;   no effect in an 8086 or 8088 system
SNGL              EQU  02h                ; Single 8259 in system, no ICW3 will be
                                          ;   issued
IC4               EQU  01h                ; ICW4 will be issued, else not ;                      Port PIC Bit Equates for ICW4
SFNM              EQU  10h                ; Special Fully Nested Mode
BUFMAS            EQU  0Ch                ; Buffered Master mode
BUFSLV            EQU  08h                ; Buffered Slave mode
AEOI              EQU  02h                ; Automatic End of Interrupt Mode
UPM86             EQU  01h                ; Sets for 8086/8086 operation, else
                                          ;   8080/8085 mode ;                      Port PIC Bit Equates for OCW2
OCW2              EQU  00h                ; OCW2 is being issued
EOISR             EQU  70h                ; Rotate on specific EOI
PRIORT            EQU  60h                ; Set priority command
EOINSR            EQU  40h                ; Rotate on non-specific EOI
RAEOIS            EQU  30h                ; Rotate In Automatic EOI mode (SET)
EOISP             EQU  20h                ; Specific End of Interrupt
EOINSP            EQU  10h                ; Non-specific End of Interrupt
RAEOIC            EQU  00h                ; Rotate In Automatic EOI mode (CLEAR)

OCW3              EQU  08h                ; OCW3 is being issued
SPMSKS            EQU  30h                ; Set Special Mask
SPMSKR            EQU  20h                ; Reset Special Mask
```

```
09/19/1989  10:49           Filename: STANDBY.ASM                                    Page 7

POLL        EQU     04h                     ; Poll command
IRRFGR      EQU     02h                     ; Read IR register on next read pulse
ISREGR      EQU     03h                     ; Read IS register on next read pulse ; 8237 DMA Controller equates X8237       EQU     00H                     ; Base Port of 8237 DMA
DMAPGBASE   EQU     80H                     ; Base address (not used)
DMAPG0      EQU     DMAPGBASE+3             ; Dma page register channel 0
                                            ; (not needed for memory refresh
                                            ; except for some bad memory board
                                            ; designs where it must be 0 - this
                                            ; of course messes up DMAPG1 below)
DMAPG1      EQU     DMAPGBASE+3             ; Dma page register channel 1 (free)
DMAPG2      EQU     DMAPGBASE+1             ; Dma page register channel 2 (disk)
DMAPG3      EQU     DMAPGBASE+2             ; Dma page register channel 3 (?)
DMA0ADR     EQU     X8237+00h               ; CHANNEL 0 CURRENT ADDRESS
DMASTAT     EQU     X8237+08h               ; DMA Read Status Register
DMACMD      EQU     X8237+08h               ; DMA Command Register
DMARQST     EQU     X8237+0Ah               ; DMA Write Single Mask Register Bit
DMAMODE     EQU     X8237+0Bh               ; DMA Write Mode Register
DMACLFF     EQU     X8237+0Ch               ; DMA Clear Byte Pointer Flip Flop
DMAMASCLR   EQU     X8237+0Dh               ; DMA Master Clear
DMAMASK     EQU     X8237+0Fh               ; DMA Write All Mask Register Bits ; 8255 Programmable Peripheral Interface (PPI)

X8255       EQU     60H                     ; Base Port of 8255
PPIA        EQU     X8255+0h                ; Port A, used for Keyboard Scan code
                                            ; input
SWSWEN      EQU     80h                     ; Clear keyboard and Enable Sense
                                            ; Switches EMSPort0    EQU     258h                    ; port address of EMS page 0

; UART1 & UART2 base addrs

UART1Base   EQU     3F8h
UART2Base   EQU     2F8h

; Parallel port base addr

PPBase      EQU     378h

;xxxxxxxxxxxxxxxxxxxxxxxxxxxxxxxxxxxxxxxxxxxxxxxxxxxxxxxxxxxxxxxxxxxxxxxxxxxx
; CMOS equates needed for assembly
;xxxxxxxxxxxxxxxxxxxxxxxxxxxxxxxxxxxxxxxxxxxxxxxxxxxxxxxxxxxxxxxxxxxxxxxxxxxx CMOSAD      EQU     RTCINDEX                ; CMOS RAM Address register port (read/wr
ite)

; CMOS RAM Address definitions

CMSEC       EQU     00h                     ; CMOS BCD Seconds
CMSALM      EQU     01h                     ; CMOS BCD Seconds Alarm
CMMIN       EQU     02h                     ; CMOS BCD Minutes
CMMALM      EQU     03h                     ; CMOS BCD Minutes Alarm
CMHOUR      EQU     04h                     ; CMOS BCD Hour
CMHALM      EQU     05h                     ; CMOS BCD Hour Alarm
CMDAY       EQU     06h                     ; CMOS BCD Day of week
CMDATE      EQU     07h                     ; CMOS BCD Date
CMMON       EQU     08h                     ; CMOS BCD Month
CMYEAR      EQU     09h                     ; CMOS BCD Year
```

```
09/19/1989  10:49           Filename: STANDBY.ASM                                    Page 8

CMAST           EQU     0Ah             ; CMOS Register A Status
CMBST           EQU     0Bh             ; CMOS Register B Status
CMCST           EQU     0Ch             ; CMOS Register C Status
CMDST           EQU     0Dh             ; CMOS Register D Status
CMSTAT          EQU     0Eh             ; CMOS Diagnostic status
CMCENTURY       EQU     1Ah             ; CMOS century CMDRAMCHKLO     EQU     1Dh             ; CMOS checksum of DRAM (low byte)
CMDRAMCHKHI     EQU     1Eh             ; CMOS checksum of DRAM (high byte)
CMVRAMCHKLO     EQU     1Fh             ; CMOS checksum of Video RAM (low byte)
CMVRAMCHKHI     EQU     20h             ; CMOS checksum of Video RAM (high byte)

CMSUMLOW        EQU     21h             ; first CMOS byte to checksum

CMCPUSPEED      EQU     21h             ; CPU speed stored here
CMSleepMode     EQU     21h             ; Sleep mode enabled/disabled
CMSuspendMode   EQU     21h             ; Suspend mode enabled/disabled
CMLowBeep       EQU     21h             ; Low-power beeps enabled/disabled CMSerialPower   EQU     22h             ; Serial & modem power
CMAutoContrast  EQU     22h             ; Automatic contrast feature
CMLowSuspend    EQU     22h             ; Low-power suspend disabled
CMCOM1COM2      EQU     22h             ; COM1/COM2 configuration stored here CMAutoSuspend   EQU     23h             ; # of minutes before auto-suspend
CMEMSSetup      EQU     24h             ; EMS base and I/O addr CMTHRESHOLDLO   EQU     27h             ; battery threshold value - low byte
CMTHRESHOLDHI   EQU     28h             ; battery threshold value - high byte CMRCTHRESHLO    EQU     29h             ; RAM card battery threshold - low byte
CMRCTHRESHHI    EQU     2Ah             ; RAM card battery threshold - high byte CMCONTRAST      EQU     2Bh             ; contrast calibration value CMSUMHIGH       EQU     2Bh             ; last CMOS byte to checksum CMCHECKSUM      EQU     2Ch             ; checksum of bytes from 21h through 2Bh ; Status Register A Bit definitions (0Ah)

SRAUIP          EQU     80h             ; Time update in progress
SRADVM          EQU     70h             ; 22-Stage Divider mask
SRAD132         EQU     20h             ; selects time-base frequency of 32.768 kHz
SRARSM          EQU     0Fh             ; Rate selection mask
SRAR10          EQU     06h             ; Rate selection of 1.024 kHz,
                                        ;   period 976.562 microsecond interrupt rate ; Status Register B Bit definitions (0Bh)

SRBSET          EQU     80h             ; Set time and abort any update-in-progress
SRBPIE          EQU     40h             ; Periodic interrupt enable
SRBAIE          EQU     20h             ; Alarm interrupt enable
SRBUIE          EQU     10h             ; Update-ended interrupt enable
SRBSQE          EQU     08h             ; Square Wave Enabled (SQWE)
SRBDM           EQU     04h             ; Date mode is in binary, else BCD
SRB24H          EQU     02h             ; Hours byte is in 24 hour mode, else 12 hour
SRBDSE          EQU     01h             ; Daylight Savings Enabled ; Status Register C Bit definitions (0Ch)

SRCIRQ          EQU     80h             ; Interrupt Request flag (read only)
SRCPF           EQU     40h             ; Periodic Interrupt flag (read only)
SRCAF           EQU     20h             ; Alarm interrupt flag (read only)
SRCUF           EQU     10h             ; Update-ended interrupt flag (read only)
```

```
;
;       Status Register D Bit definitions (0Dh)
;
CMSVRM          EQU     80h             ; CMOS Valid RAM bit
;
;       Diagnostic Status Byte Bit definitions (0Eh)
;
LSTPWR          EQU     80h             ; CMOS chip lost power
CMCKSM          EQU     40h             ; CMOS Checksum is bad
IVLCFG          EQU     20h             ; CMOS Invalid configuration information found
                                        ;   at POST
THRESHOLDERROR  EQU     10h             ; battery threshold could not be set
HDSKIF          EQU     08h             ; CMOS Hard Disk Initialization failure
OVLFAIL         EQU     04h             ; Overlay Initialization failed
CT605FAIL       EQU     02h             ; CMOS CT605 chip failed
RCBATLOW        EQU     01h             ; RAM card battery is low
;
;       Miscellaneous configuration definitions (21h)
;
SLOW            EQU     00000001b       ; slow CPU speed
SleepEnabled    EQU     00000100b       ; sleep mode is enabled
SuspendEnabled  EQU     00001000b       ; suspend mode is enabled
AutoSuspend     EQU     00010000b       ; --1 if we're going into auto-suspend
LowPowerBeeps   EQU     00100000b       ; low-power beeps are enabled
;
;       Miscellaneous configuration definitions (22h)
;
SerialPowerOff  EQU     00000001b       ; serial power off
ModemPowerOff   EQU     00000010b       ; modem power off
AutoContrastOn  EQU     00000100b       ; auto contrast on
LowSuspendOff   EQU     00001000b       ; Low-power suspend disabled
SerialCom1      EQU     00010000b       ; serial port = COM1
SerialCom2      EQU     00100000b       ; serial port = COM2
SerialOff       EQU     00110000b       ; mask to test for serial = off
ModemCom1       EQU     01000000b       ; modem = COM1
ModemCom2       EQU     10000000b       ; modem = COM2
ModemOff        EQU     11000000b       ; mask to test for modem = off ;XXXXXXXXXXXXXXXXXXXXXXXXXXXXXXXXXXXXXXXXXXXXXXXXXXXXXXXXXXXXXXXX
; Code executed when a standby NMI happens
;XXXXXXXXXXXXXXXXXXXXXXXXXXXXXXXXXXXXXXXXXXXXXXXXXXXXXXXXXXXXXXXX DGROUP          GROUP   DATA
DATA            SEGMENT WORD PUBLIC 'DATA'
                ASSUME  DS:DGROUP, ES:DGROUP EXTRN   CRTMODE:BYTE
                EXTRN   SCRNWID:WORD
                EXTRN   SCRNLEN:WORD
                EXTRN   PAGADDR:WORD
                EXTRN   CURCOOR:WORD
                EXTRN   CURTYPE:WORD
                EXTRN   DSPTPAG:BYTE
                EXTRN   CRTADDR:WORD
                EXTRN   MSRCOPY:BYTE
                EXTRN   PALETTE:BYTE

EXTRN   LOTIME:WORD
                EXTRN   HITIME:WORD

EXTRN   SaveSS:WORD
                EXTRN   SaveSP:WORD

EXTRN   SuspendBytes:BYTE
                EXTRN   SaveB2C100Bytes:BYTE
                EXTRN   SaveOvlyByte:BYTE EXTRN   Suspend2Fn:BYTE
                EXTRN   Suspend2F8Bytes:BYTE

EXTRN   MOTRSTAT:BYTE

EXTRN   ModemSlabCtrl:BYTE
                EXTRN   KbdSerialCtrl:BYTE

EXTRN   Button1:BYTE

EXTRN   VideoMode:BYTE
                EXTRN   ColorMapIndex:BYTE

EXTRN   MinPowerStatus:BYTE
                EXTRN   SleepCount:WORD

EXTRN   SuspendFlag:BYTE

DATA            ENDS

CGROUP          GROUP   CODE
CODE            SEGMENT PARA PUBLIC 'CODE'
                ASSUME  CS:CODE

DS40H           LABEL   WORD
                DW      0D40H                   ; Segment of ROM data ;;;;;;;;;;;;;;;;;;;;;;;;;;;;;;;;;;;;;;;;;;;;;;;;;;;;;;;;;;;;;;;;
;
;       This is the NMI service routine.  All registers have been saved by
;       the dispatcher that called me.
;
;;;;;;;;;;;;;;;;;;;;;;;;;;;;;;;;;;;;;;;;;;;;;;;;;;;;;;;;;;;;;;;;

nmi_table_label         word
nmi_table_size          equ     offset NMIsuspend ; 06h
nmi_table_entries       equ     $ - offset nmi_table
                                equ     nmi_table_size / 2 overlay_nmi     proc mov     ax,cs
                mov     ds,ax call    ovl_get_byte            ; Satisfy assumption.
                jc      m_out                   ; Returned in AL.
                                                ; Error in getting the byte.

mov     cl,al                   ; Save a copy of the byte.
                dec     al                      ; Adjust code to zero base.
                cmp     al,nmi_table_entries    ; Is the function in range?
                ja      m_out                   ; Out of range.

xor     bx,bx                   ; Clear BX.
                mov     bl,al
                shl     bx,1                    ; Multiply by 2.
                add     bx,offset nmi_table
                jmp     word ptr cs:[bx]        ; Dispatch to appropriate routine.

m_out:          ret
overlay_nmi     endp

;;;;;;;;;;;;;;;;;;;;;;;;;;;;;;;;;;;;;;;;;;;;;;;;;;;;;;;;;;;;;;;;
```

```
09/19/1989 10:49      Filename: STANDBY.ASM                                    Page 11

; OVL_GET_BYTE
;    Get a byte from the Overlay Controller.
;
;    OUTPUT: AL     byte from OC.
;
;            If carry is set then a timeout occurred.
;----------------------------------------------------------------------- ovl_rmi          equ    004h           ; Bit 2 of port 7Eh.
ovl_tbe          equ    080h           ; Bit 7 of port 187h.

ovl_data         equ    185h           ; Bidirectional data bus.
ovl_status       equ    187h           ; Bit 7 is TBE.

ovl_self_test    equ    080h           ; Resets the O.C.
contrast_state   equ    095h           ; Command to set or clear auto contrast.
set_thresh       equ    088h           ; Command to O.C. to set battery level.
scan_state       equ    093h           ; Command to set or clear key scanning.
writeram         equ    086h           ; Command to O.C.

nmi_control      equ    072h           ; 82C100 register.
nmi_status       equ    07Eh           ; 82C100 register.

rtc_nmi_enable   equ    00001000b      ; OR with existing value.

timeout_err      equ    5              ; No response from the OC.

buttonbase       equ    36h            ; Location in O.C. ram of first scan
                                       ; code.

ovl_get_byte     proc
                 push   dx
                 push   cx
                 xor    cx,cx
; Wait for byte.
gb1:
                 in     al,nmi_status   ; 82C100 NMI status register.
                 test   al,ovl_rmi
                 jnz    gb2
                 loop   gb1             ; Jump if RMI.
                 stc
                 jmp    short gb_exit   ; Timed out.

gb2:
                 mov    ah,al
                 mov    dx,ovl_data     ; Save the NMI status register.
                 in     al,dx ; Clear the RTC NMI (The Chips & Tech. manual is wrong. Must clear explicitly)
                 xchg   ah,al           ; Get status byte in AL.
                 and    al,11111101b    ; Clear the RTC NMI and carry flag.
                 out    nmi_status,al
                 xchg   al,ah           ; Recover the byte.

gb_exit:
                 pop    cx
                 pop    dx
                 ret
ovl_get_byte     endp ;-----------------------------------------------------------------------
; OVL_PUT_BYTE
;    Send a byte to the Overlay Controller.
```

```
09/19/1989 10:49      Filename: STANDBY.ASM                                    Page 12

;    INPUT:  AL     byte to send.
;
;    OUTPUT: CARRY - Set = timeout.
;----------------------------------------------------------------------- ovl_put_byte     proc
                 push   ax
                 push   cx
                 push   dx mov    cx,1000          ; Time out value.
                 xor    cx,cx
                 mov    ah,al            ; Save the byte to send.
                 mov    dx,ovl_status ; Wait for transmit buffer to be empty.
pbyte1:
                 in     al,dx
                 test   al,ovl_tbe       ; 1 = empty, 0 = full.
                 jnz    pbyte2            ; Jump if empty.
                 loop   pbyte1
                 stc
                 push   bx               ; Timed out.
                 push   ds
                 mov    bx,40h
                 mov    ds,bx
                 assume ds:data mov    bx,0b4h
                 inc    byte ptr [bx]

pop    ds
                 pop    bx
                 jmp    short pbyte_exit

; Send the byte.
pbyte2:
                 mov    al,ah
                 sub    dx,2             ; Recover original byte.
                 out    dx,al            ; Point to data port.

pbyte_exit:
                 pop    dx
                 pop    cx
                 pop    ax
                 ret
ovl_put_byte     endp ;-----------------------------------------------------------------------
; OVL_RESET
;    Issue a reset command to the Overlay Controller.
;
;    INPUT:  AX - E460
;
;    OUTPUT: CY = 0   AH = 96h
;                     AL = Status from O.C.
;
;            CY = 1   AH = 5 (Time out error).
;----------------------------------------------------------------------- ovl_reset        proc
```

```
09/19/1989 10:49    Filename: STANDBY.ASM                           Page 13
;===================================================================== push    bx
        mov     bl,ovl_self_test
        call    ovl_reset_common
        pop     bx
        ret
ovl_reset       endp ;=====================================================================
; OVL_RESET_COMMON
;       This routine is called by ovl_reset and ovl_warmboot.
;
; INPUT: BL - Either the OVL_RESET or the OVL_WARM_BOOT command.
;
; OUTPUT: No carry - AX = 0x9600
;
;       If carry - AH = error code.
;===================================================================== ovl_reset_common        proc
        push    dx

; Disable the main NMI control.
        mov     al,nmi_off
        out     nmimask,al ; Do a dummy read from overlay to clear the latches.
        mov     dx,ovl_data
        in      al,dx ; Enable the RTC NMI.
        mov     dx,nmi_control
        in      al,dx                   ; Get the control byte.
        or      al,rtc_nmi_enable       ; Enable the RTC NMI.
        out     dx,al ; Send the command.
        mov     al,bl
        call    ovl_put_byte            ; OC self test command.
        jc      or_error ; Should return 2 bytes. (96h then some other code)
        call    ovl_get_byte            ; Return in AL.
        jc      or_error
        mov     bh,al                   ; Save the byte temporarily.
        call    ovl_get_byte            ; Return in AL.
        jc      or_error
        mov     ah,bh                   ; Recover the first byte.

; Enable main NMI.
        push    ax
        mov     al,nmi_on
        out     nmimask,al              ; Save the self test status.
        pop     ax jmp     short or_exit           ; No errors.

or_error:
        mov     ah,timeout_err          ; Carry is already set when we arrive here.
                                        ; Indicate timeout error.
or_exit:
        pop     dx
        ret
ovl_reset_common        endp
```

```
09/19/1989 10:49    Filename: STANDBY.ASM                           Page 14
;=====================================================================
; SET_CONTRAST_STATE
;       Enable, disable or get current state of auto contrast adjust.
;
; INPUT: DL =  0    to disable auto contrast.
;              1    to enable auto contrast.
;           = 0FFh  to return current scanning state.
;
; OUTPUT: If DL = 0FFh on entry:
;                DL = 00h if automatic calibration is disabled
;                DL = 01h if automatic calibration is enabled
;
;       If carry - AH = error code.
;=====================================================================

PUBLIC  set_contrast_state set_contrast_state      proc

; Check the command.
        cmp     dl,0FFh                 ; Was it a get state function?
        je      scs_state               ; Yes.
        cmp     dl,1                    ; Maximum function number.
        jbe     scs3
        mov     ah,2                    ; Error value.
        jmp     short scs_ret ; Disable MAIN NMI
scs3:
        mov     al,nmi_off
        out     nmimask,al ; Get byte from CMOS.
        mov     al,CMAutoContrast       ; Location in CMOS.
        call    cmrd
        cmp     dl,0                    ; Was it a clear command?
        jne     scs_set                 ; No.
        and     al,NOT AutoContrastOn   ; Clear bit.
        jmp     short scs_save scs_set:
        or      al,AutoContrastOn       ; Set bit.

; Store the value in CMOS.
scs_save:
        mov     ah,CMAutoContrast       ; Location in CMOS.
        call    cmwrt
        call    StoreNewCmosChecksum    ; Calculate & store the new checksum.
        jmp     short scs4

; Get the previous state.
scs_state:
        mov     al,CMAutoContrast       ; Location in CMOS.
        call    cmrd
```

```
                mov     d1,0                    ; Preload the return value.
                test    al,AutoContrastOn       ; Bit flag of interest.
                jz      scs4
                mov     d1,1
scs4:
                mov     ah,0                    ; Indicate no error.
                jmp     short scs_ret
scs_err:
                mov     ah,timeout_err
scs_ret:
; Enable MAIN NMI.
                push    ax
                mov     al,nmi_on
                out     nmimask,al
                pop     ax
                ret
set_contrast_state      endp ;=============================================================================
; OVLSETTHRESHOLD
;       Send low battery threshold voltage to overlay controller.
;
;       INPUT:  AX - A value between 0 and 3FFh.
;               BX - Min value.
;
;       OUTPUT: If carry is set,
;                       AH - error code.
;               If carry is clear,
;                       AH = 0
;
;       All other registers preserved.
;=============================================================================
                PUBLIC  ovlsetthreshold
ovlsetthreshold proc
                push    ax                      ; Save the threshold value.
; Disable MAIN NMI
                mov     al,nmi_off
                out     nmimask,al
; Send the command.
                mov     al,set_thresh           ; Command to O.C.
                call    ovl_put_byte
                pop     ax                      ; Recover the threshold value.
                jc      ovl_sett_error
                call    ovl_put_byte            ; Send low byte.
                jc      ovl_sett_error
                mov     al,ah
                call    ovl_put_byte            ; Send high byte.
                jc      ovl_sett_error
                mov     al,bl
                call    ovl_put_byte            ; Send low byte of min value.
                jc      ovl_sett_error
                mov     al,bh
                call    ovl_put_byte            ; Send high byte of min value.
                jc      ovl_sett_error
```

```
                mov     ah,0
                jmp     short ovl_sett_ret
ovl_sett_error:
                mov     ah,timeout_err
ovl_sett_ret:
; Enable MAIN NMI.
                push    ax
                mov     al,nmi_on
                out     nmimask,al
                pop     ax
                ret
ovlsetthreshold endp ;=============================================================================
; SET_BUTTON_STATE
;       Enable, disable or get current state of button scanning.
;
;       INPUT:  DL =    0 to disable button scanning.
;                       1 to enable button scanning.
;                       0FFh to return current scanning state.
;
;       OUTPUT: DL = 0 or 1. Previous scanning state.
;               If carry - AH = error code.
;=============================================================================
                PUBLIC  set_button_state
set_button_state        proc
; Disable MAIN NMI
                mov     al,nmi_off
                out     nmimask,al
; Send the command.
                mov     al,scan_state
                mov     ah,dl
                cmp     ah,0FFh                 ; Was it a get state function?
                jne     sbs2                    ; No.
                mov     ah,2                    ; Return current state function #.
sbs2:
; Do a range check on the function number.
                cmp     ah,2
                jbe     sbs3
                mov     ah,2
                stc
                jmp     short sbs_ret
sbs3:
                call    ovl_put_byte            ; Send command.
                jc      sbs_err
                mov     al,ah                   ; Recover function #.
                call    ovl_put_byte            ; Send function.
                jc      sbs_err
; Get the previous state.
                call    ovl_get_byte
                jc      sbs_err
                mov     dl,al mov     ah,0                    ; Indicate no error.
```

09/19/1989 10:49     Filename: STANDBY.ASM                                Page 17

```
            jmp     short abs_ret
abs_err:
            mov     ah,timeout_err
abs_ret:
; Enable MAIN NMI.
            push    ax
            mov     al,nmi_on
            out     nmimask,al
            pop     ax
            ret
set_button_state  endp write_button   proc
            push    bx
; Disable MAIN NMI
            mov     al,nmi_off
            out     nmimask,al ; Send the command.
            mov     al,writerem         ; Command to O.C.
            call    ovl_put_byte
            jc      write_butt_error
            mov     al,bl
            add     al,buttonbase       ; Recover button #.
            call    ovl_put_byte        ; Add offset of first scan code in O.C.
            jc      write_butt_error
            mov     al,bh
            call    ovl_put_byte        ; Recover new scan code.
            jc      write_butt_error mov     ah,0
            jmp     short write_butt_ret write_butt_error:
            mov     ah,timeout_err
write_butt_ret:
; Enable MAIN NMI.
            push    ax
            mov     al,nmi_on
            out     nmimask,al
            pop     ax
            ret
write_button    endp ;XXXXXXXXXXXXXXXXXXXXXXXXXXXXXXXXXXXXXXXXXXXXXXXXXXXXXXXXXXXXXXXXXXX
; Power-on initialization code
;XXXXXXXXXXXXXXXXXXXXXXXXXXXXXXXXXXXXXXXXXXXXXXXXXXXXXXXXXXXXXXXXXXX ;--------------------------------------------------------------------
;                   Test for suspend mode here
;--------------------------------------------------------------------

; Check for suspend mode now

PUBLIC  SuspendTest
SuspendTest:
            MOV     DX,POWERSTATUSPORT  ; port 182h
            IN      AL,DX
```

09/19/1989 10:49     Filename: STANDBY.ASM                                Page 18

```
            TEST    AL,SYSTEMSUSPENDED          ; check for Suspend Status Set
            JNZ     ExitSuspend JMP     NotSuspend                  ; not coming out of suspend, so just cont
true:
ExitSuspend:
; Check to make sure we have enough power. If not, just
; drop back into suspend.

MOV     DX,POWERSTATUSPORT          ; port 182h

; Reset Suspend Enable bit to allow CPU adds to get to RAMS

IN      AL,DX                       ; read port 182h again
            AND     AL,NOT SYSTEMSUSPENDED      ; clear suspend bit, leave others
            OR      AL,SYSTEMPOWEROK            ; leave power on!
            OUT     DX,AL XOR     CX,CX                       ; try lots of times
SuspendLoop:
            IN      AL,DX
            TEST    AL,SYSTEMSUSPENDED          ; check for Suspend Status Set
            JZ      EMClearOk
            LOOP    SuspendLoop JMP     NotSuspend                  ; can't get h/w to work, so cold boot EMClearOk:
; Enable refresh AFTER clearing suspend bit MOV     AL,49_WaitStates            ; wait State, Ref Enable, Rbd Type
            OUT     CfgIndexPort,AL
            IN      AL,CfgDataPort              ; get current setting
            OR      AL,49_RefIinEnb             ; set REF enable bit
            MOV     AH,AL                       ; save it
            MOV     AL,49_WaitStates            ; wait State, Ref Enable, Rbd Type
            OUT     CfgIndexPort,AL
            MOV     AL,AH
            OUT     CfgDataPort,AL ; Read lowest 512 words of both banks to ensure refresh XOR     AX,AX
            MOV     DS,AX
            MOV     SI,AX                       ; point at absolute zero
            MOV     CX,0200h                    ; number of adds to toggle thru
            REP     LODSW                       ; just read them XOR     SI,SI
            MOV     AX,8000h
            MOV     DS,AX                       ; point at bottom of second bank
            MOV     CX,0200h                    ; number of adds to toggle thru
            REP     LODSW                       ; just read them ;--------------------------------------------------------------------
;                         ResetState
;--------------------------------------------------------------------

; Reset the I/O ports using the saved values

PUBLIC  ResetState
```

09/19/1989 10:49    Filename: STANUBI.ASM

ResetState:
```
        MOV     CX,0                    ; spin our wheels
        ???     1                       
        ???     CX,0                    
        LOOP    5                       ; spin our wheels
```

; Restore user's stack
```
        ASSUME  DS:DGROUP
        MOV     DS,CS:DS40H
        MOV     SS,SaveSS               ; get saved stack segment
        MOV     SP,SaveSP               ; and stack pointer MOV     AX,OFFSET StateRestored ; return address
        MOV     ES,AX                   ; pass return address in ES
        JMP     RestoreState            ; restore system state
```

StateRestored:
; Reprogram 8259 to default state.
; Can't restore it if it has changed, because the control word
; registers are write-only
```
        CLI                             ; ensure no interrupts for now
        MOV     DX,PIC0                 ; control port
        MOV     AL,ICW1+ADI+SNGL+IC4    ; ICW1 is being issued
                                        ; Call Address Interval = 4, else 8
                                        ; no effect in an 8086 or 8088 system
                                        ; Single 8259 in system, no ICW3 will be
                                        ;  issued
                                        ; ICW4 will be issued, else not
                                        ; write level
        OUT     DX,AL INC     DX
        MOV     AL,08h
        OUT     DX,AL                   ; icw2 - load vector table address MOV     AL,BUFMAS+UPM86
        OUT     DX,AL                   ; icw4 - 8086 mode, non auto eoi
                                        ; - master buffered mode MOV     AL,0FFh
        OUT     PICOMSK,AL              ; make sure ints are off
```

; Set CPU speed to slow if that's what speed it was when we entered
; suspend.
```
        MOV     AL,CMCPUSPEED           ; read CPU speed from CMOS
        CALL    CMREAD
        TEST    AL,SLOW                 ; were we in slow mode?
        JNZ     CPUSlow                 ; yes
```

; Set fast speed
```
        CALL    SetSpeedFast            ; make it fast for the user
        JMP     SHORT CPUSet
```

CPUSlow:
CPUSet:
```
        CALL    RTCInit                 ; initialize the real-time clock
```

; This LOTIME & BITIME variables are not correct, so set them from
; the CMOS clock
```
        CALL    XLATUP                  ; set LOTIME & BITIME from CMOS clock
```

; Initialize display hardware
```
        CALL    ReinitDisplay           ; InitPanel & restore video mode
```

; Reinitialize the 605 chip
```
        CALL    CT605Configure          ; puts the 605 in configuration mode
        CALL    CT605Enable             ; enable the 82C605 chip
```

; Enable NMIs
; Enable suspend NMI now

; Don't change the order of these two calls, or move either one!
```
        CALL    Restore82C100           ; set DIPs, enable suspend, etc.
        CALL    RestoreOverlay          ; restore overlay controller
```

; Check to make sure we have enough power. If not, just
; drop back into suspend.
; Pyar boards have batteries. Find out if we're running on AC.
```
        MOV     DX,POWERDETECTPORT      ; port 187h
        IN      AL,DX
        TEST    AL,PADEXTERNALPOWER     ; pwd on external power?
        JNZ     ExtPower                ; yes
```

; Pwd is running on the battery. Determine if power is low or is ok.
```
        MOV     CX,1000h                ; read the port lots of times
CheckPowerLoop:
        IN      AL,DX
        TEST    AL,POWERVERYLOW
        JNZ     CPLow                   ; is power low?
        LOOP    CheckPowerLoop          ; yes
        JMP     SHORT PowerIsOk         ; no
```

CPLow:
; Go back into suspend mode
```
        MOV     DX,POWERCTLPORT         ; suspend status
        IN      AL,DX
        OR      AL,VERYLOWPOWER         ; set low power bit
        OUT     DX,AL CALL    ReenterSuspend          ; re-enter suspend mode
```

ExtPower:
PowerIsOk:
; Restore PIC mask, which was saved

```
09/19/1989 10:49          Filename: STANDBY.ASM                    Page 21

CLI                             ; don't re-enable ints until IRET
        MOV     BX,OFFSET SuspendBytes  ; restore PIC mask now
        MOV     AL,BYTE PTR [BX]
        OUT     PICOMSK,AL              ; set port 21h PUBLIC  RestartApp RestartApp:
; Restart application
; Restore CPU regs
        POP     ES
        POP     DS
        POP     BP
        POP     DI
        POP     SI
        POP     DX
        POP     CX
        POP     BX

MOV     AL,NMI_ON
        OUT     NMIMASK,AL

POP     AX

; CS, IP, and FLAGS are restored by IRET

IRET                            ; to interrupted routine

ASSUME  DS:NOTHING

;------------------------------------------
;                 NotSuspend
;------------------------------------------
; Come here if the machine was not in suspend mode, or if
; the RAM checksums are bad. Proceed with a cold boot.

PUBLIC  NotSuspend

NotSuspend:

;XXXXXXXXXXXXXXXXXXXXXXXXXXXXXXXXXXXXXXXXXXXXXXXXXXXXXXXXXXXXXXXXX
; Code executed when entering standby (suspend) mode
;XXXXXXXXXXXXXXXXXXXXXXXXXXXXXXXXXXXXXXXXXXXXXXXXXXXXXXXXXXXXXXXXX ;*****************************************************************
;*                      SUSPEND.ASM                              *
;* Copyright (C) 1988 by GRiD Systems Corporation. This program *
;* contains proprietary and confidential information. All rights *
;* reserved.                                                     *
;*                                                               *
;* This module contains routines used to enter and exit suspend mode *
;* These routines include:                                       *
;*                                                               *
;*   SuspendNMI     - receives NMI and determines the source     *
;*   ClearDMAInts   - waits for no interrupt or DMA requests     *
;*   EnterSuspend   - enters suspend mode                        *
;*   ClearSuspend   - clears suspend mode bit in CMOS            *
;*   CheckSumDRAM   - checksums DRAM and stores checksum in CMOS *
;*   DRAMCheckSumOk - compares DRAM checksum to stored value     *
;*   CheckSumVRAM   - checksums video RAM and store checksum in CMOS *
;*   VRAMCheckSumOk - compares VRAM checksum to stored value     *
;*****************************************************************
```

```
09/19/1989 10:49          Filename: STANDBY.ASM                    Page 22

;*****************************************************************
;*   SaveIOValues   - saves values of I/O ports in CMOS          *
;*   RestoreIOValues- restores values of I/O ports from CMOS     *
;*****************************************************************

; CHANGE HISTORY
;  Who     When        What
;  ---     ----        ----
;  mikef   01/11/89    Added 'overlay_nmi' and 'overlay_service'.
;  mikef   01/13/89    Now clears the NMI bit in port 72h in get_byte.

;*****************************************************************
;* SuspendNMI - NMI handler; determines the source of the NMI   *
;*                                                               *
; ENTRY:
;   None
;
; EXIT:
;   NMI enabled
;   All registers preserved
;*****************************************************************

SuspendNMI      PROC    NEAR

; CS, IP, and FLAGS already on stack since we can only get here
; via an NMI.

PUSH    AX                      ; save all regs
        MOV     AL,NMI_OFF              ; disable main NMI
        OUT     NMIMASK,AL PUSH    BX
        PUSH    CX
        PUSH    DX
        PUSH    SI
        PUSH    DI
        PUSH    BP
        PUSH    DS
        PUSH    ES MOV     BP,SP                   ; save user's SP ; Determine the source of the NMI IN      AL,_7E_NMIStatus        ; read port 7E for NMI status TEST    AL,_7E_NMIOverlay       ; overlay controller NMI?
        JNZ     NMIOverlay              ; yes TEST    AL,_7E_NMIIOCheck       ; I/O channel check NMI?
        JNZ     NMIIOCheck              ; yes TEST    AL,_7E_NMIParity        ; parity NMI?
        JNZ     NMIParity               ; yes TEST    AL,_7E_NMIKbdClear      ; keyboard clear NMI?
        JNZ     NMIKbdClear             ; yes
```

```
            TEST    AL,7E_NMIKbdData        ; keyboard data NMI?
            JNZ     NMIKbdData              ; yes ; Some other NMI - which one?
; Clear the bit that is set MOV     BL,AL                   ; copy NMI status
            NOT     BL                      ; use this as mask to turn off set bit
            AND     AL,BL
            JMP     SHORT NMIIgnore NMIIOCheck:
; Clear the bit that is set AND     AL,NOT 7E_NMIIOCheck    ; turn this bit off
            OUT     7E_NMIStatus,AL         ; ignore the NMI from this source
            JMP     SHORT NMIIgnore NMIParity:
; Clear the bit that is set AND     AL,NOT 7E_NMIParity     ; turn this bit off
            OUT     7E_NMIStatus,AL         ; ignore the NMI from this source
            JMP     SHORT NMIIgnore NMIKbdClear:
; Clear the bit that is set AND     AL,NOT 7E_NMIKbdClear   ; turn this bit off
            OUT     7E_NMIStatus,AL         ; ignore the NMI from this source
            JMP     SHORT NMIIgnore NMIKbdData:
; Clear the bit that is set AND     AL,NOT 7E_NMIKbdData    ; turn this bit off
            OUT     7E_NMIStatus,AL         ; ignore the NMI from this source NMIIgnore:
NMIExit:
; Enable NMI, pop saved values, IRET MOV     AL,A0 NMIEnable
            OUT     NMIMASK,AL              ; A0h = 80h SuspendNMIExit:
            POP     ES
            POP     DS
            POP     BP
            POP     DI
            POP     SI
            POP     DX
            POP     CX
            POP     BX
            POP     AX
            IRET NMIOverlay:
            CALL    ResetSleepCounter       ; don't timeout if pen active
            CALL    Overlay_NMI             ; handle this multipurpose NMI outside
            JMP     SHORT NMIExit PUBLIC  NMISuspend
NMISuspend:

; See if suspend mode is even enabled
; If not, don't go into suspend mode

MOV     AL,CMSuspendMode        ; CMOS reg 21h
            CALL    CMRead                  ; see if suspend or auto suspend is enabled TEST    AL,SuspendEnabled       ; is suspend enabled?
            JNZ     GoIntoSuspend           ; yes TEST    AL,AutoSuspend          ; is auto suspend enabled?
            JNZ     GoIntoSuspend           ; yes MOV     DX,POWERCTRLPORT        ; clear NMI by writing to port 102h
            MOV     AL,NOT SYSTEMPOWEROM
            OUT     DX,AL RET                             ; return to Mike's GoIntoSuspend:

; Change from SP,4 to SP,2 because a CALL was changed to a JMP
; in the NMI dispatcher in OVLDSR.ASM ADD     SP,4                    ; throw away 2 return IPs
            ADD     SP,2                    ; throw away 2 return IPs MOV     AB,CMSuspendMode        ; CMOS reg 21h
            AND     AL,NOT AutoSuspend      ; turn auto suspend bit off
            CALL    CMWrt                   ; it's only set for a short time ; Disable more INT's: NMI already disabled at module entry point

CLI

SuspendNMI  ENDP

;*************************************************************************
;*
;* ClearDMAInts - polls DMA and PIC, waiting for:
;*   1. No interrupt requests at port 20h
;*   2. No interrupts in service at port 20h
;*   3. No DMA in progress at port 77?
;*
;* ENTRY:
;*   None
;*
;* EXIT:
;*   DMA controller reset is unable to wait for no DMA
;*   All PIC interrupts are disabled
;*
;*************************************************************************
```

09/19/1989 10:49    Filename: STANDBY.ASM                Page 25

```
ClearDMAInts    PROC    NEAR

; Save PIC value in SI, then disable all ints and STI to let
; pending ints happen.  Read in-service register until it is 0.
;
        MOV     DX,PICOMSK
        IN      AL,DX                   ; port 21H
        MOV     SI,AX                   ; save in SI
        MOV     AL,0FFh                 ; disable all new ints
        OUT     DX,AL
        STI                             ; allow pending interrupts MOV     DX,PICO                 ; port 20h
        MOV     AL,OCW3 OR ISREGR       ; read In-Service Reg
        OUT     DX,AL
        WAFORIO ; Try to allow pending interrupts to get serviced
; by looping here until the in-service reg = 0.
; If the suspend NMI interrupts an interrupt service routine,
; chances are that the PIC won't service any other interrupts
; because it's waiting for EOI from that service routine.
; If the in-service reg doesn't = 0 after 1000 loops, write
; EOI to the PIC so that the other pending interrupts can
; be serviced; the interrupt we interrupted is lost.

MOV     CX,1000                 ; try
ClearISRLoop:
        IN      AL,DX                   ; read ISR at port 20h
        WAFORIO
        OR      AL,AL                   ; wait for it to be 0
        JZ      ClearDMA                ; it is
        LOOP    ClearISRLoop            ; try again ; Write EOI so we can service the other pending interrupts MOV     AL,20h                  ; EOI
        OUT     DX,AL
        MOV     CX,1000                 ; wait for other ints to get serviced
ClearISRLoop2:
        IN      AL,DX                   ; read ISR at port 20h
        WAFORIO
        OR      AL,AL                   ; wait for it to be 0
        JZ      ClearDMA                ; it is
        LOOP    ClearISRLoop2           ; try again ; ???
; Need to decide how to handle error here - PIC will not clear
; ???

ClearDMA:
; Save PIC value before clearing DMA

CLI                             ; and don't let us get interrupted

MOV     DX,DMASTAT              ; DMA Read Status Register
        XOR     CX,CX                   ; wait BX * 65536 loops
```

09/19/1989 10:49    Filename: STANDBY.ASM                Page 26

```
ClearDMALoop:
        IN      AL,DX                   ; read DMA status at port 08h
        WAFORIO
        OR      AL,AL                   ; wait for it to be 0
        JZ      ClearComplete           ; it is
        LOOP    ClearDMALoop            ; try again ClearComplete:
;
; Read the current DMA mask for all 4 channels
;
        IN      AL,DMAMASK              ; read current mask for all 4 channels
        AND     AL,0Fh
        MOV     BL,AL                   ; save the value MOV     AL,0Fh                  ; mask all four DMA channels
        OUT     DMAMSKT,AL IN      AL,0Ah                  ; special 82C100 cmd to read command reg
        MOV     BH,AL                   ; save the value
        MOV     AL,04h
        OUT     DMACMD,AL               ; disable DMA chip ClearExit:
ClearDMAInts    EMDP ;************************************************************
;*                                                          *
;* SaveIOState - saves important I/O regs that must be restored on *
;* on power up.                                             *
;*                                                          *
;************************************************************

; CPU regs have been saved already by Suspend module entry point.
; SS and SP are saved explicitly below
; CS, IP, and FLAGS are already stored due to NMI entry

ASSUME  DS:DCGROUP

MOV     DS,WORD PTR CS:DS40B    ; point at ROM data segment
        MOV     SaveSS,SS               ; save stack segment
        MOV     SaveSP,BP               ; and stack pointer saved in BP ; The user might change RAM cards while in suspend mode, so pretend all
; the RAM cards are off.  This way, DOS will go out and determine what
; in the drives before it accesses the disks.

MOV     MOTRSTAT,0              ; tell RAM card driver all are off

; Save System State

ASSUME  ES:DCGROUP
        PUSH    DS
        POP     ES
        MOV     DI,OFFSET SuspendBytes  ; setup ES:DI to point
        CLD                             ; to suspend bytes ; Save the PIC value that's in SI from above MOV     AX,SI                   ; get PIC value stored in SI(7:0)
        STOSB                           ; store only AL
```

```
; Save the DMA state
;
        MOV     DX,DMACLFF
        OUT     DX,AL               ; port 0Ch
                                    ; clear first/last byte flip-flop
        MOV     CX,8                ; set 4 DMA regs info
        MOV     DX,DMA0ADR          ; start at port 0

DMAInfoLoop:
        IN      AL,DX
        STOSB                       ; get LSB
        IN      AL,DX               ; save it
        STOSB                       ; get MSB
        INC     DX                  ; save it
        LOOP    DMAInfoLoop ; Save the DMA command register
;
        MOV     AL,BH
        STOSB ; Read the 4 DMA mode registers
; 1. Clear the mode register counter
;
        MOV     AL,01h
        OUT     0Eh,AL              ; special 82C100 DMA command ; 2. Read the mode register four times, once for each channel
;
        MOV     CX,4
        MOV     DL,0

DMAModeLoop:
        IN      AL,DMAMCDE          ; read mode register - bits 0 & 1 = 1
        AND     AL,0FCh             ; clear bits 1 & 0
        OR      AL,DL               ; set bits 1 & 0 to 00, 01, 10, 11
        INC     DL
        STOSB                       ; mode register value now ready to restor
        LOOP    DMAModeLoop ; Get DMA page register values
;
        MOV     DX,DMAPG1           ; start with DMA page register 1
        IN      AL,DX
        STOSB
        MOV     DX,DMAPG2
        IN      AL,DX
        STOSB
        MOV     DX,DMAPG3
        IN      AL,DX
        STOSB MOV     AL,BL               ; get DMA mask register bits
        STOSB                       ; save them OUT     DMAMSCLR,AL         ; master clear to DMA controller ; Get the 8255 PPI port info
;
        MOV     DX,PPIA
        IN      AL,DX               ; read the kbd scan code
        STOSB
        INC     DX                  ; read PPIB
        IN      AL,DX
        STOSB
        ADD     DX,2                ; read PPI control port
        IN      AL,DX
        STOSB ; Read the EMS page registers
;
        MOV     DX,EMSPort0         ; port 258h
        MOV     CX,4                ; read 4 EMS ports EMSSaveLoop:
        IN      AL,DX
        STOSB
        ADD     DX,4000h            ; next EMS port
        LOOP    EMSSaveLoop ; Save the UART ports
;
        MOV     DX,UART1Base+3      ; port 3FB
        PUSH    DX
        IN      AL,DX
        STOSB AND     AL,7Fh              ; make DLB 0
        OUT     DX,AL

MOV     CX,3

UART1SaveLoop:
        INC     DX
        IN      AL,DX
        STOSB
        LOOP    UART1SaveLoop MOV     DX,UART1Base+1
        IN      AL,DX
        STOSB POP     DX                  ; port 3FB
        IN      AL,DX
        OR      AL,80h              ; make DLB = 1
        OUT     DX,AL SUB     DX,3                ; port 3F8, divisor LSB
        IN      AL,DX
        STOSB
        INC     DX                  ; port 3F9, divisor MSB
        IN      AL,DX
        STOSB ; Save the UART ports for the second UART
;
        MOV     BX,DI               ; save STOSB ptr
        MOV     DI,OFFSET Suspend2FB ; 40:0A6h MOV     DX,UART2Base+3      ; port 2FB
        PUSH    DX
        IN      AL,DX
```

```
09/19/1989 10:49    Filename: STANDBY.ASM                    Page 29

STOSB
        MOV     DI,OFFSET Suspend2F8Bytes    ; 40:0FAh
        AND     AL,7Fh
        OUT     DX,AL                        ; make DLB 0
        MOV     CX,3
UART2SaveLoop:
        INC     DX
        IN      AL,DX
        STOSB
        LOOP    UART2SaveLoop
        MOV     DX,UART2Base+1               ; port 2FB, 2FC, 2FD, 2FE
        IN      AL,DX
        STOSB
        MOV     DX                           ; port 2F9h
        IN      AL,DX
        OR      AL,80h                       ; port 2FB
        OUT     DX,AL                        ; make DLB = 1
        SUB     DX,3
        IN      AL,DX                        ; port 2F8, divisor LSB
        STOSB
        INC     DX
        IN      AL,DX                        ; port 2F9, divisor MSB
        STOSB
        MOV     DI,BX                        ; restore previous STOSB ptr ; Save parallel port regs
;
        MOV     DX,PPBase                    ; port 378h
        IN      AL,DX
        STOSB
        ADD     DX,2                         ; base+2
        IN      AL,DX
        STOSB ; Save the following 82C100 registers:
;       43h, 48h, 72h
;
        MOV     AL,_43_DIPSwitches
        CALL    Read82C100
        MOV     AL,AH                        ; value returned in AH
        STOSB                                ; prepare for STOSB
        MOV     AL,_48_SleepMemCfg
        CALL    Read82C100
        MOV     AL,AH                        ; value returned in AH
        STOSB                                ; prepare for STOSB
        IN      AL,_72_NMIControl            ; read port 72h
        STOSB ; Save overlay controller state
;
        MOV     AL,85h                       ; read overlay RAM command
        CALL    OVL_PUT_BYTE                 ; send command
        MOV     AL,20h                       ; RAM location to read
        CALL    OVL_PUT_BYTE                 ; send data
```

```
09/19/1989 10:49    Filename: STANDBY.ASM                    Page 30

CALL    OVL_GET_BYTE
        STOSB                                ; get data
                                             ; save it ; This is necessary because not every write to 186h is written
; to ModemSlsbCtrl if PYGAR EQU TRUE.

MOV     DX,MODEMCTRLPORT             ; port 186h
        IN      AL,DX
        MOV     ModemSlsbCtrl,AL             ; save last value written PUBLIC  ReenterSuspend ReenterSuspend:
;----------------------------------------------------------
;                Disable substitute NMI vector
;----------------------------------------------------------
; NMIs are disabled. We need to disable to substitute NMI vector
; so the checksum reads what's really at 0:8, and not the
; substitute vector.
;
; Also disable sleep mode so the RLT puts us in suspend mode.
; Enable suspend mode so the RLT does this.
;
        MOV     AL,_4B_SleepMemCfg           ; read 82C100 reg 4Bh
        CALL    Read82C100
        AND     AH,NOT (_4B_SleepEnb OR _4B_NMISubstEnb)
        OR      AH,_4B_SuspendEnb            ; enable suspend mode
        CALL    Write82C100                  ; write value to reg 4Bh ; IF Checksum
;----------------------------------------------------------
; Generate Checksum for RAM, EMS, and Video RAM
;----------------------------------------------------------
; Checksum routines are designed to run without stack, so register
; definitions are critical. SS and SP were not used to ease debug of
; routines under DOS.
; REGISTER USES:
;       AX-TEMP
;       BX-Intermediate Checksum storage
;       CX-Loop Counter, Return address usage
;       DX-I/O Port Index,EMS Page Counter
;
;       SP-
;       BP-Outer loop count storage
;       SI-Index into segment being summed
;       DI-Level 2 return address storage
;
;       CS-Code Segment
;       DS-Segment being summed
;       SS-
;       ES-Level 1 return address storage
;----------------------------------------------------------
; ChecksumDRAM: Checksums DRAM and stores value in CMOS
;
; ENTRY:
;       None
;
; EXIT:
;       16-bit checksum of DRAM is stored in CMOS
;----------------------------------------------------------
```

```
09/19/1989 10:49    Filename: STANDBY.ASM                              Page 31

ChecksumDRAM    PROC    NEAR
                MOV     AX,Offset CKRet1
                MOV     ES,AX
                JMP     CalcDRAMSum                 ; checksum DRAM, level 1 Call
CKRet1:
; Store checksum in CMOS
                MOV     DX,CMOSAD                   ; CMOS address register
                MOV     AL,CMDRAMCKHLO              ; register to store this byte
                OUT     DX,AL
                INC     DX                          ; CMOS data register
                MOV     AL,BL                       ; save this byte
                OUT     DX,AL
                DEC     DX
                MOV     AL,CMDRAMCKHHI              ; register to store this byte
                OUT     DX,AL
                INC     DX
                MOV     AL,BH                       ; save this byte
                OUT     DX,AL
ChecksumDRAM    ENDP ;****************************************************************
;*  ChecksumVRAM: Checksum video RAM and stores value in CMOS
;*
;*  ENTRY:
;*      None
;*  EXIT:
;*      16-bit checksum is stored in CMOS
;****************************************************************
ChecksumVRAM    PROC    NEAR
                MOV     AX,Offset VRAMRet1
                MOV     ES,AX                       ; Save ret address
                JMP     CalcVRAMSum                 ; calculate video RAM checksum
VRAMRet1:
                MOV     BX,AX                       ; save checksum in BX
; Store checksum in CMOS
                MOV     DX,CMOSAD                   ; CMOS address register
                MOV     AL,CMVRAMCKHLO              ; register to store this byte
                OUT     DX,AL
                INC     DX                          ; CMOS data register
                MOV     AL,BL
                OUT     DX,AL                       ; save this byte
                DEC     DX
                MOV     AL,CMVRAMCKHI               ; register to store this byte
                OUT     DX,AL
                INC     DX
                MOV     AL,BH
                OUT     DX,AL                       ; save this byte
```

```
09/19/1989 10:49    Filename: STANDBY.ASM                              Page 32

JMP     VerifyRefresh               ; continue with Suspend entry
ChecksumVRAM    ENDP ;****************************************************************
;*  CalcDRAMSum: Checksum DRAM
;*              - Level 1 Subroutine
;*
;*  ENTRY:
;*      ES=Return Address
;*  EXIT:
;*      BX = 16-bit checksum of DRAM
;*      AX = 16-bit checksum of DRAM
;*
;*  This routine computes a 16-bit checksum of system DRAM. It
;*  determines the amount of base memory and expanded memory
;*  by reading the values stored in CMOS.
;****************************************************************
                PUBLIC  CalcDRAMSum
CalcDRAMSum     PROC    NEAR
                XOR     AX,AX                       ; store intermediate checksum in BX
                MOV     BX,AX                       ; start checksum at 0000:0000
                MOV     DS,AX ; Checksum the conventional RAM first
;****************************************************************
; NOTE: This code only works if the base memory size is a multiple
; of 64K.
;****************************************************************
                MOV     AL,CMBMH
                CALL    CMREAD                      ; get base memory size (high byte)
                MOV     AH,AL                       ; save in AH
                MOV     AL,CMBML
                CALL    CMREAD                      ; get base memory size (low byte)
                MOV     CL,6
                SHR     AX,CL                       ; divide by 64 to get the # of
                MOV     CX,AX                       ; 64K segments
                                                    ; now it's a loop counter
                MOV     CX,10                       ; assume 640K
                MOV     AX,Offset ConvRet1
                MOV     DI,AX                       ; don't need this in loop
ConvDRAMLoop:                                       ; save return address level 2
                MOV     BP,CX                       ; save count of segments
                MOV     CX,8000h                    ; checksum 32K words at once
                JMP     Checksum16                  ; do checksum for this 64K
ConvRet1:
                ADD     BX,AX                       ; store intermediate result in BX
                MOV     AX,DS
                ADD     AX,1000h                    ; point to next 64K segment
                MOV     DS,AX
                MOV     CX,BP                       ; set count of 64K segments
                LOOP    ConvDRAMLoop                ; continue checksum of conv. RAM
```

```
09/19/1989 10:49    Filename: STANDBY.ASM              Page 33

IF FALSE
; Now checksum EMS RAM
;*************************************************************
; NOTE: This code only works if the expanded memory size is a multiple
; of 16K.
;*************************************************************
        MOV     AL,CMDMB
        CALL    CMDREAD             ; get EMS memory size (high byte)
        MOV     AH,AL               ; save in AH
        MOV     AL,CMDML
        CALL    CMDREAD             ; get EMS memory size (low byte)

MOV     CL,4
        SHR     AX,CL               ; divide by 16 to get the # of
                                    ; 16K segments
        MOV     CX,AX               ; now it's a loop counter MOV     CX,384/16           ; assume 384K of EMS XOR     DX,DX               ; start with EMS page #0

MOV     AX,EMSBaseAddr      ; point DS to 0E000h
        MOV     DS,AX

MOV     AX,Offset EMSRet1   ; don't need this in loop
        MOV     DI,AX               ; save return address level 2

EMSDRAMLoop:
        MOV     BP,CX               ; save outer loop counter

MOV     AX,DX               ; put page # in AL
        MOV     DX,258h             ; EMS page register 0
        OUT     DX,AL               ; map in page
        MOV     DX,AX               ; restore current page number MOV     CX,2000h            ; 8K words
        JMP     Checksum16          ; do checksum for this 16K EMSRet1:
        ADD     BX,AX               ; store intermediate result in BX
        INC     DX                  ; point to next EMS page MOV     CX,BP               ; get count of 16K segments
        LOOP    EMSDRAMLoop         ; continue checksum of EMS RAM
ENDIF ; IF FALSE MOV     AX,BX               ; return checksum in AX MOV     CX,ES
        JMP     CX                  ; level 1 return CalcDRAMSum     ENDP ;*************************************************************
;* CalcVRAMSum: Checksums video RAM from B800-C000
;*     - Level 1 Subroutine
;*
;* ENTRY:
;*     ES-Return Address
```

```
09/19/1989 10:49    Filename: STANDBY.ASM              Page 34

;* EXIT:
;*     AX - 16-bit checksum of video RAM
;*
;* This routine checksums video RAM, which it assumes occupies 32K
;* between B8000h and C0000h. The checksum is 16 bits.
;*************************************************************
        PUBLIC  CalcVRAMSum
CalcVRAMSum     PROC    NEAR MOV     AX,0B800h
        MOV     DS,AX               ; start checksum at B800:0000

MOV     CX,4000h            ; checksum 16K words
        MOV     AX,Offset CalcVRet1
        MOV     DI,AX
        JMP     Checksum16          ; do checksum for this 64K CalcVRet1:
        MOV     DX,ES
        JMP     DX                  ; level 1 return CalcVRAMSum     ENDP ;*************************************************************
;* Checksum16: Performs 16-bit checksum of an area of memory
;*      - Level 2 subroutine
;*
;* ENTRY:
;*     DI = return address for routine
;*     DS = pointer to segment paragraph start
;*     CX = # of words to checksum
;*
;* EXIT:
;*     SI = input CX
;*     AX = checksum
;*     ZF set if checksum = 0
;*************************************************************
Checksum16      PROC    NEAR XOR     AX,AX               ; start checksum
        XOR     SI,SI ChecksumLoop:
        ADD     AX,WORD PTR [SI]    ; ignore carry bit
        ADD     SI,2                ; next word
        LOOP    ChecksumLoop OR      AX,AX               ; Set zero flag if OK
        MOV     CX,DI
        JMP     CX                  ; Level 2 return Checksum16      ENDP ENDIF ; IF Checksum ; Read lowest 512 bytes of both banks of RAM (guarantee refresh counter)
;
VerifyRefresh:
        XOR     AX,AX               ; point at absolute zero
        MOV     DS,AX
        MOV     SI,AX
        MOV     CX,0200h            ; number of adds to toggle thru
```

```
09/19/1989 10:49        Filename: STANDBY.ASM                       Page 35

REP     LODSW                           ; just read them

XOR     SI,SI                           ; point at bottom of second bank
         MOV     AX,8000h                        ; number of adds to toggle thru
         MOV     DS,AX                           ; just read them
         MOV     CX,0200h
         REP     LODSW ; Disable 82C100 refresh MOV     AL,49_WaitStates
         OUT     CfgIndexPort,AL                 ; wait State, Ref Enable, Kbd Type
         IN      AL,CfgDataPort                  ; get current setting
         AND     AL,NOT _49_RefluEnb             ; clear REF enable bit
         MOV     AH,AL                           ; Save it MOV     AL,49_WaitStates                ; wait State, Ref Enable, Kbd Type
         OUT     CfgIndexPort,AL
         MOV     AL,AH
         OUT     CfgDataPort,AL ; Maintain LED status, enable Suspend addresses to DRAM, shut off power MOV     DX,POWERCTRLPORT                ; suspend status
         IN      AL,DX
         AND     AL,NOT (SYSTEMPOWERON OR EXTPOWERON)  ; clear power on bit, leave others
         OR      AL,SUSPENDENABLE                ; set suspend bit, leave others
         OUT     DX,AL PUBLIC  ByeBye
ByeBye:
; Bye Bye for now

HLT

NOP                                     ; filler instruction - jfc

;XXXXXXXXXXXXXXXXXXXXXXXXXXXXXXXXXXXXXXXXXXXXXXXXXXXXXXXXXXXXXXXXXXXXXXXXXXXXX
; Code executed when exiting standby
;XXXXXXXXXXXXXXXXXXXXXXXXXXXXXXXXXXXXXXXXXXXXXXXXXXXXXXXXXXXXXXXXXXXXXXXXXXXXX
;*****************************************************************************
;*
;* RestoreState - Reset I/O ports
;*              - Level 1 Subroutine
;*
;* ENTRY:
;*      ES-Return Address
;*
;* EXIT:
;*      None
;*
;*****************************************************************************

PUBLIC  RestoreState

RestoreState    PROC    NEAR

ASSUME  DS:DGROUP
```

```
09/19/1989 10:49        Filename: STANDBY.ASM                       Page 36

MOV     AX,40h                          ; setup DS:SI to point
         MOV     DS,AX                           ; to suspend bytes
         MOV     SI,OFFSET SuspendBytes          ; make sure LODSB works
         CLD AND     MinPowerStatus,NOT 01h          ; clear minimum threshold bit ; Get the 8259 mask LODSB
         MOV     BH,AL                           ; don't enable ints yet
         MOV     AL,0FFh                         ; but set value for later
         OUT     PICOMSK,AL                      ; in fact, disable ints now ; Restore DMA regs MOV     DX,DMACLFF                      ; port 0Ch
         OUT     DX,AL                           ; clear first/last byte flip-flop MOV     CX,8                            ; set 4 DMA regs info
         MOV     DX,DMA0ADR                      ; start at port 0
DMARestoreLoop:
         LODSB                                   ; set LSB
         OUT     DX,AL                           ; set it
         LODSB                                   ; set MSB
         OUT     DX,AL                           ; set it
         INC     DX
         LOOP    DMARestoreLoop ; Restore the DMA command register LODSB
         OUT     DMACMD,AL                       ; port 08h ; Restore the 4 DMA mode registers MOV     CX,4
DMARestoreMode:
         LODSB
         OUT     DMAMODE,AL                      ; port 0Bh
         LOOP    DMARestoreMode ; Set DMA page register values MOV     DX,DMAPG1                       ; start with DMA page register 1
         LODSB
         OUT     DX,AL

MOV     DX,DMAPG2
         LODSB
         OUT     DX,AL

MOV     DX,DMAPG3
         LODSB
         OUT     DX,AL

; Restore the DMA mask register bits
```

```
09/19/1989 10:49    Filename: STANDBY.ASM                Page 37

LODSB
        OUT     DMAMASK,AL              ; DMA mask bits
                                        ; write all DMA mask bits command ; Set the 8255 PPI ports MOV     DX,PPIA
        LODSB
        OUT     DX,AL                   ; set the kbd scan code INC     DX
        LODSB                           ; read PPIB
        MOV     BL,AL                   ; save PPIB value ADD     DX,2
        LODSB                           ; read PPI control port MOV     AL,99h
        OUT     DX,AL                   ; point to PPIB again
                                        ; restore PPIB value

SUB     DX,2
        MOV     AL,BL
        OUT     DX,AL

MOV     AH,AL                   ; save value written
        DEC     DX                      ; read port 60h to clear kbd
        IN      AL,DX MOV     AL,AH
        INC     DX
        OR      AL,SNSWEN
        OUT     DX,AL                   ; do keyboard acknowledge
        XOR     AL,SNSWEN
        OUT     DX,AL ; Set the EMS page registers MOV     DX,EMSPort0
        MOV     CX,4

EMSRestoreLoop:
        LODSB
        OUT     DX,AL                   ; port 258h
        ADD     DX,4000h                ; read 4 EMS ports
        LOOP    EMSRestoreLoop MOV     BL,AL                   ; next EMS port ; Restore the UART ports MOV     DX,UART1Base+3
        MOV     AL,0
        OUT     DX,AL                   ; port 3FB
                                        ; make DLAB 0

LODSB
        MOV     BL,AL                   ; set saved value for 3FB
                                        ; save in BL MOV     CX,3
UART1RestoreLoop:
        INC     DX
        LODSB
        OUT     DX,AL                   ; port 3FB, 3FC, 3FD, 3FE
        LOOP    UART1RestoreLoop MOV     DX,UART1Base+1          ; port 3F9h
        LODSB 09/19/1989 10:49    Filename: STANDBY.ASM                Page 38

OUT     DX,AL                   ; port 3FB

ADD     DX,2                    ; make DLAB 1
        MOV     AL,80h
        OUT     DX,AL SUB     DX,3                    ; port 3F8, divisor LSB
        LODSB
        OUT     DX,AL INC     DX                      ; port 3F9, divisor MSB
        LODSB
        OUT     DX,AL MOV     AL,BL                   ; set saved value for 3FB
        ADD     DX,2                    ; save in BL
        OUT     DX,AL                   ; 40:0FAh ; Restore the UART ports for UART 2

MOV     DI,SI
        MOV     SI,OFFSET Suspend2FB    ; save LODSB ptr
                                        ; 40:0A6h MOV     DX,UART2Base+3          ; port 2FB
        MOV     AL,0                    ; make DLAB 0
        OUT     DX,AL LODSB
        MOV     BL,AL                   ; set saved value for 2FB
        MOV     SI,OFFSET Suspend2FBBytes ; save in BL MOV     CX,3
UART2RestoreLoop:
        INC     DX
        LODSB
        OUT     DX,AL
        LOOP    UART2RestoreLoop MOV     DX,UART2Base+1          ; port 2F9h
        LODSB
        OUT     DX,AL ADD     DX,2                    ; port 2FB
        MOV     AL,80h                  ; make DLAB 1
        OUT     DX,AL SUB     DX,3                    ; port 2F8, divisor LSB
        LODSB
        OUT     DX,AL INC     DX                      ; port 2F9, divisor MSB
        LODSB
        OUT     DX,AL MOV     AL,BL                   ; set saved value for 2FB
        ADD     DX,2
        OUT     DX,AL MOV     SI,DI                   ; restore previous LODSB ptr ; Restore parallel port regs MOV     DX,PPBase               ; port 378h
        LODSB
```

```
        OUT     DX,AL

ADD     DX,2            ; base+2
        LODSB
        OUT     DX,AL

; Funky return
        MOV     DX,ES
        JMP     DX              ; level 1 return RestoreState    ENDP ;************************************************************
;
; Restore82C100 - restores 82C100 registers
;
; ENTRY:
;       None
; EXIT:
;       None
;
;************************************************************

PUBLIC  Restore82C100

Restore82C100   PROC    NEAR

ASSUME  DS:DGROUP
        MOV     SI,OFFSET Save82C100Bytes   ; DS already = 40h
        CLD                                 ; point to 82C100 bytes
                                            ; make sure LODSB works LODSB                               ; value for reg 43h
        MOV     AH,AL
        MOV     AL,43 DIPSwitches
        CALL    Write82C100                 ; write it MOV     AL,4B SleepMemCfg
        CALL    Read82C100                  ; don't change low nibble
        AND     AH,0Fh LODSB                               ; only restore upper nibble
        AND     AH,AL
        OR      AH,AL
        MOV     AL,4B SleepMemCfg
        CALL    Write82C100                 ; write it LODSB
        OUT     _72_NMIControl,AL           ; set port 72h ; Restore pad I/O ports:
;       186h, 187h
        MOV     DX,MODEMCTRLPORT            ; port 186h
        MOV     AL,ModemSlabCtrl            ; get last value written
        OUT     DX,AL INC     DX                          ; port 187h
        MOV     AL,KbdSerialCtrl            ; get last value written
        OUT     DX,AL

RET
```

```
Restore82C100   ENDP

;------------------------------------------------------------
;                       RestoreOverlay
;------------------------------------------------------------
; This routine restores the overlay controller on exit from
; suspend mode. NMI is enabled after this routine.

RestoreOverlay  PROC    NEAR

PUBLIC  RestoreOverlay

; NMI is enabled after this call

CALL    OVL_RESET               ; re-enable overlay controller
        MOV     AL,NMI_OFF              ; OVL_RESET enables NMI, so disable it
        OUT     NMIMASK,AL ; Restore overlay controller state

ASSUME  DS:DGROUP

; DS = 40h from call to Restore82C100 made in INITCDGP.ASM

MOV     AL,86h                  ; write overlay RAM command
        CALL    OVL_PUT_BYTE            ; send command
        MOV     AL,20h                  ; RAM location to read
        CALL    OVL_PUT_BYTE            ; send data
        MOV     AL,SaveOvlyByte         ; get saved overlay byte
        CALL    OVL_PUT_BYTE            ; send byte MOV     AL,CMCONTRAST           ; contrast calibration value
        CALL    CMREAD                  ; get this value
        MOV     AH,AL                   ; save it MOV     AL,84h                  ; set screen contrast calibration
        CALL    OVL_PUT_BYTE            ; send command
        MOV     AL,AH
        JC      ROOvlFail
        CALL    OVL_PUT_BYTE            ; send command
        JC      ROOvlFail MOV     DL,0FFh                 ; get current auto calibration setting
        CALL    SET_CONTRAST_STATE
        OR      AH,AH                   ; error?
        JNZ     ROOvlFail               ; yes CALL    SET_CONTRAST_STATE      ; set current setting
        OR      AH,AH
        JZ      ROOvlOk ROOvlFail:
        EXTRN   SYSRESET:NEAR
        JMP     SYSRESET                ; force cold boot ROOvlOk:
        CALL    InitializeThreshold     ; reinitialize battery threshold CALL    RestoreButtons          ; restore buttons MOV     DL,01h                  ; enable buttons
```

```
09/19/1989 10:49    Filename: STANDBY.ASM                    Page 41

CALL    DisableOverlay
        RET

RestoreOverlay ENDP

;---------------------------------------------------------------
;
;                       DisableButtons
;
;---------------------------------------------------------------
; ENTRY:
;       AX = 0E48Eh
;       DL = 00h to disable buttons
;       DL = 01h to enable buttons
;       DL = 0FFh to get current setting
; EXIT:
;       CY = 1
;          AH = 86h if subsystem not supported
;       CY = 0
;          AH = 0
;          If DL = 0FFh on entry:
;             DL = 00h if buttons are disabled
;             DL = 01h if buttons are enabled
;
        PUBLIC  DisableButtons
DisableButtons  PROC    NEAR
        call    set_button_state
        RET
DisableButtons  ENDP ;---------------------------------------------------------------
;
;                       RestoreButtons
;
;---------------------------------------------------------------
; This routine restores the button's values, including on/off
;
RestoreButtons  PROC    NEAR
        ASSUME  DS:DGROUP MOV     CX,5                    ; restore 5 buttons
        MOV     BX,OFFSET Button1+4     ; last button
RBLoop:
        MOV     AL,[BX]                 ; set button value PUSH    BX
        MOV     BL,CL                   ; button # in BL
        DEC     BL                      ; scan code in BB
        MOV     BH,AL                   ; set button value
        CALL    Write_Button POP     BX
        DEC     BX                      ; previous button
        LOOP    RBLoop RET
RestoreButtons  ENDP

;XXXXXXXXXXXXXXXXXXXXXXXXXXXXXXXXXXXXXXXXXXXXXXXXXXXXXXXXXXXXXXX
```

```
09/19/1989 10:49    Filename: STANDBY.ASM                    Page 42

; Miscellaneous routines called when entering or exiting standby mode
;XXXXXXXXXXXXXXXXXXXXXXXXXXXXXXXXXXXXXXXXXXXXXXXXXXXXXXXXXXXXXXX ;---------------------------------------------------------------
;
;                       SetSpeedFast
;
;---------------------------------------------------------------

SetSpeedFast    PROC    NEAR
; For Rev. 2 MLB:
;       Fast speed: 3 mem waits, 4 I/O waits, 2 DMA wait
;       Use CmdDelay for fast speed (10Mhz).
;       Must set wait states before going from slow to fast.
;
; Note in CMOS segment that we're in fast mode so the state can
; be restored after suspend mode.

PUSHF
        CLI                             ; no interrupts

MOV     AL,CMCPUSPEED           ; store new speed in CMOS
        CALL    CMREAD                  ; by changing only one bit
        AND     AL,NOT SLOW             ; turn off SLOW bit MOV     AH,CMCPUSPEED           ; store new speed in CMOS
        CALL    CMWRT ; Set wait states before changing clock speed MOV     AL,_49_WaitStates
        CALL    Read82C100
        AND     AH,_49_RefTimEnb OR _49_KbdPS2 ; read port 49h
        WAFORIO                         ; throw away I/O bits
        WAFORIO
        WAFORIO
        OR      AH,_49_MemWaits3 OR _49_IOWaits4 OR _49_DMAWaits2
        CALL    Write82C100
        JMP     $+2                     ; clear prefetch queue
        WAFORIO
;
; Now change cmd delay
;
        WAFORIO
        WAFORIO
        WAFORIO
        MOV     AL,_41_SysConfig
        CALL    Read82C100              ; read port 41h WAFORIO
        WAFORIO
        WAFORIO
        OR      AH,_41_CmdDelay         ; command delay for high speed
        CALL    Write82C100
        JMP     $+2                     ; clear prefetch queue WAFORIO
; Now change clock speed
;
        WAFORIO
        WAFORIO
        WAFORIO
```

```
09/19/1989 10:49        Filename: STANDBY.ASM                           Page 43

MOV     AL,_40_ClockMode        ; read 82C100 port 40h
        CALL    Read82C100              ; value returned in AH WAFORIO
        WAFORIO
        WAFORIO
        WAFORIO
        OR      AH,_40_ClockFast OR _40_DMASysDiv2  ; set fast clock & DMA/2
        CALL    Write82C100
        JMP     $+2                     ; clear prefetch queue POPF
        RET
SetSpeedFast    ENDP ;----------------------------------------------------------
;                       Read82C100
;----------------------------------------------------------
; ENTRY:
;       AL = 82C100 register to read
; EXIT:
;       AL unchanged
;       AH = value of that register PUBLIC  Read82C100
Read82C100      PROC    NEAR OUT     CfgIndexPort,AL         ; write index value
        MOV     AH,AL                   ; save index value
        MOV     AL,CfgDataPort
        IN      AL,CfgDataPort          ; read data
        XCHG    AH,AL                   ; return data in AH, index in AL
        RET
Read82C100      ENDP ;----------------------------------------------------------
;                       Write82C100
;----------------------------------------------------------
; ENTRY:
;       AL = 82C100 register to write to
;       AH = value to write
; EXIT:
;       AX unchanged PUBLIC  Write82C100
Write82C100     PROC    NEAR OUT     CfgIndexPort,AL         ; write index value
        PUSH    AX
        MOV     AL,AH
        OUT     CfgDataPort,AL          ; write data
        POP     AX
        RET
Write82C100     ENDP ;----------------------------------------------------------
;                       RTCInit
;----------------------------------------------------------
```

```
09/19/1989 10:49        Filename: STANDBY.ASM                           Page 44

; ENTRY:
;       None
; EXIT:
;       RTC is initialized for:
;               24-hour mode
;               BCD mode
;               Alarm interrupts off
;               Periodic interrupts off PUBLIC  RTCInit
RTCInit         PROC    NEAR PUSH    AX
        CLI
        CALL    RTCNoUIP                ; wait til no update-in-progress
        JNC     RTCNWOk                 ; hardware ok STC
        POP     AX                      ; return error
        RET RTCNWOk:
        MOV     AH,CMAST
        MOV     AL,26h                  ; AL = 0Ah
        CALL    CMWRT                   ; initialize divisor MOV     AL,CMBST                ; set register 0Bh
        CALL    CMREAD                  ; read current value
        AND     AL,NOT (SRBSET OR SRBPIE OR SRBUIE OR SRBDM)
        OR      AL,SRB24H               ; enable 24-hour mode
        MOV     AH,CMBST                ; set register 0Bh
        CALL    CMWRT CLC
        POP     AX                      ; return no error
        RET RTCInit         ENDP ;----------------------------------------------------------
;                       RTCNoUIP
;----------------------------------------------------------
; ENTRY:
;       None
; EXIT:
;       CY = 0 if no update in progress within timeout period
;       CY = 1 if update happening too long (hardware failure)

RTCNoUIP        PROC    NEAR

PUSH    CX
        MOV     CX,1000                 ; timeout count

UIPLoop:
        MOV     AL,CMAST                ; read status reg A
        CLI                             ; don't allow interrupts
        CALL    CMREAD
        TEST    AL,SRAUIP               ; update-in-progress?
        JZ      UIPExit                 ; no, so exit with CY = 0 from TEST
```

```
09/19/1989 10:49        Filename: STANDBY.ASM                              Page 45

STI
        LOOP    UIPLoop                 ; try again

STC
UIPExit:
        POP     CX
        RET
RTCNoUIP ENDP

A60     PUBLIC XLATOD
ACONST  DW 60
XLATOD  DD 1193180
        PROC NEAR                       ; load timer-tick count from CMOS time-of-day
                                        ; returns C clear if out of range

MOV     DS,WORD PTR CS:DS40H
        ASSUME DS:DGROUP

; When exiting suspend mode, doing an int 1Ah causes MS-DOS code
; to get executed if DOS has taken over int 1Ah. Because the
; entire state is not restored yet, this is a problem. It seems to
; trash DOS's FAT tables, among other things. So, to make a long story
; short, we call the BIOS int 1Ah routine directly here instead of
; doing the s/w interrupt.

EXTRN   TIMDSR:NEAR

MOV     AH,2                    ; simulate int 1Ah
        PUSHF                           ; with this FAR CALL
        CALLFAR 0F000h,TIMDSR CMP     CH,24h                  ;ch= BCD hours, cl= BCD minutes, dh= BCD seconds
        JNC     XRET
        CMP     CL,60h
        JNC     XRET                    ;exit reporting error if too many minutes
        CMP     DH,60h
        JNC     XRET                    ;exit reporting error if too many seconds
        MOV     AL,CH
        CALL    UNBCD
        MUL     BYTE PTR A60            ;ax= # of minutes in all hours
        XCHG    AX,CX                   ;cl= BCD minute, cx= # of minutes in all hours
        CALL    UNBCD
        ADD     AX,CX
        MOV     AH,0
        MOV     AX,CX                   ;ax= total # minutes
        MOV     BL,DH                   ;save dh
        MUL     WORD PTR A60            ;dx.ax= # of seconds in all hours & minutes
        MOV     CX,AX
        MOV     AL,BL                   ;dx.cx= # of seconds in all hours & minutes
        CALL    UNBCD
        MOV     AH,0
        ADD     AX,CX
        JNC     DXOK
        INC     DX
DXOK:
        MOV     RITIME,0
        PUSH    DX
        PUSH    AX
        MUL     WORD PTR ACONST         ;dx.ax = low 16 of seconds * low 16 of constant
        MOV     LOTIME,DX
```

```
09/19/1989 10:49        Filename: STANDBY.ASM                              Page 46

POP     AX
        MUL     WORD PTR ACONST+2       ;dx.ax = low 16 of seconds * high 8 of co
nstant  ADD     LOTIME,AX
        ADC     HITIME,DX
        POP     AX
        PUSH    AX
        MUL     WORD PTR ACONST         ;cl = high 8 of seconds * low 16 of constant
        ADD     LOTIME,AX
        ADC     HITIME,DX
        POP     AX
        MUL     BYTE PTR ACONST+2       ;cl = hi 8 of seconds
                                        ;ax = high 8 of seconds * high 8 of const
ant     ADD     HITIME,AX
        STC                             ;indicate no error
XRET:
        RET
XLATOD  ENDP
A10     DB 10

UNBCD   PROC    NEAR                    ;uses bh as scratch
        PUSH    CX
        MOV     BH,AL
        AND     BH,0FH                  ;isolate low nibble
        MOV     CL,4
        SHR     AL,CL
        MUL     A10                     ;multiply hi nibble * 10
        ADD     AL,BH
        POP     CX
        RET
        ASSUME DS:NOTHING
UNBCD   ENDP ;----------------------------------------
;                ReinitDisplay
;----------------------------------------
; This routine reinitializes the display hardware and firmware
; state when we come out of suspend mode.

ASSUME  DS:DGROUP
        PUBLIC  ReinitDisplay
        EXTRN   CRTDSR:NEAR

ReinitDisplay   PROC    NEAR

CALL    InitPanel               ; initialize panel to 25-line mode

; Make sure Int 10h points to the ROM BIOS so we don't execute
; DOS code yet

CLI
        MOV     SI,10h*4                ; save current video int vector
        PUSH    WORD PTR [SI]
        PUSH    WORD PTR [SI+2]
        MOV     AX,OFFSET CRTDSR
        MOV     WORD PTR [SI],AX
        MOV     AX,CS
        MOV     WORD PTR [SI+2],AX
```

```
            MOV     SuspendFlag,0FFh        ; tell int 10h we're in suspend mode MOV     AH,00h                  ; set video mode
            MOV     AL,CRTMODE
            INT     10h MOV     AH,01h                  ; set cursor type
            MOV     CX,CURTYPE
            INT     10h MOV     AH,05h                  ; set active page
            MOV     AL,DSPPAG
            INT     10h MOV     SuspendFlag,00b         ; tell int 10h we're not in suspend mode ; Reinitialize 50-line text mode if that's where we were
;
            CMP     VideoMode,TEXT50MODE    ; are we in 50-line text mode?
            JNE     RDExit                  ; no ; Put the screen back in 50-line mode
;
            MOV     AL,CRTMODE
            MOV     VideoMode,AL work        MOV     DL,01h                  ; must do this to make SelectSplitScreen
            CALL    SelectSplitScreen RDExit:     POP     WORD PTR [SI+2]         ; restores int 10h vector
            POP     WORD PTR [SI]

RET
            ASSUME  DS:NOTHING
ReinitDisplay ENDP

;*************************************************************************
; InitPanel: PROCEDURE NEAR
;
; This routine will turn off the external monitor (if on) and will program
; the timing registers for either the
;   1) the LM236 Hitachi 640 x 200 LCD display
;   2) NEC 640x400 Plasma display
;*************************************************************************
InitPanel PROC NEAR
            PUSH    DS
            PUSH    CS
            POP     DS                      ; DS = CS CALL    DisableProtection
            CALL    Program6845Regs
            MOV     SI,OFFSET LM758_200BankData
            CALL    ProgramBankDataRegs
            CALL    ProgramColorReg
            MOV     AL,modeReg              ; AL = 29 by default
            CALL    ProgramModeReg
            CALL    InitColorMap            ; set colormap to 0

POP     DS
            RET
```

```
InitPanel ENDP

; 6845 registers.

Regs6845        DB  71h, 50h, 5Ah, 0Ah, 1Fh, 06h, 19h, 1Ch
                DB  02h, 07h, 06h, 07h, 00h, 00h, 00h, 00h EnableController EQU 81h
ModeReg          EQU 29h
ColorReg         EQU 0
ControlID        EQU 1

; Controller parameters for our different displays

; Kyocera LM758 640x400 display in 640x200 mode

LM758_200BankData:
                DB  0C7b, 9Fh, 0Fh,  01h, 02h, 081h, 80h, 8Ah
                DB  0C7h, 0Fh, 44h,  01h, 02h, 95h,  80h, 8Ah
                DB  66h,  40h, 00h,  00h, 00h, 00h,  00h, 00h
                DB  55h,  0F8h,0FDh, 0Ah, 19h, 00h,  07h, 60h
                DB  2Ah,  0FCh,0F4h, 0Ah, 67h, 00h,  01h, 67h
                DB  8Bh LM236BankDataU:                                              ;;; *** 10/7 fast
                DB  63h,  9Fh, 07h,  0F5h,02h, 0B0h, 80h, 8Bh
or video        DB  6Fh,  33h, 00h,  00h, 00h, 00h,  00h, 00h
                DB  80h,  0F8h,0FDh, 0Ah, 19h, 00h,  07h, 00h
                DB  44h,  0FCh,0F4h, 0Ah, 67h, 00h,  01h, 07h ; 6845 and V6366 registers for 50-line text mode
; 6845 registers, 50 row mode, change R6 to 50 rows required Regs6845_50     DB  71h, 50h, 5Ah, 0Ah, 1Fh, 06h, 50h, 1Ch
                DB  02h, 07h, 06h, 07h, 00h, 00h, 00h, 00h ; LM758 640x400 display, 80x50 character mode and 640x200 Graphics mode
; change R32 from fdh to 22 R34 from 19h to 31, and R37 from 60h to 0

LM758_400_50BankData:
                DB  0C7b, 9Fh, 0Fh,  81h, 02h, 081h, 80h, 8Ah
                DB  66h,  40h, 00h,  00h, 00h, 00h,  00h, 00h
                DB  55h,  0F8h,22,   0Ah, 31, 00h,   07h, 0h
                DB  2Ah,  0FCh,0Fh,  0Ah, 67h, 00h,  01h, 067h
                DB  8Bh ; New LM758 640x400 display in 640x400 mode LM758_400BankData:
                DB  0C7b, 9Fh, 0Fh,  81h, 02h, 02Zh, 75h, 80h, 8Ah
                DB  66h,  00h, 00h,  00h, 00h, 19h,  00h, 07h, 60h
                DB  55h,  0F8h,0F0h, 0Ah, 0Fh, 0h,   00h, 03h, 07h
                DB  2Ah,  0FCh,0F4h, 0Ah, 67h, 00h,  00h, 01h, 067h
                DB  8Bh LCDBankData:                                                 ;index 0
                DB  00h,00h,  00h,00h,  02h,20h
                DB  02h,00h,  02h,00h,  01h,00h DB  00h,00h,  00h,00h,  02h,20h
```

```
            DB  02h,00h,  02h,00h,  01h,00h
            DB  002h                              ;index 1
            DB  00h,00h,  02h,20h,  02h,20h
            DB  02h,00h,  02h,00h,  01h,00h
            DB  00h,00h,  02h,20h,  02h,20h
            DB  02h,00h,  02h,00h,  01h,00h
            DB  002h                              ;index 2
            DB  00h,00h,  02h,00h,  02h,20h
            DB  02h,20h,  02h,00h,  01h,00h
            DB  00h,00h,  02h,00h,  02h,20h
            DB  02h,20h,  02h,00h,  01h,00h
            DB  002h                              ;index 3
            DB  00h,00h,  00h,00h,  02h,00h
            DB  02h,20h,  02h,20h,  01h,00h
            DB  00h,00h,  00h,00h,  02h,00h
            DB  02h,20h,  02h,20h,  01h,00h
            DB  002h                              ;index 4
            DB  00h,00h,  00h,00h,  02h,00h
            DB  02h,00h,  02h,20h,  01h,00h
            DB  00h,00h,  00h,00h,  02h,00h
            DB  02h,00h,  02h,20h,  01h,00h
            DB  082h
            DB  00h,00h,  00h,00h,  02h,20h      ;index 5
            DB  02h,20h,  02h,00h,  01h,00h
            DB  00h,00h,  00h,00h,  02h,20h
            DB  02h,20h,  02h,00h,  01h,00h
            DB  0C2h DisableProtection: PROCEDURE CLEAR;
;
; This routine will enable the Yamaha Chip to write into the data bank
; by setting the Protect- bit in the Control/ID Register (3df).
; On return:
;   DX - base address of the video controller ports
;   AX - current video mode DisableProtection PROC NEAR
            MOV   DX,3dfh
            MOV   AL,EnableController
            OUT   DX,AL
            SUB   DX,7
            IN    AL,DX                           ; Mode register (3d8h)
            PUSH  AX                              ; get the current mode
            XOR   AL,AL
            OUT   DX,AL                           ; turn off the video
            POP   AX                              ; return the current mode
```

```
            SUB   DX,8                            ; 3d0h
            RET
DisableProtection ENDP ; WriteDataReg: PROCEDURE CLEAN
;
; This routine will write to the data register of the 6845.

WriteDataReg PROC NEAR
            PUSH  AX
            MOV   AL,BL
            OUT   DX,AL
            INC   DX
            POP   AX
            OUT   DX,AL
            DEC   DX
            RET
WriteDataReg ENDP ; Program6845Regs: PROCEDURE CLEAN;
;
; This routine will program the 6845 registers (3d_even, 3d_odd)

Program6845Regs PROC NEAR
            MOV   SI,OFFSET Regs6845
P6845Init:
            CLD
            MOV   BL,00
            MOV   CX,12
StartLoop:
            LODSB
            CALL  WriteDataReg
            INC   BL
            LOOP  StartLoop
            RET
Program6845Regs ENDP ; WriteBankData: PROCEDURE CLEAN
;
; This routine will write to the data register of the Bank WriteBankData PROC NEAR
            PUSH  AX
            MOV   AL,BL
            ADD   DX,0Dh
            OUT   DX,AL
            INC   DX
            POP   AX
            OUT   DX,AL
            SUB   DX,0Eh
            RET
WriteBankData ENDP ; ProgramBankDataRegs: PROCEDURE CLEAN;
;
```

```
09/19/1989 10:49    Filename: STANDBY.ASM                                Page 51

; This routine will program the BankData Registers

ProgramBankDataReg PROC NEAR
        MOV     AL,3Fh
        ADD     DX,0Dh
        OUT     DX,AL
        INC     DX
        MOV     AL,EnableController     ; Set 6845S mode
        OUT     DX,AL
        SUB     DX,0Eh MOV     CX,20h
        MOV     BL,20h
BankLoop1:
        LODSB
        CALL    WriteBankData
        INC     BL
        LOOP    BankLoop1

LODSB
        MOV     BL,27h
        CALL    WriteBankData

RET
ProgramBankDataReg ENDP

; ProgramColorReg: PROCEDURE CLEAR;
; This routine will program the Color Register ProgramColorReg PROC NEAR
        MOV     AL,colorReg
        ADD     DX,09
        OUT     DX,AL
        SUB     DX,09
        RET
ProgramColorReg ENDP ; ProgramModeReg: PROCEDURE CLEAR;
; This routine will program the Mode Register ProgramModeReg PROC NEAR
        ADD     DX,08
        OUT     DX,AL
        SUB     DX,08
        RET
ProgramModeReg ENDP ProgramBankDataReg2 PROC NEAR
        PUSH    AX
        PUSH    DX MOV     AL,81h
        MOV     DX,03DFh
        OUT     DX,AL MOV     AL,0h
        MOV     DX,03DDh
        OUT     DX,AL

INC     DX
```

```
09/19/1989 10:49    Filename: STANDBY.ASM                                Page 52

CLD
        MOV     CX,0020h

BankLoop2:
        LODSB
        OUT     DX,AL
        WAFORIO
        LOOP    BankLoop2

POP     DX
        POP     AX
        RET
ProgramBankDataReg2 ENDP

SetColorMap PROC NEAR
        PUSH    DS
        PUSH    AX
        PUSH    CX
        PUSH    SI

MOV     DS,CS:WORD PTR DS40B

XOR     AH,AH
        MOV     AL,ColorMapIndex
        CMP     AL,5
        JBE     SetColorMap1
        MOV     ColorMapIndex,0
        XOR     AL,AL
SetColorMap1:
        MOV     SI,AX
        MOV     CL,5
        SHL     AX,CL
        ADD     SI,AX
        ADD     SI,OFFSET LCDBankData

MOV     AX,CS
        MOV     DS,AX

CALL    ProgramBankDataReg2

POP     SI
        POP     CX
        POP     AX
        POP     DS
        RET
SetColorMap ENDP InitColorMap PROC NEAR
        PUSH    DS
        MOV     DS,CS:WORD PTR DS40B MOV     ColorMapIndex,0
        POP     DS
        CALL    SetColorMap
        RET
InitColorMap ENDP ;****************************************************
; This routine puts the screen in split-screen, 50-line mode,
; or in normal, 25-line text mode.
; It sets the variable 40:VideoMode to TEXT50MODE or to 03h.
;****************************************************

SelectSplitScreen
```

```
09/19/1989  10:49     Filename: STANDBY.ASM                                Page 53

; ENTRY:
;     DL = 00h to disable split-screen mode
;     DL = 01h to enable split-screen mode
;     DL = 0FFh to return state of split-screen mode public  .SelectSplitScreen
SelectSplitScreen   PROC    NEAR PUSH    DS
            ASSUME  DS:DGROUP
            MOV     DS,WORD PTR CS:DS40H CMP     DL,0FFh
            JE      SSSReturnState          ; want current state returned?
                                            ; yes
            CMP     DL,00h                  ; going to 25-line mode?
            JE      SSS25Line               ; yes
            CMP     DL,01h                  ; going to 50-line mode?
            JE      SSS50Line               ; yes
            MOV     AH,02h                  ; bad parameter error
            JMP     SHORT SSSExit SSSReturnState:
            XOR     AX,AX                   ; return no error
            MOV     DL,00h                  ; assume we're not in 50-line mode
            CMP     VideoMode,TEXT50Mode    ; in 50-line text mode now?
            JNE     SSSExit                 ; no
            INC     DL                      ; yes
            JMP     SHORT SSSExit SSS50Line:
            CMP     CRTMODE,02h             ; are we in 80x25-line mode now?
            JE      SSS50                   ; yes
            CMP     CRTMODE,03h             ; yes
            JE      SSS50
            CMP     CRTMODE,07h             ; should never get into mono mode, buy
            JE      SSS50                   ; just in case....

; Can't go into split-screen mode because we're not currently in
; in an 80x25 mode. Return error 01h.

MOV     AH,01h
            JMP     SHORT SSSExit

SSS50:
            MOV     AH,00
            MOV     AL,TEXT50MODE           ; going to 50-line mode
            INT     10h                     ; set into mode 94h
                                            ; this clears whole screen
            MOV     VideoMode,TEXT50Mode
            XOR     AX,AX SSSExit:
            POP     DS
            RET SSS25Line:
            MOV     VideoMode,03h MOV     AH,00                   ; going to 25-line mode
```

```
09/19/1989  10:49     Filename: STANDBY.ASM                                Page 54

MOV     AL,03h                  ; set into mode 03h
            INT     10h                     ; this clears whole screen XOR     AX,AX
            JMP     SHORT SSSExit SelectSplitScreen   ENDP ;*****************************************************************
;*
;*                         CT605.ASM
;*
;*  Copyright (C) 1988 by GRiD Systems Corporation. This program
;*  contains proprietary and confidential information. All rights
;*  reserved.
;*
;*  This module contains routines to configure and control the Chips &
;*  Technologies 82C605 CHIPSpak UART/Centronix chip.
;*  The routines include:
;*
;*      CT605Configure - puts the 605 in configuration mode
;*      CT605Enable    - enables the 82C605 chip
;*
;*****************************************************************

;*****************************************************************
;*
;*  CT605Configure - puts the 82C605 chip in configuration mode
;*
;*  ENTRY:
;*      None
;*      ???
;*  EXIT:
;*      None
;*      ???
;*
;*****************************************************************

CT605Configure  PROC    NEAR

; See the 82C605 manual for an explanation of this obscure algorithm
; to get the 605 into configuration mode

PUSH    AX
            PUSH    DX

MOV     DL,0FFh                 ; get serial configuration
            CALL    GetSerialPort
            MOV     BH,DH                   ; serial info in BH
            MOV     BL,CL                   ; modem info in BL CLI                             ; can't be interrupted ; Start the configuration mode, but do something wrong to put
; the 605 machine state into its idle mode. This corrects the
; problem of not being able to get into configuration mode
; on a warm boot.

MOV     AL,55h                  ; KEY value
            MOV     DX,2FAh                 ; COM2 IPR port
```

```
09/19/1989  10:49      Filename: STANDBY.ASM                         Page 55

OUT     DX,AL
                                        ; KEY- value
        MOV     AL                      ; COM1 IFR port
        ADD     DX,100h
        OUT     DX,AL MOV     AL,03h
        OUT     DX,AL ; Now do the real configuration...
;
        MOV     AL,55h                  ; KEY value
        MOV     DX,2FAh                 ; COM2 IFR port
        OUT     DX,AL MOV     AL                      ; KEY- value
        ADD     DX,100h                 ; COM1 IFR port
        OUT     DX,AL MOV     AL,36h
        OUT     DX,AL ; 605 should now be in configuration mode, so program it
; 1. Program the address of the Configuration Register Index port (CRI)
; 2. And the configuration Access Port (CAP)
;
; Write the (CRI address / 4) to 3FAh
; Write the (CRI address / 4)- to 2FAh MOV     AL,CPIndexPort
        SHR     AL,1                    ; get port addr
        SHR     AL,1                    ; divide by 4

OUT     DX,AL                   ; DX still = 3FAh

MOV     AL,-AL
        SUB     DX,100h                 ; DX = 2FAh
        OUT     DX,AL

MOV     AH,AL
        NOT     AH                      ; copy -(address/4) to AH

; Test to see if the CT605 chip responds correctly
;
        MOV     AL,CPUnit0 OR CPConfigCtrl  ; AL = 1Fh
        MOV     DX,CPIndexPort
        OUT     DX,AL                   ; DX = 24h
        INC     DX
        IN      AL,DX                   ; read port 25h ; The C&T manual is wrong on page 31, item 7.
; It says this should return the high 8 bits of the configuration port
; address. Instead, the chips we have return
; the configuration port address/4.
;
        CMP     AH,AL                   ; port responding with address/4?
        JE      CT6050k                 ; yes MOV     AR,CMSTAT
        MOV     AL,AH                   ; copy to AL
        CALL    CMREAD                  ; read in current value OR      AL,CT605FAIL            ; set error bit for CT605
```

```
09/19/1989  10:49      Filename: STANDBY.ASM                         Page 56

CALL    CMWRT                   ; write error bit

STC
        JMP     CT605Error              ; return error

CT605Ok:
;
; CT605 seems to be responding correctly
; Program enable register
;
        MOV     AL,CPUnit0 OR CPEnableReg  ; select CHIPSpek + reg
        OUT     CPIndexPort,AL
        MOV     AL,CPValidConfig OR CPPPEnable
        CMP     BH,00h                  ; serial disabled?
        JE      CT605Uart2              ; yes
        OR      AL,CPUART1Enable        ; no, serial (UART1) enabled CT605Uart2:
        CMP     BL,00h                  ; modem disabled?
        JE      CT605UartDone           ; yes
        OR      AL,CPUART2Enable        ; no, modem (UART2) enabled CT605UartDone:
        OR      AL,CPPPEnable           ; enable parallel port for slob
        OUT     CPDataPort,AL           ; enable various stuff ; Program configuration register MOV     AL,CPUnit0 OR CPConfigReg
        OUT     CPIndexPort,AL
        MOV     AL,0
        OUT     CPDataPort,AL ; Program external baud rate register MOV     AL,CPUnit0 OR CPExtBaudReg
        OUT     CPIndexPort,AL
        MOV     AL,CP250Ints
        OUT     CPDataPort,AL ; Program UART1 base addr register
; Value is either 3F8h or 2F8h, depending on the value of the CMOS
; bit 1 in reg 21h MOV     AL,CPUnit0 OR CPUART1Base
        OUT     CPIndexPort,AL ; Set up interrupt configuration while we're determine COM1/COM2

MOV     CL,IRQUart1 OR IRQSNone OR IRQ7Parallel
        MOV     DX,UART1Base
        CMP     BH,01h                  ; 3F8h
        JE      CT605Com                ; serial port = COM1?
                                        ; yes
        SUB     DX,100h
        AND     CL,IRQUartOff           ; no
        OR      CL,IRQ3Uart1
        CMP     BH,2                    ; COM2 = IRQ3
        JE      CT605Com                ; serial port = COM2?

; Serial port should be disabled

AND     CL,NOT IRQUart1
        MOV     DX,0                    ; no port
```

```
CT605Com:
        MOV     AX,DX
        SHR     AX,1
        SHR     AX,1                    ; convert 3F8h to 0FFh/ 2F8h to 7Fh
        OUT     CPDataPort,AL ; Program the UART2 base addr register CT605ModemPort:
        CMP     BL,0                    ; modem disabled?
        JE      CT605PP                 ; yes MOV     AL,CPUnit0 OR CPUART2Base
        OUT     CPIndexPort,AL OR      CL,IRQ3UArt2            ; COM2 = IRQ3
        MOV     DX,UART2Base            ; 2F8h
        CMP     BL,02h                  ; modem port = COM2?
        JE      CT605Com3               ; yes ADD     DX,100h                 ; no
        AND     CL,IRQ3UartOff
        OR      CL,IRQ4Uart2            ; COM2 = IRQ3
        CMP     BL,01h                  ; modem port = COM1?
        JE      CT605Com3               ; yes ; Modem port should be disabled AND     CL,NOT IRQ4Uart2
        MOV     DX,0                    ; no port CT605Com3:
        MOV     AX,DX
        SHR     AX,1
        SHR     AX,1
        OUT     CPDataPort,AL CT605PP:
; Program the parallel port base addr register
        MOV     AL,CPUnit0 OR CPParallelBase
        OUT     CPIndexPort,AL
        MOV     AX,PPBase
        SHR     AX,1
        SHR     AX,1
        OUT     CPDataPort,AL ; Program the interrupt source register
        MOV     AL,CPUnit0 OR CPIntSourceReg
        OUT     CPIndexPort,AL
        MOV     AL,CL                   ; value calculated above ; Exit
        OUT     CPDataPort,AL CLC                             ; report no error CT605Error:
        STI
        POP     DX
        POP     AX
        RET
```

```
CT605Configure ENDP

;******************************************************************************
;*
;* CT605Enable - puts the 82C605 chip in normal-use mode
;*
;* ENTRY:
;*      None
;*
;* EXIT:
;*      All registers preserved
;*
;******************************************************************************

CT605Enable     PROC    NEAR
        PUSH    AX

MOV     AL,CPUnit0 OR CPConfigCtrl    ; exit config mode
        OUT     CPIndexPort,AL
        OUT     CPDataPort,AL                 ; write any value
        POP     AX
        RET CT605Enable     ENDP ;-----------------------------------------------------------------------------
; Subroutine to Read CMOS register
;
;       Input:  AL = CMOS register address to read
;       Output: AL = CMOS register value
;               Interrupt Flag cleared
;               Carry Flag cleared
;               Zero Flag cleared

CMREAD  PROC    NEAR
        ASSUME  DS:NOTHING,ES:NOTHING

PUSH    DX
        MOV     DX,CMOSAD       ; CMOS RAM Address register port (write only)

CLI
        OUT     DX,AL

INC     DX              ; CMOS Data port (read/write)
WAITORIO:
        IN      AL,DX
        POP     DX

CMREAD0:
        RET
CMREAD  ENDP

;-----------------------------------------------------------------------------
; Subroutine to Write CMOS register
;
;       Input:  AH = CMOS register address to read, Bit 7 = 0 enables NMI
;               AL = Value to write to CMOS register
;       Output: Interrupt Flag cleared
;               Carry Flag cleared
;               Zero Flag cleared

CMWRT   PROC    NEAR
        ASSUME  DS:NOTHING,ES:NOTHING

PUSH    DX
```

```
09/19/1989 10:49     Filename: STANDBY.ASM                            Page 59

MOV      DX,CMOSAD        ; CMOS RAM Address register port (write only)
         XCHG     AH,AL

CLI
         OUT      DX,AL
         XCHG     AH,AL

INC      DX               ; CMOS Data port (read/write)
         WAFORIO
         OUT      DX,AL
         POP      DX
         RET
CMWRT    ENDP ;---------------------------------------------------------------------
;                      GetAutoSuspendState
;---------------------------------------------------------------------
; Returns ZR = 0 if auto suspend is enabled
; Returns AL = # of minutes till auto suspend PUBLIC   GetAutoSuspendState
GetAutoSuspendState PROC NEAR MOV      AL,CMAutoSuspend  ; CMOS reg 22h
         PUSHF                      ; save int flag
         CALL     CMRead             ; = 0 if auto suspend disabled
         POPF
         OR       AL,AL              ; set or clear ZR flag
         RET
GetAutoSuspendState ENDP ;---------------------------------------------------------------------
;                      ResetSleepCounter
;---------------------------------------------------------------------
; This routine resets the sleep counter to its full value.

PUBLIC   ResetSleepCounter
ResetSleepCounter PROC NEAR

PUSH     AX
         PUSH     BX
         PUSH     CX
         PUSH     DS
         PUSHF

ASSUME   DS:DGROUP
         CLI
         MOV      DS,CS:WORD PTR DS40B

CALL     GetAutoSuspendState   ; get state of auto suspend
         JZ       RSCToZero ; Need to multiply the auto suspend timeout value by 18.2 tick/second
; * 60 seconds/minute to compute the number of ticks to count.
; 18.2 * 60 = 1092.
; Because this code is execute as often, I want to avoid using the MUL
; instruction.  Luckily, y * 1092 = (y * 1024) + (y * 64) + (y * 4).

XOR      AH,AH
         MOV      BX,AX             ; save copy of auto suspend timeout in BX
```

```
09/19/1989 10:49     Filename: STANDBY.ASM                            Page 60

PUSH     BX                ; save another copy

MOV      CL,10             ; 2^10 = 1024
         SHL      AX,CL             ; counter' = counter * 1024
         XCHG     BX,AX             ; BX = counter'; AX = counter MOV      CL,6
         SHL      AX,CL             ; counter'' = counter * 64
         ADD      BX,AX             ; counter''' = counter' + counter''

POP      AX                ; AX = counter
         SHL      AX,1
         SHL      AX,1

ADD      AX,BX             ; sum = counter''' + counter''''
         MOV      SleepCount,AX     ; store new value in sleep count JMP      SHORT RSCExit RSCToZero:
         MOV      SleepCount,0FFFFh  ; set to arbitrarily large value RSCExit:
         POPF
         POP      DS
         POP      CX
         POP      BX
         POP      AX
         RET
ResetSleepCounter ENDP ;---------------------------------------------------------------------
;                      ChecksumCMOS
;---------------------------------------------------------------------
; This routine checksums CMOS.  It returns the 8-bit checksum
; in AL, and ZR = 0 if the checksum doesn't match the stored
; checksum.

ChecksumCMOS PROC NEAR

PUSH     BX
         PUSHF                      ; save int flag from CMREAD

XOR      BX,BX

MOV      AL,CMSUMLOW       ; first byte to checksum
         MOV      AH,AL
         MOV      BH,CMSUMHIGH      ; last byte to checksum SumLoop:
         CALL     CMREAD
         CMP      AH,CMCPUSPEED     ; ignore CPU speed bit & autosuspend bit
         JNE      SumContinue
         AND      AL,NOT (SLOW OR AutoSuspend)  ; by masking them off SumContinue:
         ADD      BL,AL
         INC      AH
         MOV      AL,AH
         CMP      AL,BH
         JBE      SumLoop MOV      AL,CMCHECKSUM     ; read stored checksum
```

```
09/19/1989 10:49    Filename: STANDBY.ASM                    Page 61

CALL    CMREAD
        POPF
        CMP     AL,BL                  ; does it match?
        MOV     AL,BL                  ; return checksum

POP     BX
        RET

CheckSumCMOS    ENDP

;-----------------------------------------------------------------
;                       StoreNewCmosChecksum
;-----------------------------------------------------------------
; This routine calculates and stores a new checksum in CMOS StoreNewCmosChecksum PROC    NEAR

PUSH    AX
        PUSHF

CALL    ChecksumCmos
        MOV     AH,CMCHECKSUM          ; set checksum in AL
        CALL    CMWRT                  ; store it

POPF
        POP     AX
        RET

StoreNewCmosChecksum ENDP

;-----------------------------------------------------------------
;                       BCDToBin
;-----------------------------------------------------------------
; Entry: AL = 2 BCD digits
; Exit:  AL = 1 hex digit PUBLIC  BCDToBin
BCDToBin        PROC    NEAR

PUSH    BX
        PUSH    CX

MOV     BX,AX                  ; save original AX
        MOV     CL,4                   ; work on upper digit first
        SHR     AL,CL MOV     CL,10                  ; multiply upper digit by 10 (decimal)
        MUL     CL                     ; result in AL (AH doesn't matter)

AND     BL,0Fh                 ; lower digit
        ADD     AL,BL                  ; add it in MOV     AH,BH                  ; recover AH
        POP     CX
        POP     BX
        RET BCDToBin        ENDP ;-----------------------------------------------------------------
;                       SetThreshold
;-----------------------------------------------------------------
```

```
09/19/1989 10:49    Filename: STANDBY.ASM                    Page 62

; ENTRY:
;       DL = 0FFh to return current threshold
;       If DL = 00h
;           CH = threshold voltage integer portion in BCD
;           CL = threshold voltage fraction portion in BCD
; EXIT:
;       CY = 1
;           AH = 86h if subsystem is not supported
;           AH = 02h if voltage in CX is out of range
;       CY = 0
;           AH = 00h
;           If DL = 0FFh on entry:
;               CH = threshold voltage integer portion in BCD
;               CL = threshold voltage fraction portion in BCD SetThreshold    PROC    NEAR CMP     DL,0FFh
        JZ      STGetInfo              ; set threshold?
                                       ; yes
        OR      DL,DL
        JZ      STGoodParam            ; set threshold?
                                       ; yes MOV     AH,02h
        RET STGoodParam:
; Setting threshold, so check CH for range.  The maximum threshold
; allowed is 16 volts; the minimum is 8 volts.

CMP     CH,MAXTHRESHOLD
        JA      STBadRange
        CMP     CH,MINTHRESHOLD
        JAE     STGoodRange STBadRange:
        MOV     AH,02h                 ; voltage range error
        RET STGoodRange:
; Store new threshold in CMOS PUSHF
        MOV     AH,CMTHRESHOLDLO       ; set low threshold byte
        MOV     AL,CL
        CALL    CMWRT MOV     AL,CH
        MOV     AH,CMTHRESHOLDHI
        CALL    CMWRT
        CALL    StoreNewCmosChecksum   ; fix checksum
        POPF

PUSH    BX
        PUSH    CX

; Threshold reading = voltage * 1024 / (5 * 5), which == voltage * 41

MOV     AL,CH                  ; integer portion into AL
        CALL    BCDToBin
        MOV     BL,41
```

```
09/19/1989 10:49    Filename: STANDBY.ASM                          Page 63

MUL     BL                      ; result in AX

XCHG    AX,CX
        CALL    BCDToBin                ; get fraction portion into AL
        XOR     AH,AH
        MOV     BL,A1
        MUL     BL
        MOV     BL,100                  ; result in AX
        DIV     BL                      ; convert to fraction
        XOR     AH,AH                   ; Integer portion in AL, fraction in AH
        ADD     AX,CX                   ; add integer portion to fraction ; Send the minimum power threshold in BX. This is 9V.

MOV     BX,(9 * 1024) / 25
        CALL    OvlSetThreshold

POP     CX
        POP     BX
        XOR     AX,AX
        RET

STCGetInfo:
        PUSHF
        MOV     AL,CMTHRESHOLDLO        ; set low threshold byte
        CALL    CMREAD
        MOV     CL,AL
        MOV     AL,CMTHRESHOLDHI
        CALL    CMREAD
        MOV     CH,AL
        POPF
        XOR     AX,AX
        RET SetThreshold    ENDP ;-------------------------------------------------------------
;               InitializeThreshold
;-------------------------------------------------------------

PUBLIC  InitializeThreshold
InitializeThreshold     PROC    NEAR

PUSH    CX
        PUSH    DX

MOV     DL,0FFh                 ; get current setting
        CALL    SetThreshold
        OR      AH,AH
        JNZ     ITError MOV     DL,0                    ; set it
        CALL    SetThreshold            ; set the threshold
        OR      AH,AH
        JNZ     ITError                 ; error, so set threshold to default ITExit:
        POP     DX
        POP     CX
        RET ITError:
        MOV     CL,THRESHOLDLO          ; set threshold to default value
```

```
09/19/1989 10:49    Filename: STANDBY.ASM                          Page 64

MOV     CH,THRESHOLDHI          ; of 10V
        MOV     DL,0                    ; set
        CALL    SetThreshold            ; set the threshold
        OR      AH,AH
        JNZ     IT2ndError              ; error again - report to user JMP     SHORT ITExit IT2ndError:
        PUSHF
        MOV     AL,CMSTAT               ; save int flag from CMREAD
        CALL    CMREAD                  ; read in current value
        OR      AL,THRESHOLDERROR       ; set this error bit
        MOV     AH,CMSTAT
        CALL    CMWRT
        POPF
        JMP     SHORT ITExit InitializeThreshold     ENDP ;-------------------------------------------------------------
;               SetSerialPort
;-------------------------------------------------------------

; This routine sets the serial port and modem port hardware
; I/O address.
;
; ENTRY,
;       AH = E4h
;       AL = 4Eh
;       DL = 0FFh to retrieve current state
;          = 00h to disable left serial port
;          = 01h to enable left serial port as COM1
;          = 02h to enable left serial port as COM2
;       CL = 00h to disable modem
;          = 01h to enable modem as COM1
;          = 02h to enable modem as COM2
;
; When you select a device to be enabled as
; COM1, the device that is currently at COM1
; is disabled. When you select a device to be
; enabled as COM2, the device that is
; currently at COM2 is disabled.
;
; EXIT:
;       CF = 1
;          AH = 86h if subsystem not supported
;          AH = 02h if ((CL == DL) != 0) || (CL > 2) | (DL > 2)
;       CF = 0
;          If DL = 0FFh on entry, DL reflects state
;          of COM1/COM2 according to entry rules
;          above. DH will always = 00h, because
;          there is no right serial port.

PUBLIC  SetSerialPort
SetSerialPort   PROC    NEAR

MOV     AL,CMCOM1COM2           ; CMOS reg 22h
        CALL    CMREAD                  ; read serial port configuration CMP     DL,0FFh                 ; retrieve state?
        JE      SSPReturnState          ; yes SSPReturnState: MOV     CL,01h
```

```
            TEST    AL,ModemCom1        ; modem COM1?
            JNZ     SSPReturnSerial     ; yes
            MOV     CL,02h
            TEST    AL,ModemCom2        ; modem COM2?
            JNZ     SSPReturnSerial     ; yes
            MOV     CL,00h              ; modem is disabled SSPReturnSerial:
            MOV     DL,01h
            TEST    AL,SerialCom1       ; left serial COM1?
            JNZ     SSPReturn           ; yes
            MOV     DL,02h
            TEST    AL,SerialCom2       ; left serial COM2?
            JNZ     SSPReturn           ; yes
            MOV     DL,00h              ; left serial is disabled SSPReturn:
            MOV     DH,00h              ; right serial doesn't exist
            MOV     AX,0                ; return no error
            RET SetSerialPort   ENDP

CODE    ENDS
        END
```

```
09/18/1989 19:01                    Filename: ROMDAT.ASM                              Page 1

DGROUP   GROUP   DATA
DATA     SEGMENT WORD PUBLIC 'DATA'

PUBLIC  CRTMODE
         PUBLIC  SCRNWID
         PUBLIC  SCRNLEN
         PUBLIC  PAGADDR
         PUBLIC  CURCOOR
         PUBLIC  CURTYPE
         PUBLIC  DSPYPAG
         PUBLIC  CRTADDR
         PUBLIC  MSRCOPY
         PUBLIC  PALETTE
         PUBLIC  LOTIME
         PUBLIC  HITIME
         PUBLIC  SaveSS
         PUBLIC  SaveSP
         PUBLIC  SuspendBytes
         PUBLIC  Save82C100Bytes
         PUBLIC  SaveOvlyByte
         PUBLIC  Suspend2FB
         PUBLIC  Suspend2FBBytes
         PUBLIC  SuspendFlag
         PUBLIC  MOTRSTAT
         PUBLIC  ModemSlabCtrl
         PUBLIC  KbdSerialCtrl
         PUBLIC  Button1
         PUBLIC  MinPowerStatus
         PUBLIC  SleepCount
         PUBLIC  VideoMode
         PUBLIC  ColorMapIndex CRTMODE          EQU     49h             ; CURRENT CRT MODE
SCRNWID          EQU     4Ah             ; SCREEN COLUMN WIDTH
SCRNLEN          EQU     4Ch             ; BYTE LENGTH OF SCREEN
PAGADDR          EQU     4Eh             ; ADDR OF DISPLAY PAGE
CURCOOR          EQU     50h             ; START OF CURSOR COORDINATES
CURTYPE          EQU     60h             ; CURRENT CURSOR TYPE
DSPYPAG          EQU     62h             ; CURRENT DISPLAY PAGE
CRTADDR          EQU     63h             ; I/O ADDR OF CRT CONTROLLER
MSRCOPY          EQU     65h             ; MODE SELECT REGISTER COPY
PALETTE          EQU     66h             ; CURRENT COLOR PALETTE LOTIME           EQU     6Ch             ; LEAST SIGNIFICANT TIMER COUNTER
HITIME           EQU     6Eh             ; MOST SIGNIFICANT TIMER COUNTER SaveSS           EQU     0AEh            ; SS reg when going into suspend mode
SaveSP           EQU     0B0h            ; SP reg when going into suspend mode
SuspendBytes     EQU     0B4h            ; through 0E3 (47 bytes)
Save82C100Bytes  EQU     SuspendBytes+42 ; offset of first 82C100 byte saved
SaveOvlyByte     EQU     SuspendBytes+45 ; offset of first overlay ctrl byte saved Suspend2FB       EQU     0A6h
Suspend2FBBytes  EQU     0FAh            ; 6 bytes -'to 0FFh
SuspendFlag      EQU     0E6h            ; 1- 0 if exiting suspend mode ColorMapIndex    EQU     0A7H            ;'''

MOTRSTAT         EQU     3Fh             ; MOTOR STATUS

ModemSlabCtrl    EQU     0E7h            ; last value written to port 186h
KbdSerialCtrl    EQU     0E8h            ; last value written to port 187h Button1          EQU     0Ah
```

```
09/18/1989 19:01                    Filename: ROMDAT.ASM                              Page 2

MinPowerStatus   EQU     0F5h            ; low power auto suspend bit (bit 0)
SleepCount       EQU     0E4h            ; word to count sleep value VideoMode        EQU     082h            ; byte to store true video mode

DATA     ENDS
         END
```

What is claimed is:

1. A method usable for configuring a data processor to enter a low-power mode, said data processor including a CPU, a programmable interrupt controller coupled to said CPU, a direct memory access controller, I/O state indicating registers coupled to said CPU, I/O ports coupled to said CPU, a dynamic random access memory coupled to said direct memory access controller and to said CPU, and a system control chip coupled to said CPU having an unclocked sleep mode and an unpowered standby mode, the method comprising:

receiving in said CPU a command to enter low-power mode;
 configuring said programmable interrupt controller, using said CPU, to disable acceptance of later interrupts;
 configuring said direct memory access controller, using said CPU, to disable later direct memory access operations wherein said configuring of said direct memory access controller occurs at a time following said step of configuring said programmable interrupt controller;
 saving, to said memory, the contents of at least some of said I/O state indicating registers and I/O ports, using said CPU, wherein said saving to said memory access at a time following said step of configuring said direct memory access controller;
 refreshing said memory, using said CPU, wherein said refreshing of said memory occurs at a time following said step of saving; and
 initiating said standby mode of said system control chip using said CPU.

2. A method, as claimed in claim 1, further comprising the steps of:
 sensing absence of user input for more than a predetermined time, using said CPU; and
 issuing a command to enter low-power mode, using said CPU.

3. A method, as claimed in claim 1, further comprising the steps of:
 sensing a system power level below a predetermined level, using said CPU; and
 issuing a command to enter low-power mode, using said CPU.

4. A method, as claimed in claim 1, further comprising the steps of:
 sensing activation of a user-activatable low-power switch, using said CPU; and
 issuing a command to enter low-power mode, using said CPU.

5. A method, as claimed in claim 1, further comprising the steps of:
 receiving an instruction from a user application, using said CPU; and
 issuing a command to enter low-power mode, using said CPU.

6. A method, as claimed in claim 1, wherein said programmable interrupt controller includes an interrupt mask and wherein said step of configuring said programmable interrupt controller comprises:
 saving said interrupt mask to memory; and
 setting said interrupt mask to disable later interrupts.

7. A method, as claimed in claim 1, wherein said step of configuring said direct memory access controller comprises:
 completing pending direct memory access operations;
 disabling new direct memory access operations; and
 disabling the direct memory access controller.

8. A method, as claimed in claim 1, wherein said data processor further includes a stack and at least a first stack pointer and further comprising saving said stack pointer to said memory.

9. A method, as claimed in claim 1, wherein said direct memory access controller includes counter registers, a command register, mode registers and page registers and further comprising:
 saving the contents of said counter registers, command register, mode registers and page registers to said memory.

10. A method, as claimed in claim 1, wherein said data processor includes a programmable peripheral interface having a plurality of ports, wherein said step of saving comprises saving the contents of said plurality of ports to said memory.

11. A method, as claimed in claim 1, wherein said data processor includes at least one expanded memory specification port and wherein said step of saving comprises saving the contents of said port to memory.

12. A method, as claimed in claim 1, wherein said data processor having at least first, second, third, fourth, fifth, sixth, and seventh registers, said first register being a universal asynchronous receiver/transmitter register and having a byte format, said second register being a modem control register, said third register being a line status register, said fourth register being a modem status register, said fifth register being an interrupt enable register, said sixth register being a least significant byte divisor register and said seventh register being a most significant byte divisor register, and wherein said step of saving comprises saving the contents of said first, second, third, fourth, fifth, sixth, and seventh registers to memory.

13. A method, as claimed in claim 1, wherein said data processor includes parallel port registers including data latch and printer control registers and wherein said step of saving comprises saving the contents of said port registers to said memory.

14. A method, as claimed in claim 1, wherein said system control chip includes stored indications of DIP switch configurations, a sleep/memory configuration, an EMS configuration port and a non-maskable interrupt control configuration and wherein said step of saving comprises saving said indications to memory.

15. A method, as claimed in claim 1, wherein said data processor includes an overlay controller including overlay controller flags and wherein said step of saving includes saving said flags to said memory.

16. A method, as claimed in claim 1, wherein said data processor includes standby mode control logic and wherein said step of initiating said standby mode comprises:
 enabling said standby mode of said standby mode control logic; and
 issuing a halt command to said cpu.

17. A method, as claimed in claim 1, further comprising disabling non-maskable interrupts following said step of receiving a command.

18. A method, as claimed in claim 1, wherein said memory includes a first program portion and a second portion reserved for use by a basic input/output system, and wherein said step of saving includes saving to said second portion of memory.

19. A method, as claimed in claim 1, wherein said step of saving comprises saving said contents into fewer than 48 eight-bit bytes of said memory.

* * * * *